US005630105A

United States Patent [19]

Itagaki

[11] Patent Number: 5,630,105
[45] Date of Patent: May 13, 1997

[54] MULTIMEDIA SYSTEM FOR PROCESSING A VARIETY OF IMAGES TOGETHER WITH SOUND

[75] Inventor: Fumihiko Itagaki, Hokkaido, Japan

[73] Assignee: Hudson Soft Co., Ltd., Hokkaido, Japan

[21] Appl. No.: 563,779

[22] Filed: Nov. 27, 1995

Related U.S. Application Data

[63] Continuation of Ser. No. 112,366, Aug. 27, 1993.

[30] Foreign Application Priority Data

Sep. 30, 1992 [JP] Japan ................................ 4-285155

[51] Int. Cl.$^6$ .......................................................... G06F 15/00
[52] U.S. Cl. ........................... 395/501; 395/522; 395/173; 345/113; 345/115; 345/121
[58] Field of Search ..................................... 395/162–166, 395/152–154; 345/113–116, 121, 122

[56] References Cited

U.S. PATENT DOCUMENTS

| | | | |
|---|---|---|---|
| 4,951,038 | 8/1990 | Yamamura | 340/725 |
| 5,089,811 | 2/1992 | Leach | 340/703 |
| 5,170,154 | 12/1992 | Mantopoulos et al. | 345/27 |
| 5,218,432 | 6/1993 | Wakeland | 348/590 |
| 5,254,984 | 10/1993 | Wakeland | 345/144 |
| 5,296,938 | 3/1994 | Nakayama | 358/448 |
| 5,357,604 | 10/1994 | San et al. | 395/162 |

FOREIGN PATENT DOCUMENTS

| | | |
|---|---|---|
| 0179672 | 4/1986 | European Pat. Off. . |
| 0524468 | 1/1993 | European Pat. Off. . |
| 2247814 | 10/1991 | United Kingdom . |

OTHER PUBLICATIONS

"Optical Sheet Memory System", Shinji Ohyama, Electronics and Communications in Japan, Apr. 1992, No. 4, New York, pp. 73–84.
"Chip Makers Join the Multimedia Rush", Jonah McLeod Electronics, vol. 64, No. 3, Mar. 1991, pp. 58–60.
"Video Coding With Motion–Compensated Interpolation For CD-Rom Applications", A. Puri et al, Signal Processing: Image Communication No. 2, Aug. 1990, pp. 127–144.
"Videounterhaltung mit Supertechnik CD–1", Von Franz Schöler, 202 Funkschau 64(1992)7 Aug., No. 17, Munchen, pp. 14–17, 22–25 and 28.
"A New Video Coding Algorithm and the Multimedia System", Hidehiro Matsumoto et al, IEEE International Conference on Consumer Electronics, Jun. 5–7, 991 pp. 196–197.

Primary Examiner—Kee M. Tung
Assistant Examiner—U. Chauhan
Attorney, Agent, or Firm—Lowe, Price, LeBlanc & Becker

[57] ABSTRACT

A high performance computer includes a CPU, a video display unit, a control unit, an image data extension unit, a video encoder unit responsive to the outputs of the video display unit, the controller unit and the image data extension unit, and a sound data output unit, for processing a variety of image data together with a variety of sound data at high speed. Three types of image data sequence processes can be carried out in the computer. These are an external block sequence, an external dot sequence, and an internal dot sequence.

18 Claims, 63 Drawing Sheets

F I G. 8
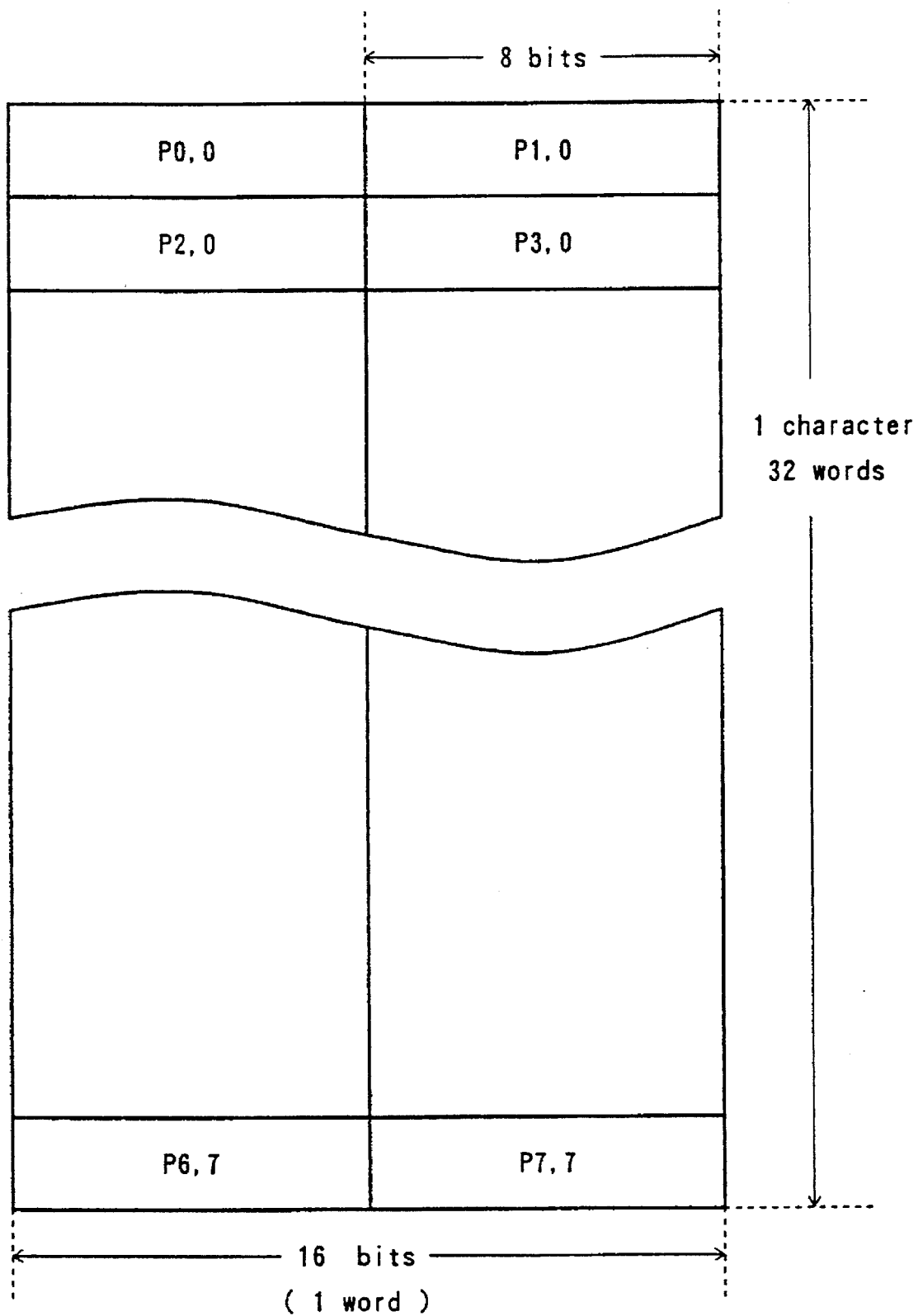

64K COLOR MODE

16M COLOR MODE

0 × 0 0   F F F C

0 × 0 4   0 0 0 4
0 × 0 4   0 0 0 0
0 × 0 3   F F F C
        ·
        ·
        ·
        ·
0 × 0 0   0 0 0 4
0 × 0 0   0 0 0 0

ADDRESS

FIG. 14

| TYPE OF DRAM | | 1 ARRAY | 2 ARRAY |
|---|---|---|---|
| 64K × 16 ROW × COL 8 × 8 | word | 64KW | 128KW |
| | byte | 256KB | 512KB |
| | chip | 2 | 4 |
| 128K × 8 ROW × COL 9 × 8 | word | 128KW | 256KW |
| | byte | 512KB | 1MB |
| | chip | 4 | 8 |
| 256K × 4 ROW × COL 9 × 9 | word | 256KW | 512KW |
| | byte | 1MB | 2MB |
| | chip | 8 | 16 |
| 256K × 16 ROW × COL 9 × 9 | word | 256KW | 512KW |
| | byte | 1MB | 2MB |
| | chip | 2 | 4 |
| 512K × 8 ROW × COL 10 × 9 | word | 512KW | 1MW |
| | byte | 2MB | 4MB |
| | chip | 4 | 8 |
| 1M × 4 ROW × COL 10 × 10 | word | 1MW | 2MW |
| | byte | 4MB | 8MB |
| | chip | 8 | 16 |
| 1M × 16 ROW × COL 12 × 8 | word | 1MW | 2MW |
| | byte | 4MB | 8MB |
| | chip | 2 | 4 |

MEMRORY SPECIFYING REGISTER

F I G . 1 8
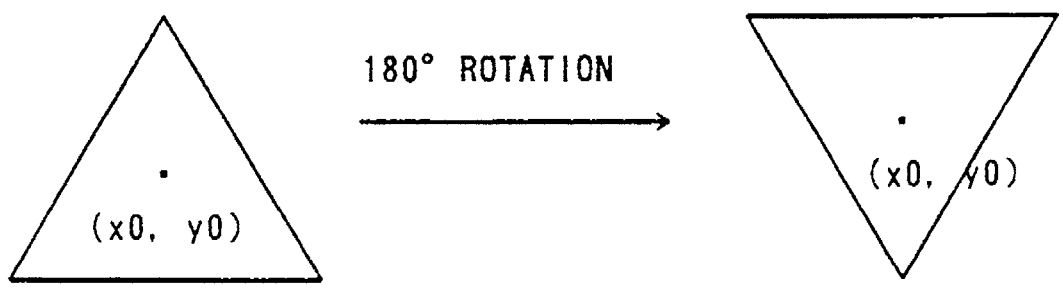
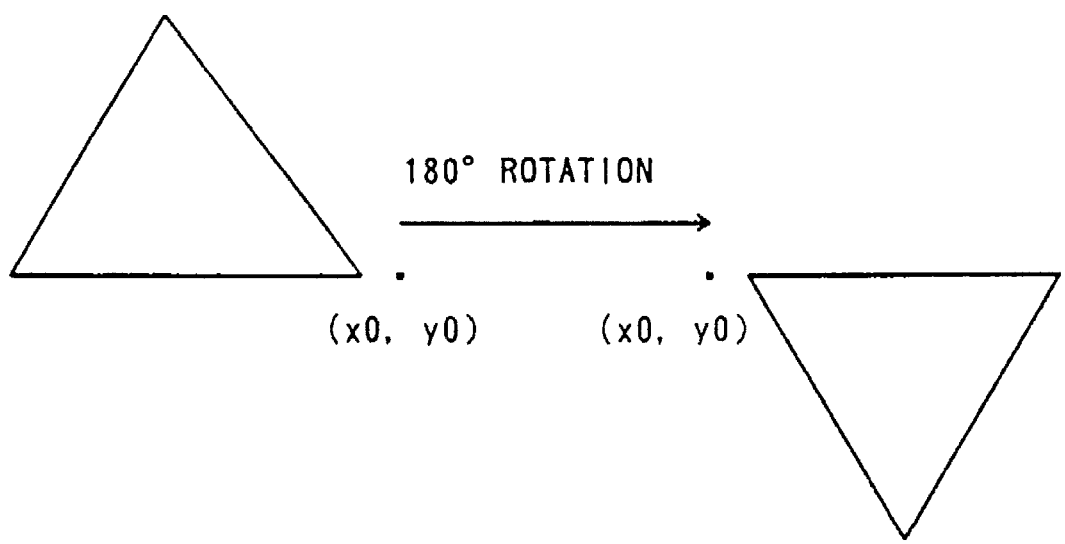

F I G. 1 9 A

BG AFFIN COEFFICIENT A

| 15 | 8 7 | 0 |

| BEFORE THE DECIMAL POINT | AFTER THE DECIMAL POINT | ← PARAMETER A

BG AFFIN COEFFICIENT B

| 15 | 8 7 | 0 |

| BEFORE THE DECIMAL POINT | AFTER THE DECIMAL POINT | ← PARAMETER B

BG AFFIN COEFFICIENT C

| 15 | 8 7 | 0 |

| BEFORE THE DECIMAL POINT | AFTER THE DECIMAL POINT | ← PARAMETER C

BG AFFIN COEFFICIENT D

| 15 | 8 7 | 0 |

| BEFORE THE DECIMAL POINT | AFTER THE DECIMAL POINT | ← PARAMETER D

FIG. 19B

BG AFFIN CENTER COORDINATE X 15 0

| X 0 (COMPLEMENT TO TWO) | ← PARAMETER C

BG AFFIN CENTER COORDINATE Y 15 0

| Y 0 (COMPLEMENT TO TWO) | ← PARAMETER D

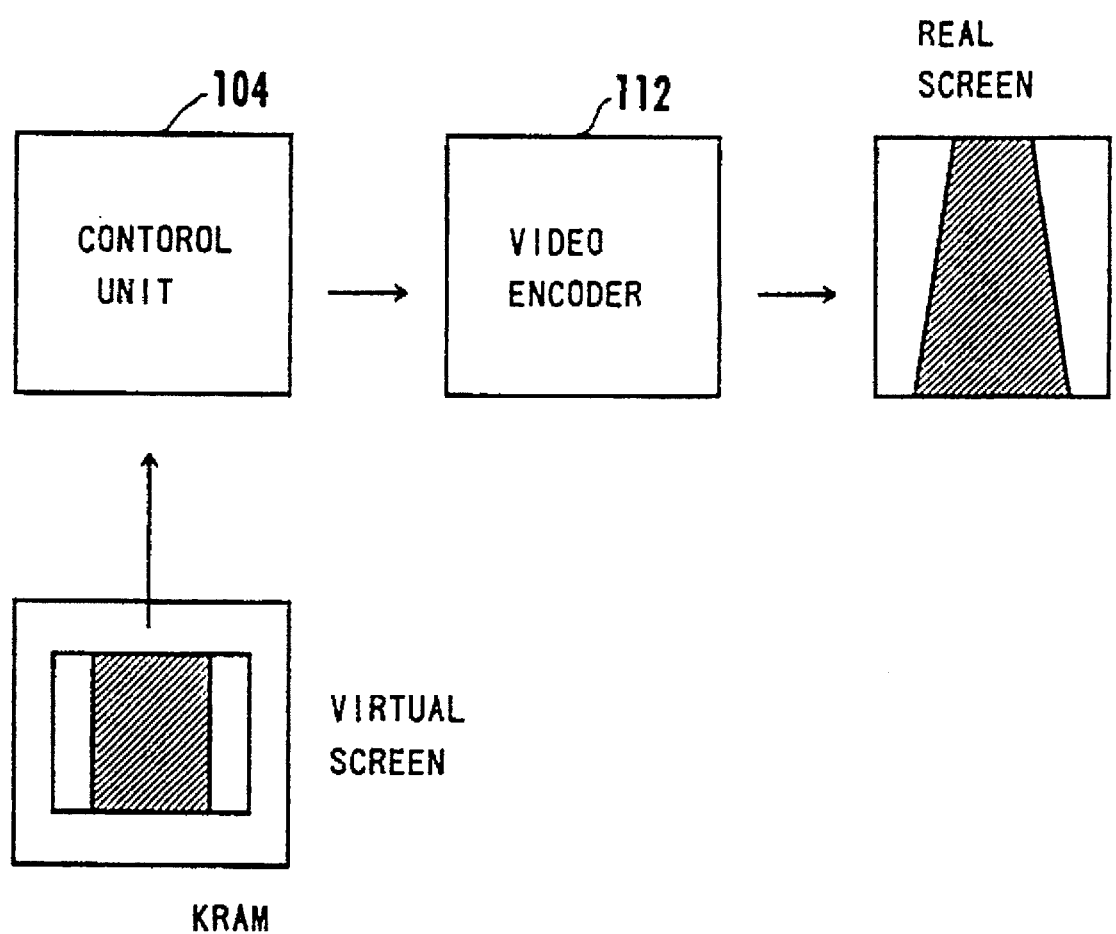

MICROPROGRAM
CONTROL REGISTER

FIG. 23A

| 7 | 6 | 5 | 4 | 3 | 2 | 1 | 0 |
|---|---|---|---|---|---|---|---|
| UNUSED | | | | | | | MPSW |

MICROPROGRAM LOAD
ADDRESS REGISTER

FIG. 23B

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   |   |   |

MICROPROGRAM
DATA REGISTER

FIG. 23C

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   |   |   |

MICROPROGRAM STORAGE AREA ( 1 Word = 9 bits )

FIG. 23D

|         | B | A |
|---------|---|---|
| cycle 0 | 8 | 0 |
| cycle 1 | 9 | 1 |
| ⋮       | ⋮ | ⋮ |
| cycle 7 | F | 7 |

F I G. 24

| 15 | 9 | 8 | 7 | 6 | 5 | 4 | 3 | 2 | 1 | 0 |
|---|---|---|---|---|---|---|---|---|---|---|
| UNUSED | | NOP/-NOP | BG SCREEN No. | | ROTATION/ NON-ROTATION | BAT/-CG | INDIRECT/ -DIRECT | CG OFFSET | | |

|   | A BUS DATA | B BUS DATA |
|---|---|---|
| 0 CYCLE | NOP | BG0 INDIR CG (0) |
| 1 CYCLE | BG2 CG DIR (0) | BG0 INDIR CG (1) |
| 2 CYCLE | BG2 CG DIR (1) | BG0 INDIR CG (2) |
| 3 CYCLE | NOP | BG0 INDIR CG (3) |
| 4 CYCLE | NOP | BG0 INDIR CG (0) |
| 5 CYCLE | NOP | BG0 INDIR CG (1) |
| 6 CYCLE | BG0 BAT | NOP |
| 7 CYCLE | BG1 BAT | NOP |

FIRST LINE TO BE REWRITTEN

F I G. 3 6

|  8 dots | character | | | | |
|---|---|---|---|---|---|
| 0 | 1 | 2 | | 3E | 3F |
| 40 | 41 | 42 | | 7E | 7F |
| | | | | | |
| | | | | | |
| FC0 | FC1 | FC2 | | FFE | FFF |

8 dots (leftmost row label)

512 dots (64 characters) — vertical 512 dots (64 characters) — horizontal

Note : Numerals shown in the table indicate BAT addresses (for hexadecimal)

F I G. 3 7

| 31 | | 3 | 2 | 1 | 0 |
|---|---|---|---|---|---|
| NOT USED | | BG3 | BG2 | BG1 | BG0 |

B G x = 0 : SUB-PICTURE NON-ENDLESS SCROLL MODE (TRANSPARENCE BASE MODE)

1 : SUB-PICTURE ENDLESS SCROLL MODE

FIG. 38
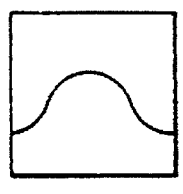
SUB-PICTURE
8 dots
8 dots
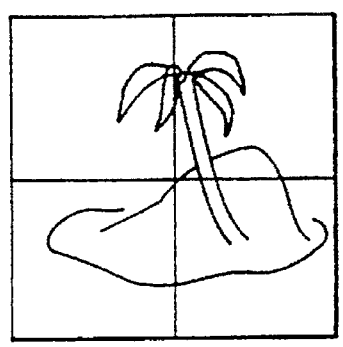
MAIN PICTURE
16 dots
16 dots
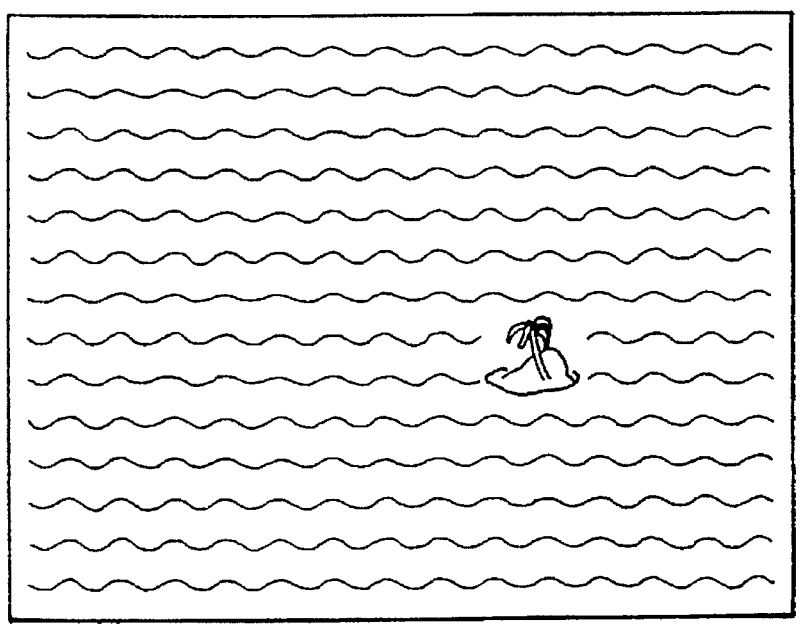

FIG. 43A

TRANSISTOR CONTROL REGISTER

| 7 | 6 | 5 | 4 | 3 | 2 | 1 | 0 |
|---|---|---|---|---|---|---|---|
|   |   |   |   |   |   | RAIN INT | RAIN EN |

RAIN EN = 1 TRANSFER START
RAIN INT = 1 INTERRUPTION OF RASTER MONITORING REGISTER ENABLE

FIG. 43B

START ADDRESS REGISTER

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| -A/B | KA16 | KA15 | KA14 | KA13 | KA12 | KA11 | KA10 | KA 9 | KA 8 | KA 7 | KA 6 | KA 5 | KA 4 | KA 3 | KA 2 | KA 1 | KA 0 |

FIG. 43C

TRANSFER START REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | RASTER No. | | | | | | | |

FIG. 43D

TRANSFER BLOCK NUMBER REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | NUMBER OF BLOCKS | | | | | | | |

FIG. 43E

RASTER MONITORING REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | RASTER No. | | | | | | | |

F I G. 4 5
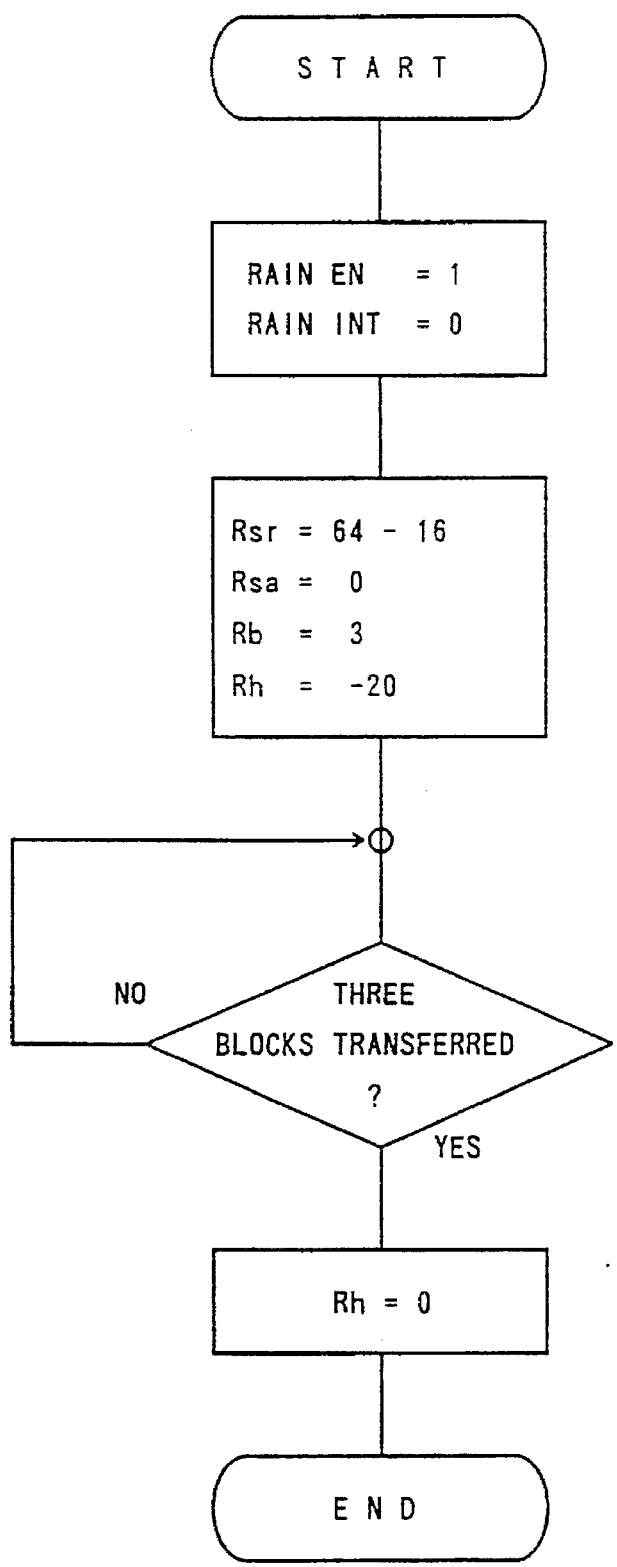

F I G. 4 8

COLOR PALLET RAM

| COLOR PALLET ADDRESS | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|
| 0 | Y DATA |||||||| U DATA ||||| V DATA ||||
| 1 | Y DATA |||||||| U DATA ||||| V DATA ||||
| 2 | Y DATA |||||||| U DATA ||||| V DATA ||||
| 3 | Y DATA |||||||| U DATA ||||| V DATA ||||
| 001 | Y DATA |||||||| U DATA ||||| V DATA ||||
| 011 | Y DATA |||||||| U DATA ||||| V DATA ||||
| 095 | Y DATA |||||||| U DATA ||||| V DATA ||||
| 105 | Y DATA |||||||| U DATA ||||| V DATA ||||
| 115 | Y DATA |||||||| U DATA ||||| V DATA ||||

FIG. 49

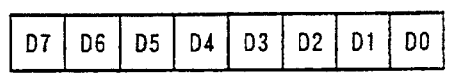

COLOR PALLET DATA

+

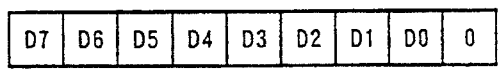

COLOR PALLET ADDRESS OFFSET × 2

=

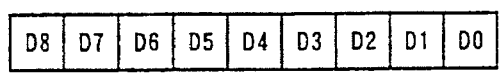

COLOR PALLET ADDRESS

FIG. 50

| PICTURE | | D7 | D6 | D5 | D4 | D3 | D2 | D1 | D0 |
|---|---|---|---|---|---|---|---|---|---|
| VDP | SPRITE | PALLET BANK No. | | | | PALLET No. | | | |
| | BG | PALLET BANK No. | | | | PALLET No. | | | |
| CONTROL UNIT | 4 COLOR MODE | 0 | 0 | PALLET BANK No. | | | | PALLET No. | |
| | 16 COLOR MODE | PALLET BANK No. | | | | PALLET BANK No. | | | |
| | 256 COLOR MODE | PALLET No. | | | | | | | |
| IMAGE DATA EXTENSION UNIT (RL SCREEN) | 16 COLOR MODE | 0 | 0 | 0 | 0 | PALLET No. | | | |
| | 32 COLOR MODE | 0 | 0 | 0 | PALLET No. | | | | |
| | 64 COLOR MODE | 0 | 0 | PALLET No. | | | | | |
| | 128 COLOR MODE | 0 | PALLET No. | | | | | | |

F I G. 5 2
LOW PRIORITY      MIDDLE PRIORITY      HIGH PRIORITY      FINAL IMAGE
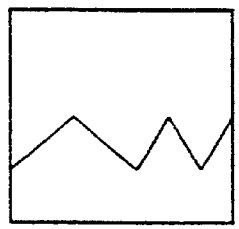 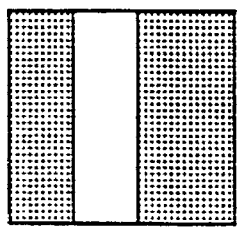 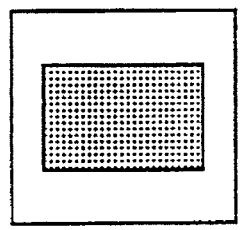 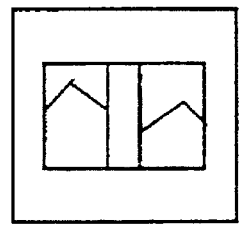
: KEY color

F I G. 5 3

| | PICTURE | | |
|---|---|---|---|
| VDP | SPRITE | COLOR PALLET DATA | PALLET No. 0(ALL PALLET BANK) |
| | BG | COLOR PALLET DATA | PALLET No. 0(ALL PALLET BANK) |
| CONTROL UNIT (RL PICTURE) | 16M COLOR MODE | YUV DATA | Y DATA = 00h |
| | 64K COLOR MODE | YUV DATA | Y DATA = 00h |
| | 4 COLOR MODE | COLOR PALLET DATA | COLOR PALLET DATA 0 |
| | 16 COLOR MODE | COLOR PALLET DATA | COLOR PALLET DATA 0 |
| | 256 COLOR MODE | COLOR PALLET DATA | COLOR PALLET DATA 0 |
| | INVALID | INVALID | ANY DATA |
| IMAGE-DATA EXTENSION UNIT | IDCT | YUV DATA | SET COLOR OF REGISTER |
| | RL 16 COLOR MODE | COLOR PALLET DATA | PALLET No. 0 |
| | RL 32 COLOR MODE | COLOR PALLET DATA | PALLET No. 0 |
| | RL 64 COLOR MODE | COLOR PALLET DATA | PALLET No. 0 |
| | RL128 COLOR MODE | COLOR PALLET DATA | PALLET No. 0 |
| | INVALID | INVALID | ANY DATA |

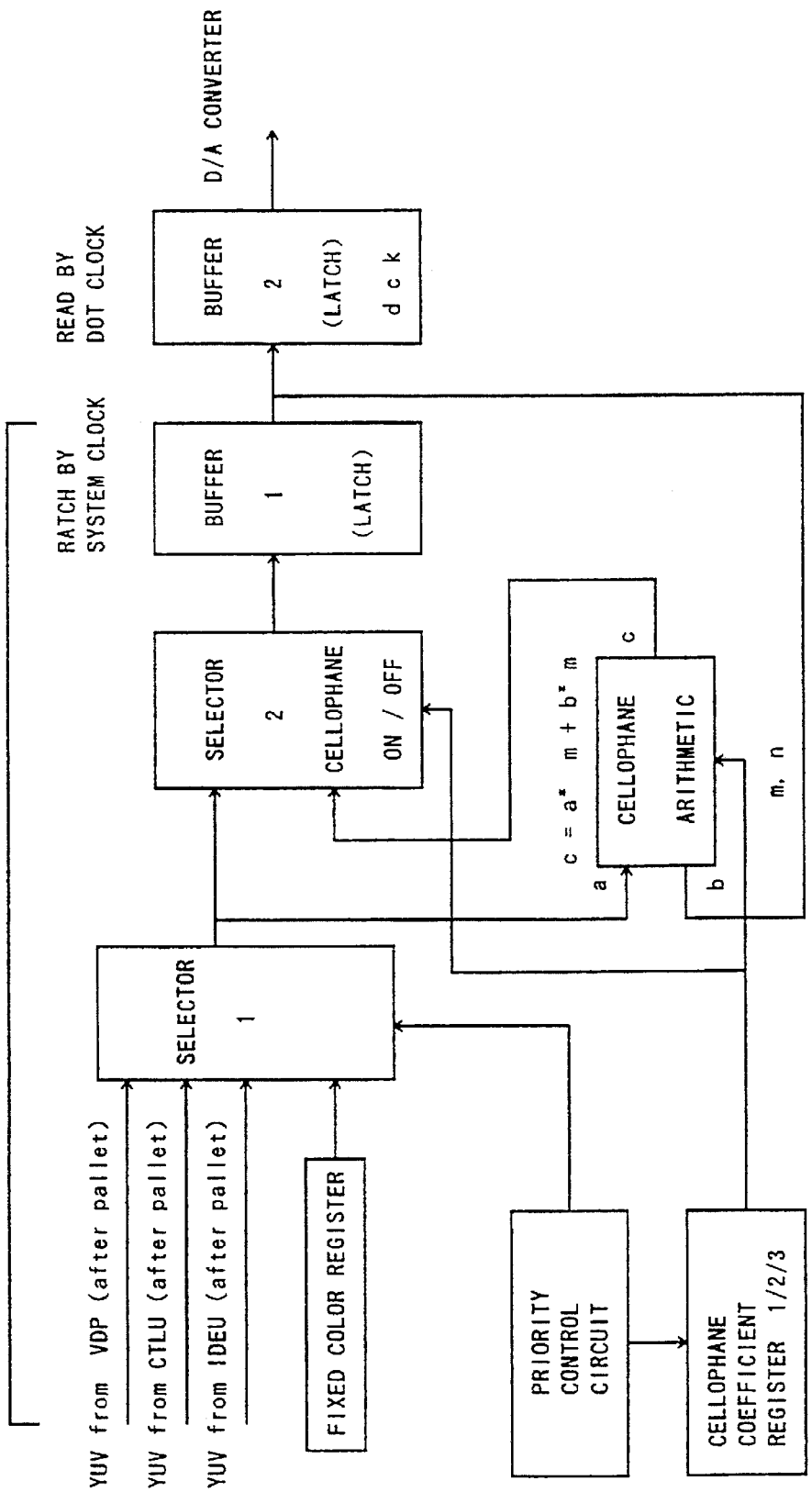

F I G. 5 7
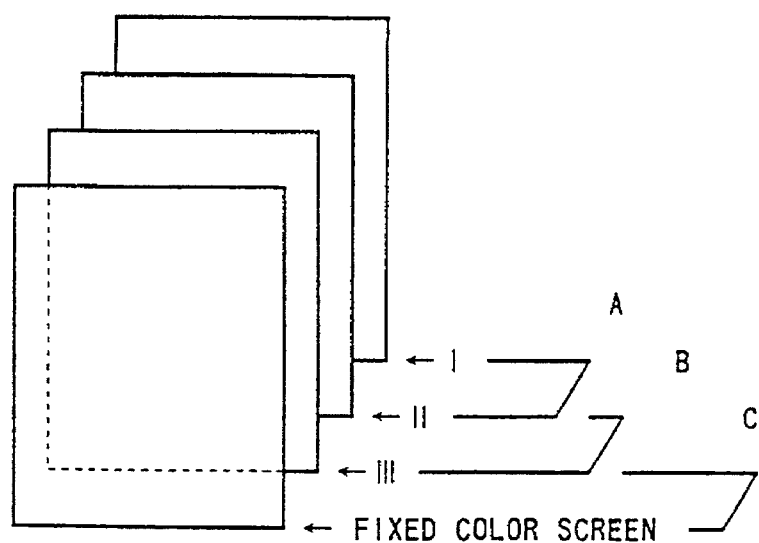
F I G. 5 8
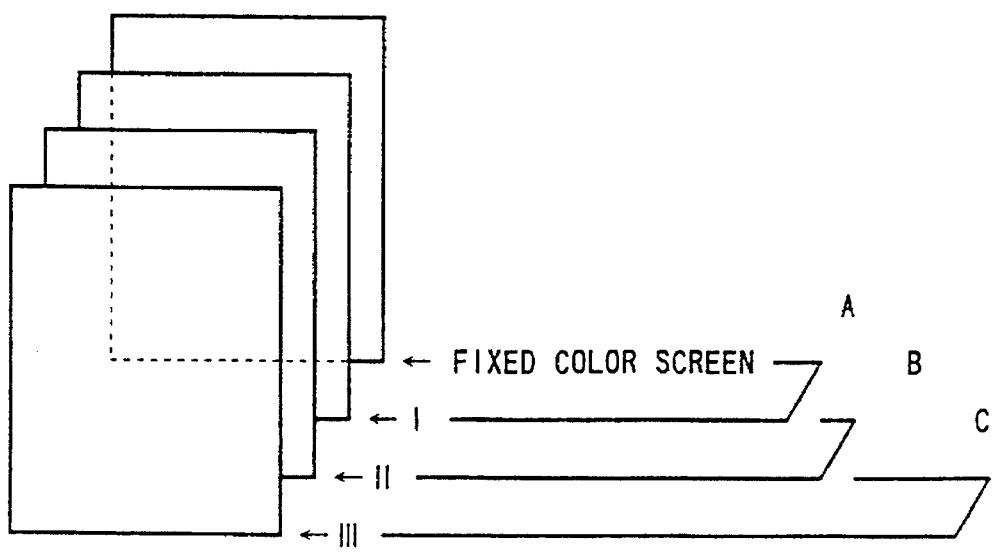

FIG. 59

| RASTER COUNTER VALUE | |
|---|---|
| 22 | DISPLAY START |
| 23 | |
| 24 | |
| 25 | |
| 26 | |
| 258 | |
| 259 | |
| 260 | |
| 261 | DISPLAY END |

110 SOUND DATA OUTPUT UNIT

| SAMPLING RATE FREQUENCY | TRANSFER CYCLE | (PER CHANNEL) DATA TRANSFER FORM | AMOUNT TO BE ADDED (ONE STEP) |
|---|---|---|---|
| 31.47 KHz | 2 H | 8 bit x 2 (4 x 4) | — |
| 15.73 KHz | 4 H | 8 bit x 2 (4 x 4) | ( d(n)-d(n-1) ) / 2 |
| 7.87 KHz | 8 H | 8 bit x 2 (4 x 4) | ( d(n)-d(n-1) ) / 2 |
| 3.93 KHz | 16 H | 8 bit x 2 (4 x 4) | ( d(n)-d(n-1) ) / 2 |

FIG. 68

| ADPCM DATA (NO-CODE) | VARIATION | LEVEL CHANGING VALUE |
|---|---|---|
| 0 0 0 | 1 | −1 |
| 0 0 1 | 2 | −1 |
| 0 1 0 | 3 | −1 |
| 0 1 1 | 4 | −1 |
| 1 0 0 | 5 | +2 |
| 1 0 1 | 6 | +4 |
| 1 1 0 | 7 | +6 |
| 1 1 1 | 8 | +8 |

F I G. 69

| SCALE LEVEL | SCALE VALUE | SCALE LEVEL | SCALE VALUE | SCALE LEVEL | SCALE VALUE |
|---|---|---|---|---|---|
| 0 | 16 | 17 | 80 | 34 | 408 |
| 1 | 17 | 18 | 88 | 35 | 449 |
| 2 | 19 | 19 | 97 | 36 | 494 |
| 3 | 21 | 20 | 107 | 37 | 544 |
| 4 | 23 | 21 | 118 | 38 | 598 |
| 5 | 25 | 22 | 130 | 39 | 658 |
| 6 | 28 | 23 | 143 | 40 | 724 |
| 7 | 31 | 24 | 157 | 41 | 796 |
| 8 | 34 | 25 | 173 | 42 | 876 |
| 9 | 37 | 26 | 190 | 43 | 963 |
| 10 | 41 | 27 | 209 | 44 | 1060 |
| 11 | 45 | 28 | 230 | 45 | 1166 |
| 12 | 50 | 29 | 253 | 46 | 1282 |
| 13 | 55 | 30 | 279 | 47 | 1411 |
| 14 | 60 | 31 | 307 | 48 | 1552 |
| 15 | 66 | 32 | 337 | | |
| 16 | 73 | 33 | 371 | | |

MULTIMEDIA SYSTEM FOR PROCESSING A VARIETY OF IMAGES TOGETHER WITH SOUND

This application is a continuation of application Ser. No. 08/112,336 filed Aug. 27, 1993.

BACKGROUND OF THE INVENTION

The present invention is directed to an apparatus for processing sound and image data, and more particularly to a game computer for displaying image information and producing accompanying sound.

A conventional computer will be explained, hereinafter, separately image processing and sound processing.

(1) IMAGE PROCESSING

In a conventional game computer, a background (BG) image and a sprite image moving on the BG are combined on a screen to increase processing speed and to lower cost.

The background image is composed of a plurality character blocks (character screens) each defined by 64 dots of 8-by-8. Therefore, the background image is defined on a CRT display screen by deciding position, color and pattern of the character blocks. The computer has a video-RAM (VRAM) which includes a background attribute table (BAT) and a character generator (CG), as shown in FIG. 1. The background image is defined in accordance with data format of the background attribute table (BAT) and the character generator (CG).

The BAT includes a CG COLOR and a character code whereby position and color for each character are defined on a virtual screen, which is larger in size than the real screen (CRT). The CG stores many actual character patterns corresponding to the character codes in the BAT. The CG is, for example, composed of four character elements CH0 to CH3, and the number of the character elements is defined by color modes. For instance, the CG is composed of two character elements in a four-color mode, and is composed of four character elements in a sixteen-color mode.

The color of each character block is defined dot by dot, each dot color is defined by total bits of all the corresponding dots on each character elements CH0 to CH3, as shown in FIG. 2. Specifically, when the corresponding dots of character elements CH0 to CH3 are indicated by b0, b1, b2 and b3, a color "C" of the dot to be represented is given by an equation "$C = b0 \times 2^0 + b1 \times 2^1 + b2 \times 2^2 + b3 \times 2^3$". It can be considered that the color "C" may be treated as a color code directly. However, the conventional game computer uses a color pallet which stores plural color codes to manage colors of the background image so that many colors may be used for displaying one background image. The color pallet is indicated in position by the color codes of the CG.

The character code in the BAT indicates an address in the CG. A color to be displayed is selected from colors in the color pallet in accordance with both the CG COLOR and the color code. That is, first, a color block is selected from the CG in accordance with the CG COLOR, then a color is selected from in the color block in accordance with the color code, as shown in FIG. 3. The CG COLOR is composed of 4 bits, so that sixteen color blocks may be represented thereby. Each color code is composed of 4 bits, whereby sixteen colors may be represented for each character. Ultimately, sixteen colors are selected from among 256 (16×16) colors.

When an address of the image data is moved in a horizontal or vertical direction on the virtual screen, the image is scrolled on the CRT display.

Generally, transmission process of image data to the CRT is controlled in accordance with horizontal and vertical synchronizing signals. According to an NTSC system, 525 scanning lines are used to display an image, and odd fields and even fields are scanned alternately.

On the display device for a general game computer, only odd or even fields are scanned. The display system is controlled line by line in synchronization with horizontal synchronizing signals, and is controlled screen by screen in synchronization with vertical synchronizing signals. In the vertical synchronizing signals, there are flyback times longer than those of the horizontal synchronizing signals, whereby it is preferable that the image data are processed in the flyback times of the vertical synchronization. In order to display the BG image on the CRT, a raster scanning position is detected, and then each piece of character information is converted into video signals.

It is possible to realize an image rotation process and a synthesis process of plural images. In the rotation process of the BG screen, a plurality of screens having different display angles are displayed in a predetermined order whereby the BG screen seems as if it is rotated. In the other hand, a plurality of screens having different angles, which are produced by calculation according to a predetermined matrix coordinate, are displayed in the same order. In the synthesis process, a plurality of image data are supplied through different buses to an encoder, and the data are mixed by the encoder.

The conventional computer system includes a fader for giving a 100% brightness to a picture to be displayed, and a 0% brightness to the other pictures.

Most conventional game computers have single screen, that is not changed by another.

(2) SOUND PROCESSING

In general, a computer has a digital sound source in which all of sound signals are indicated as numerals whereby synthesis of waveform is carried out by addition, subtraction, multiplication and division calculations. Most of game computers include programmable sound generators (PSG) each manage a small amount of data. According to the PSG, waveform data in a predetermined period are changed in amplitude, then modulated in frequency and then are processed in order to generate a sound waveform. In the PSG, the sound source (sound waveform) is generated in accordance with a predetermined program.

On another way, analog sound data are converted into digital sound data whereby high quality sound source is generated by a pulse code modulation (PCM) method. According to the PCM, an analog signal is sampled at predetermined intervals, the sampled signal is quantified and is converted into binary number, whereby digital data are generated.

For the game computer, an adaptive-difference pulse code modulation (ADPCM) method is used for generating a digital signal. According to the ADPCM method, the difference between next two sample values is quantified, and the sampling pitch is shortened if the quantified difference value is larger, and is extended if the quantified difference value is smaller, whereby data to be used for a sound source are reduced (scale-down). As a result, sound can be reproduced by using a small amount of data. The PCM data and ADPCM data may be converted to each other in accordance with a scale coefficient and an extension coefficient given by a scale value and a scale level.

In the ADPCM method, high quality sound may be produced when a sampling frequency of a scale rate is large. In the game computer, sampling frequency is determined on the basis of the data amount, the maximum value being about 16 kHz.

In operation, the ADPCM data are read from the memory by the CPU, and the scale value and the scale level of the data are detected by an ADPCM decoder. The ADPCM data are extended to PCM data, whereby sound is reproduced at a reproducing rate corresponding to the sampling frequency. The reproducing rate is controlled by a synchronizing signal generating circuit including a decoder.

Address renewal of the RAM is carried out by the CPU in accordance with a predetermined program. As another way, such address renewal is carried out in accordance with an automatic adding process. For example, if data access is performed for 32 blocks at each time, the first address of the data are specified and then the following addresses are specified by adding predetermined values to the previous address in the same order. Therefore, it is realized that the RAM is accessed continuously or accessed with some interval depending on the added value.

As described above, the conventional game computer uses BG image data generally composed of only external block sequential data, each block being indicated by 8-by-8 dots, the image is displayed by an RGB system. A variety of image data such as a natural picture illustrated with continuous colors, a moving picture and a still picture illustrated by a single color are required to be displayed, however, the conventional game computer can display only a simple image. Especially, according to the conventional technology, it is difficult to display the natural picture when the CPU has a large amount of data have to deal with.

If the conventional computer having a simple RAM deals with data other than block sequential type data, the processing speed becomes low.

The computer is required to deal with a large amount data in order to display the natural picture. When each luminance of the RGB is defined by eight bits on one screen having picture elements of 512×512, each color image needs a memory capacity of about 768 k bytes (512×512×3). Therefore, it is necessary to take full advantage of the RAM in order to keep the processing speed high when a large amount data have to be processed. It is easy to deal with such a large amount data if all the different mode data are arranged in the same manner in the RAM, however, effective use of the RAM can not be realized. If the image data are arranged in accordance with the mode thereof, different data accesses are required for each mode, so that the address process becomes complicated. Therefore, a memory access apparatus which can manage the RAM having a complicated data arrangement is required for the computer.

In the game computer, predetermined data must be processed while tens of images are displayed within a second, and therefore processing must be performed in both horizontal (HSYNC) and vertical synchronizing (VSYNC) periods. For that reason, in the conventional game computer, it is difficult to realize special graphic processes such as rotation, magnification, reduction and the like. Further, the conventional game computer uses a fader to synthesize a plurality of BG images, so that the structure is complicated and the CPU must perform much processing in the case where a variety of image data are processed and large number of BG images are synthesized. Although BG image data may be processed in both the HSYNC and VSYNC periods for single BG image of 8×8 blocks, it is difficult to avoid the disadvantages when a variety of image data are processed or large number of BG data are processed.

As for sound data processing, the conventional ADPCM has a sample frequency of 16 kHz maximum, so that sound quality is not always high. If the sample frequency is increased for producing high quality sound, data amount to be processed is increased. As a result, the above mentioned problems, namely, low speed processing and complicated data access become remarkable, if image data are treated together with PSG data and ADPCM data.

SUMMARY OF THE INVENTION

It is an object of the present invention to provide a high performance computer for processing a variety of image data together with a variety of sound data at high speed.

It is another object of the present invention to provide a computer by which multi-image synthesizing can be realized easily.

According to the invention, a sound and image processing apparatus, includes;

a central processing unit (CPU) having a memory control function for directly controlling a DRAM via a memory support, and an I/O control function for communicating the CPU through an I/O port to peripheral devices;

a VRAM in which display data are written by the CPU;

a video encoder unit;

a VDP unit for transmitting the display data from the VRAM to the video encoder unit;

an image data extension unit which includes scale-down data extending means including a reverse DCT converter, a reverse quantifying system, a Huffman coding and decoding system, and a run-length coding and decoding system and the like;

a sound data output unit including an ADPCM extension-reproducing system and a mixer for mixing a PCM output, a PSG output and an external sound data; and a control unit for reading image data, sound data, and program data through a predetermined interface from an external recording device, judging priority of the read data dot-by-dot, transmitting a result of the judgement to the video encoder unit, transmitting a scale-down image data to the image data extension unit, and transmitting sound data to the sound data output unit;

wherein the video encoder unit superimposes a VDP image, natural picture image and moving image supplied from the VDP unit, control unit and image data extension unit, respectively, and performs color pallet reproducing, special effect processing, and D/A conversion processing.

BRIEF DESCRIPTION OF THE DRAWINGS

FIG. 8 is an explanatory diagram illustrating a bit-structure in the RAM in a 256-color mode.

FIG. 14 is a table showing memory specifications in relation to a DRAM structure for the preferred embodiment.

FIG. 18 is an explanatory diagram showing "AFFIN" conversion (reverse conversion).

FIGS. 19A and 19B are configuration diagrams for the AFFIN conversion coefficient register and the AFFIN conversion center coordinate register used in the preferred embodiment, respectively.

FIG. 20 is an explanatory diagram showing a process in the case where reduction rate of the image changes for each raster.

FIG. 23A is a diagram showing configuration of a microprogram control register of the preferred embodiment.

FIG. 23B is a diagram showing a configuration of a microprogram load address register of the preferred embodiment.

FIG. 23C is a diagram showing a configuration of a microprogram data register of the preferred embodiment.

FIG. 23D is an area table of a microprogram storage area of the preferred embodiment.

FIG. 24 is a diagram showing an actual configuration of the microprogram data register shown in FIG. 23C.

FIG. 36 is an explanatory diagram showing address arrangements the BAT for characters represented on a virtual screen.

FIG. 37 is a diagram showing a configuration of a sub picture endless scroll set register.

FIG. 38 is an explanatory diagram showing a display example of main and subpictures.

FIG. 43A is a diagram showing the configuration of a transfer control register for the image data extension unit.

FIG. 43B is a diagram showing the configuration of data start address register for the image data extension unit.

FIG. 43C is a diagram showing the configuration of a transfer start raster register for the image data extension unit.

FIG. 43D is a diagram showing the configuration of a transfer block number register for the image data extension unit.

FIG. 43E is a diagram showing the configuration of a raster monitoring register for the image data extension unit.

FIG. 45 is a flow chart showing an algorithm for processing horizontal scroll in the preferred embodiment.

FIG. 48 is a diagram showing configurations of a color pallet RAM of the preferred embodiment.

FIG. 49 is a diagram showing a configuration of a color pallet address used for the preferred embodiment.

FIG. 50 is a table showing configurations of color pallet data separated from each other in unit.

FIG. 52 is an explanatory diagram showing a chromakey process in the preferred embodiment.

FIG. 53 is a table showing data chromakey processes of the VDP unit, control unit and image data extension unit.

FIG. 54 is a block diagram showing a cellophane function used in the preferred embodiment.

FIG. 57 is an explanatory diagram showing a front cellophane function.

FIG. 58 is an explanatory diagram showing a back cellophane function.

FIG. 59 is a diagram showing an image displayed in a non-interlace mode.

FIG. 68 is a table showing a relation among the ADPCM data, variation values and level changing value.

FIG. 69 is a table showing a relation between scale levels and scale values.

DETAILED DESCRIPTION OF THE INVENTION

Hereinafter, a computer apparatus of a preferred embodiment according to the present invention will be explained in conjunction with appended drawings.

According to the invention, three types of image data sequence processes, "external block sequence," "external dot sequence" and "internal dot sequence," are carried out. In the apparatus, YUV color data are used when the number of colors to be displayed is more than a predetermined number, and a color pallet is used when the number is less than the predetermined number. The three types sequence processes are now explained in accordance with a YUV method.

(1) EXTERNAL BLOCK SEQUENCE PROCESS

Figure 1:
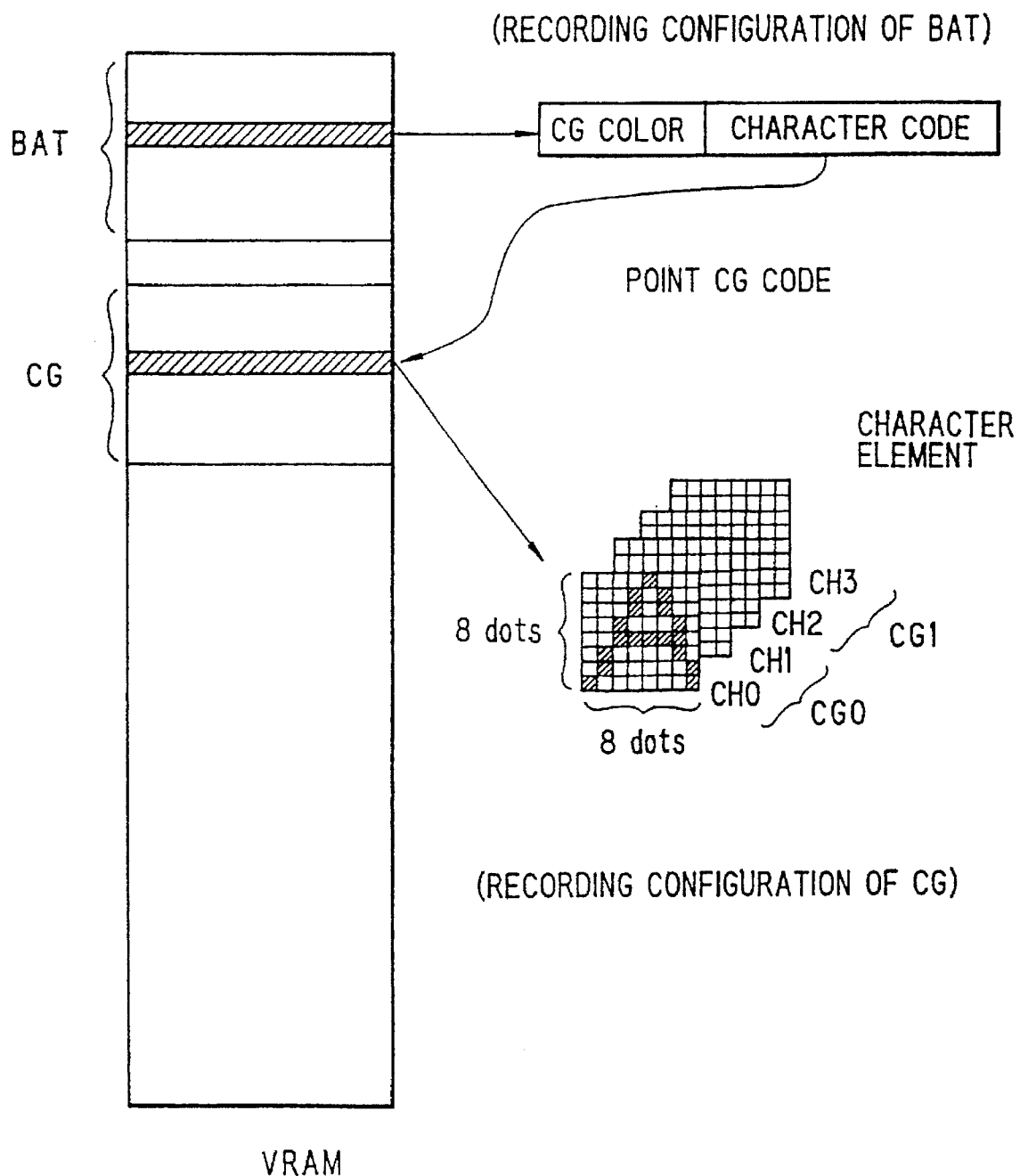
FIG. 1 is an explanatory diagram illustrating structure of BAT and CG used in a conventional computer system.
Figure 2:
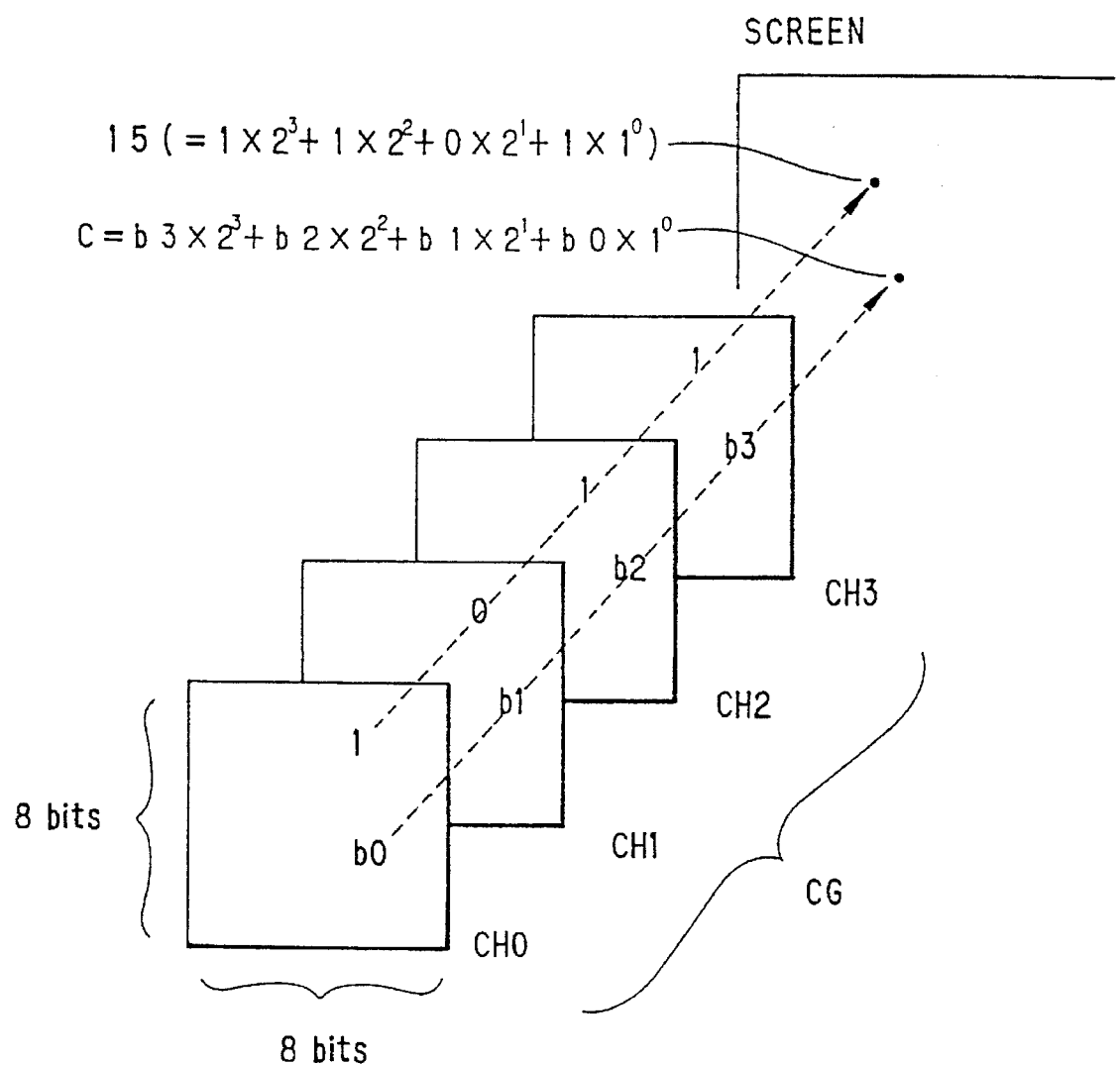
FIG. 2 is an explanatory diagram showing operation of the conventional computer system.
Figure 3:
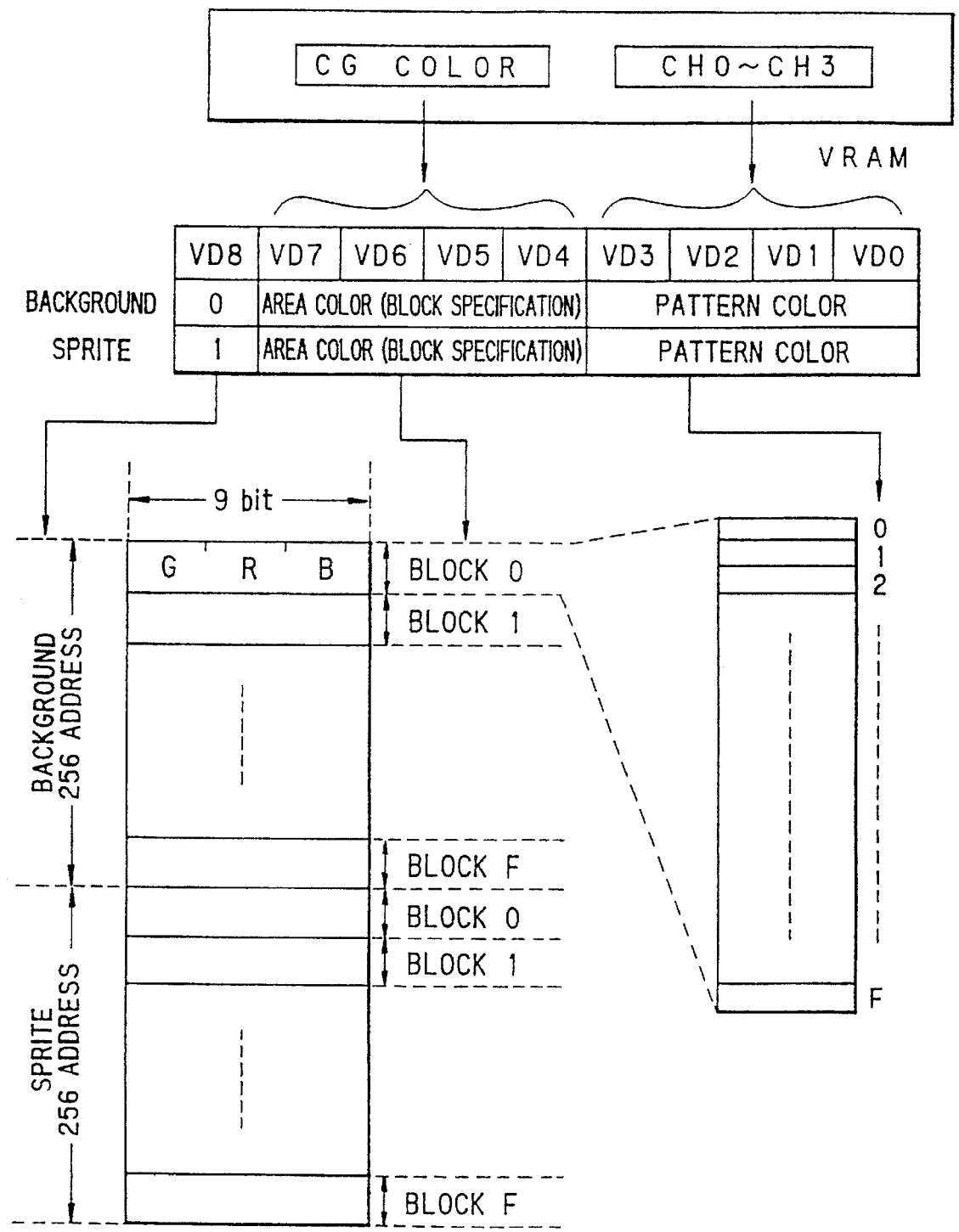
FIG. 3 is an explanatory diagram illustrating a relation between a color pallet and BAT/CG in the conventional computer system.
Figure 4:
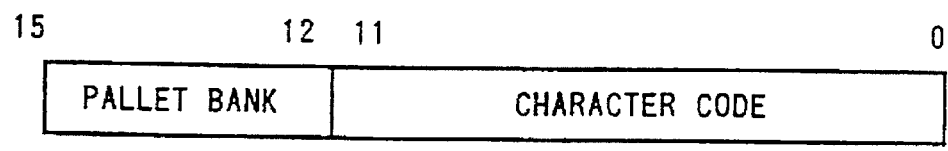
FIG. 4 is a structural diagram of BAT in the conventional computer system.

FIG. 4 shows a BAT (background attribute table) which is separated by a pallet bank and a character code. The pallet bank stores data corresponding to a bank stored in a video encoder, and the data in pallet bank are used for selecting a color from in a color pallet having 256 colors. The color pallet includes color groups each composed of, for example, 16 colors, the color groups being selected in accordance with data in the pallet bank. The pallet bank is effective in a 4 color mode and 16 color mode only, so that other color modes are neglected to the pallet bank. The character code is used for specifying a CG (character generator), whereby a CG address is defined by the character code and data in a CG address register. Each character pattern is defined by 64 dots of "8×8" by the CG. A bits number "n" required for representing each dot is given by the following equation, where "m" colors are used simultaneously to display the dot. The numbers of dots required to define a color for one dot are different depending on the color modes.

n=Log$_2$ m

When "m" is indicated by 4, 16, 256, 64 k or 16M bits color data, "n" is indicated by 2, 4, 8, 16 and 24 bits data. A RAM is arranged in address by 16 bits (=1 word), so that 2 dots are indicated by 32 bits when "m=16M".

Figure 5:
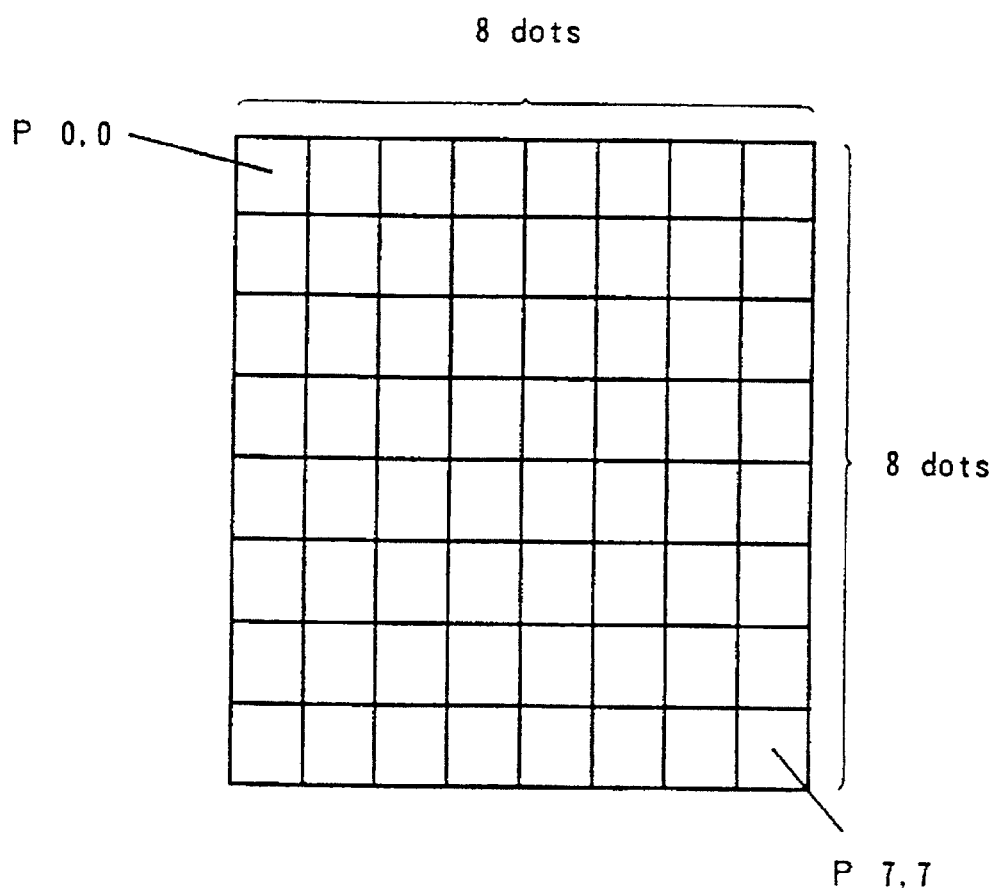
FIG. 5 is a structural diagram of a character used in the conventional computer system.

In FIG. 5, "i, j" of P$_{i,j}$ means a dot position (line, column) of the character and "p" means a pallet number.

Figure 6:
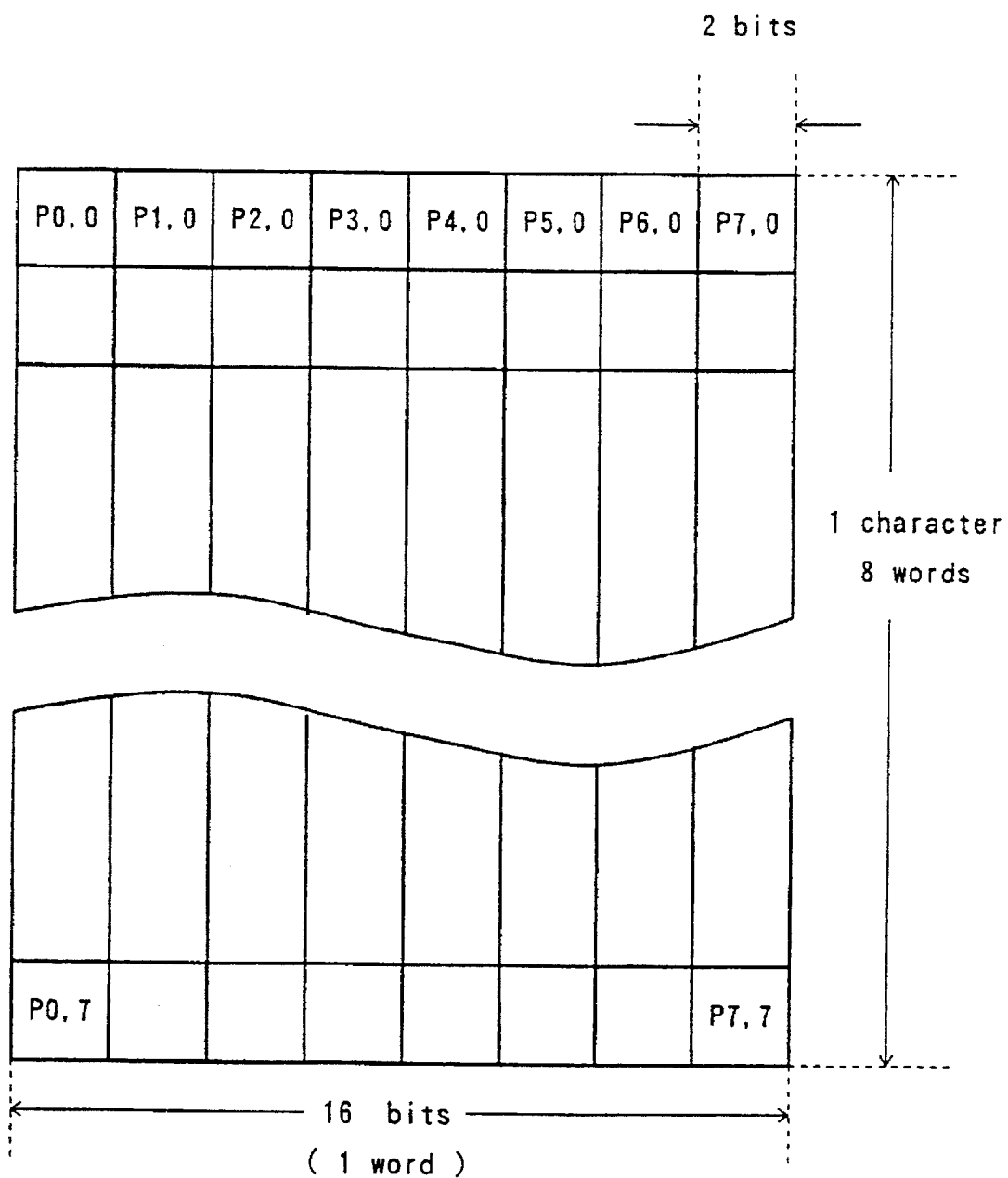
FIG. 6 is an explanatory diagram illustrating a bit-structure in a RAM in a 4 color mode.
Figure 7:
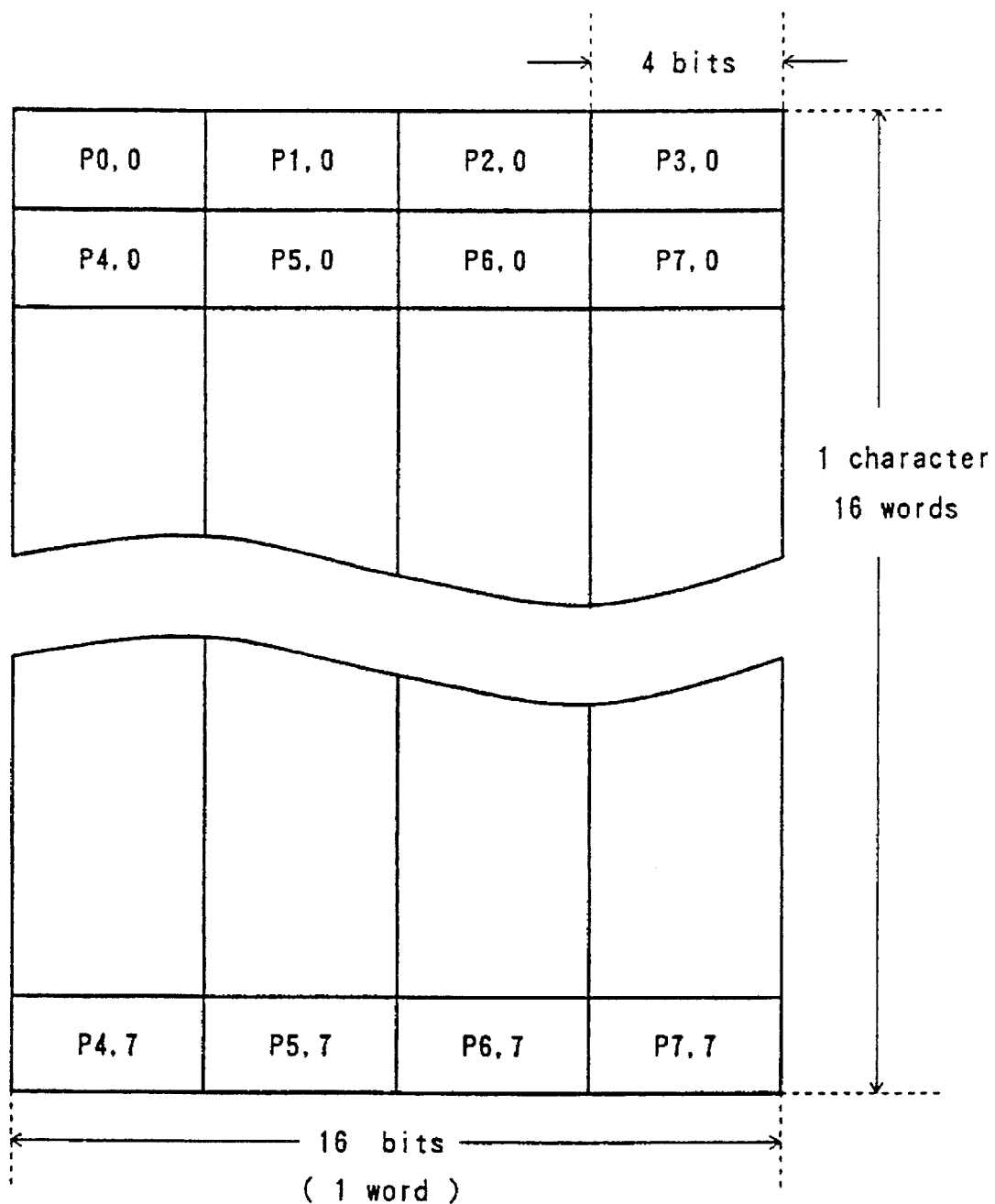
FIG. 7 is an explanatory diagram illustrating a bit-structure in the RAM in a 16-color mode.

FIGS. 6, 7 and 8 show structure of the RAM in 4, 16 and 256 colors modes, respectively. The structures show positions on the color pallet, which are used to specify a color to be displayed. The color pallet has a capacity of 256 colors, so that a color to be displayed may be selected directly in the 256 color mode. In other words, the pallet bank is not required in the 256 color mode.

Figure 9:
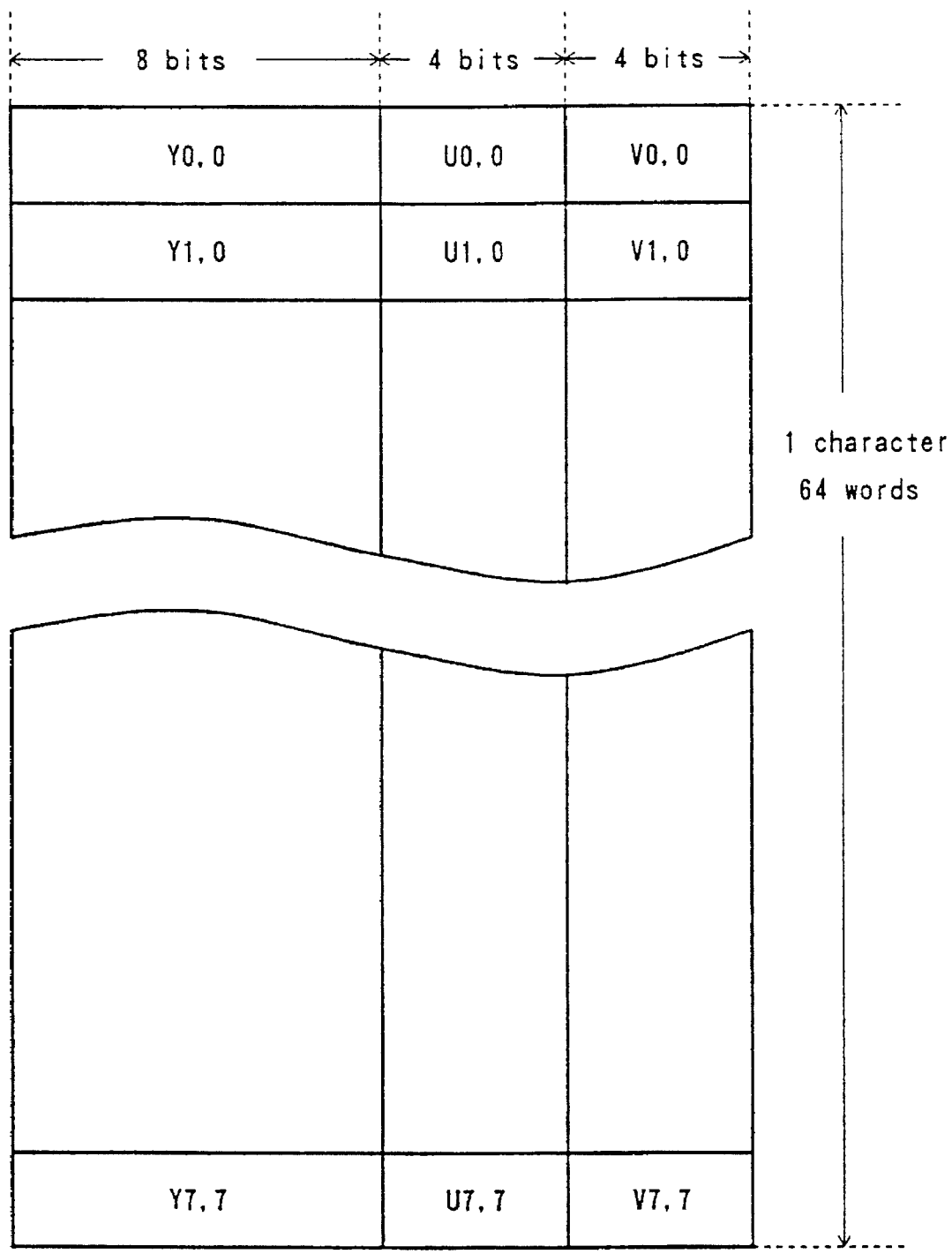
FIG. 9 is an explanatory diagram illustrating a bit-structure in the RAM in a 64 k-color mode.
Figure 10:
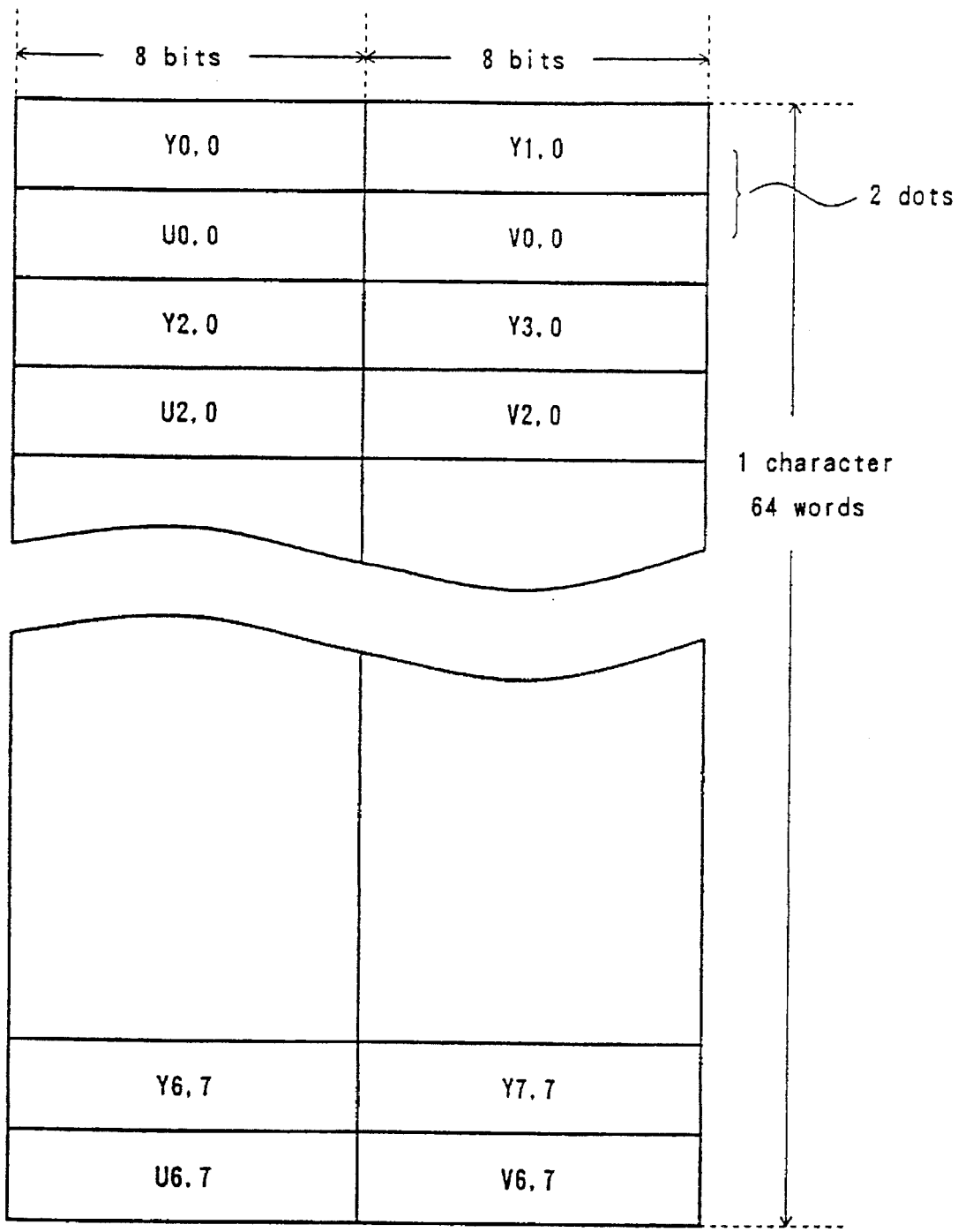
FIG. 10 is an explanatory diagram illustrating a bit-structure in the RAM in a 16M-color mode.

FIGS. 9 and 10 show structure of the RAM in 64K and 16M color modes, respectively. In these color modes, color data are specified directly without using the color pallet. In the 64K color mode, one dot color data are specified by YUV (Y of 8 bits, U of 4 bits and V of 4 bits). On the other hand, in the 16M color mode, two dots color data are specified by YYUV (Y of 8 bits, Y of 8 bits, U of 8 bits and V of 8 bits). The first "Y" represents brightness of a first dot, the second "Y" represents brightness of a second dot and "U" and "V" represent common color shift of the first and second dots.

On a natural picture, seccessive dots are not very different in color from each other, so that the next dots may be separated by adjusting the brightness thereof. Thus, a character pattern may be defined by small data. As a result, the character pattern may be defined by 64 word data which is the same as that of 64 k color mode.

(2) EXTERNAL DOT SEQUENCE PROCESS

The external dot sequence process is basically equal to the external block sequence process, however, image data are processed dot-by-dot not block-by-block (character-by-character). Therefore, only one line in the tables shown in FIGS. 9 and 10 is used to define the CG. In 16M color mode, two lines are used to define two dots. The external dot sequence process is especially good for using the memory when a color is continuously changed with time or with position on an image. According to the external block sequence process, which uses many color modes, pictures may be displayed as if they are continuously changed in color. In this case, "64× (number of CG)" words are required in order to display the image in which each dot has independent color data. On the other hand, according to the external dot sequence process, "2× (number of CG)" words are sufficient in the 16M color mode and "1× (number of CG)" words are sufficient in the 64K color mode in order to display the image in which each dot has independent color data.

(3) INTERNAL DOT SEQUENCE PROCESS

The internal dot sequence process is different from the external block sequence process (1) and external dot sequence process (2). That is, according to the internal dot sequence process, a natural picture supplied from an image scanner or the like is directly displayed by a bit-map technique. In this process, the image data are not required to be defined by a user, so that the BAT is not required.

In this data system, five color modes of 4, 16, 256, 64K and 16M are used, and colors are defined for each dot in the same manner as the external dot sequence process. In the 16M color mode, two dot data may be defined by two words of YYUV. Therefore, 16M colors can be defined by the CG having a small capacity, and repeatability of the image is not seriously affected by the process. The internal dot sequence process is especially useful for the case where a natural picture is displayed and each dot of the image has independent color data.

Figure 11:
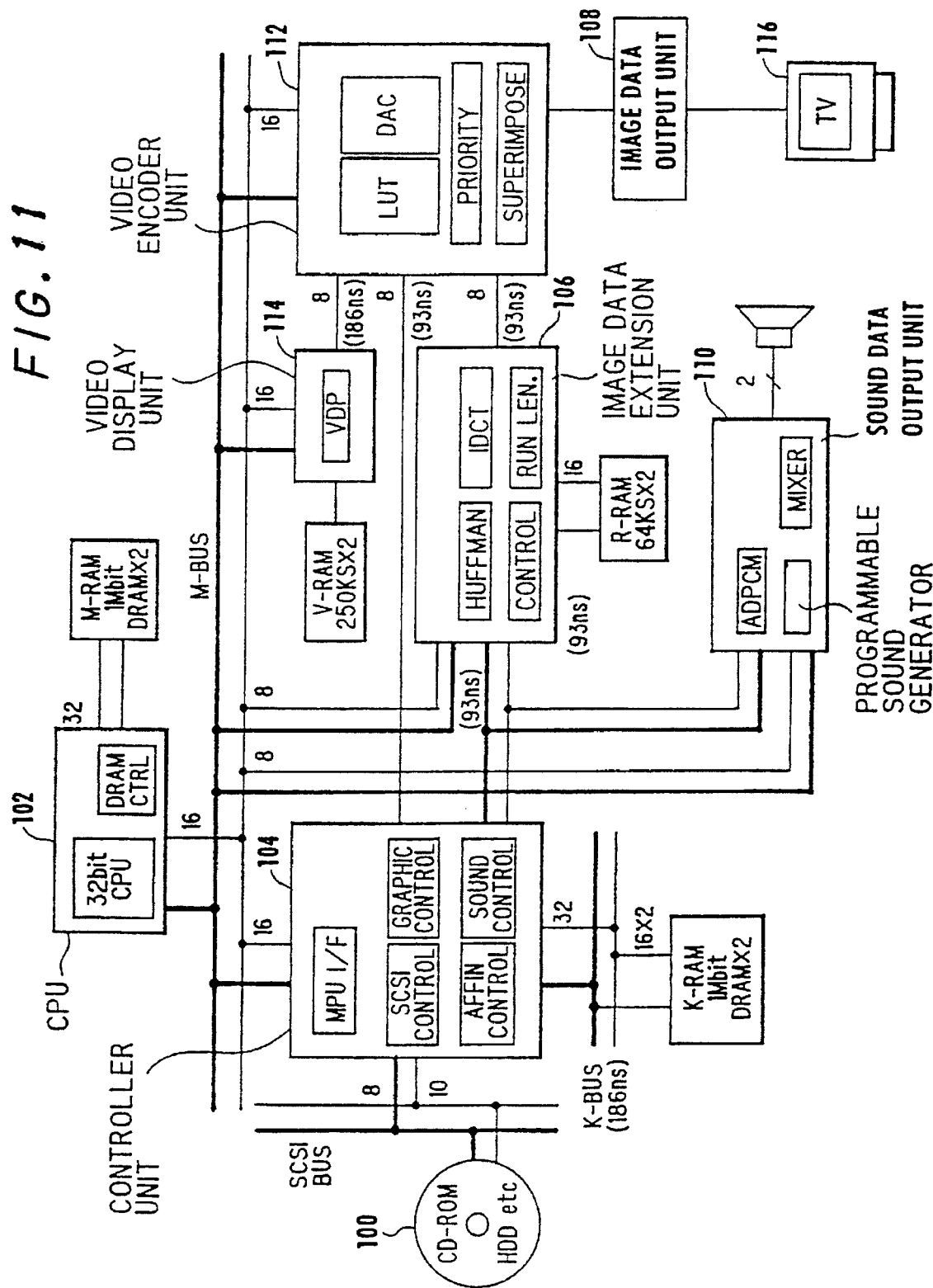
FIG. 11 is a block diagram illustrating a computer system of a preferred embodiment according to the invention.

FIG. 11 shows an information processing system of the preferred embodiment. The information processing system includes a game-software recording medium 100 such as a CD-ROM, a CPU 102 of 32-bit type, a control unit 104 for mainly controlling transmission of image and sound data and interfacing most devices to each other, an image data extension unit 106, an image data output unit 108, a sound data output unit 110, a video encoder unit 112, a VDP unit 114 and a TV display 116. CPU 102, control unit 104, image data extension unit 106 and VDP unit 114 are provided with their own memories K-RAM, M-RAM, R-RAM and V-RAM, respectively.

CPU 102 directly controls a DRAM via a memory support, and perform communication through an I/O port to peripheral devices, that is, an I/O control function. CPU 102 includes a timer, a parallel I/O port and a interruption control system. VDP unit 114 reads display data which have been written in the VRAM by CPU 102. The display data are transmitted to video encoder unit 112 whereby the data are displayed on the TV display 116. VDP unit 114 has at most two screens each composed of a background image and a sprite image, which are of an external block sequence type of 8×8 blocks.

Control unit 104 includes an SCSI controller to which image data and sound data are supplied through an SCSI interface from CD-ROM 100. Data supplied to the SCSI controller is buffered in the K-RAM. Control unit 104 also includes a DRAM controller for reading data which have been buffered in the K-RAM at a predetermined timing. In control unit 104, priority Judgement is carried out dot-by-dot for image data of natural background, and an output signal is transmitted to video encoder unit 112.

Control unit 104 transmits image moving data (full color, pallet), which has been reduced in scale, to image data extension unit 106 whereby the scale-down data are extended. The extended data are transmitted from image data extension unit 106 to video encoder unit 112. Image data extension unit 106 includes a reverse DCT converter, a reverse quantifying means, a Huffman coding and decoding means and a run-length coding and decoding means. That is, the image data extension unit 106 performs DCT transformation for a natural moving picture, and treats scale-down data encoded by the Huffman coding method and run-length scale-down data for moving animation image and the like.

Video encoder unit 112 superimposes VDP image data, natural background image data and moving image data (full color, pallet) transmitted from VDP unit 114, control unit 104 and image data extension unit 108. Video encoder unit 112 performs color pallet reproducing, special effect processing, D/A converting and the like. Output data of video encoder unit 112 are encoded into an NTSC signal by an Image Data Output Unit.

ADPCM sound data recorded in CD-ROM 100 are buffered in the K-RAM and then transmitted to sound data output unit 110 by control unit 104. The sound data are reproduced by sound data output unit 110.

Figure 12:
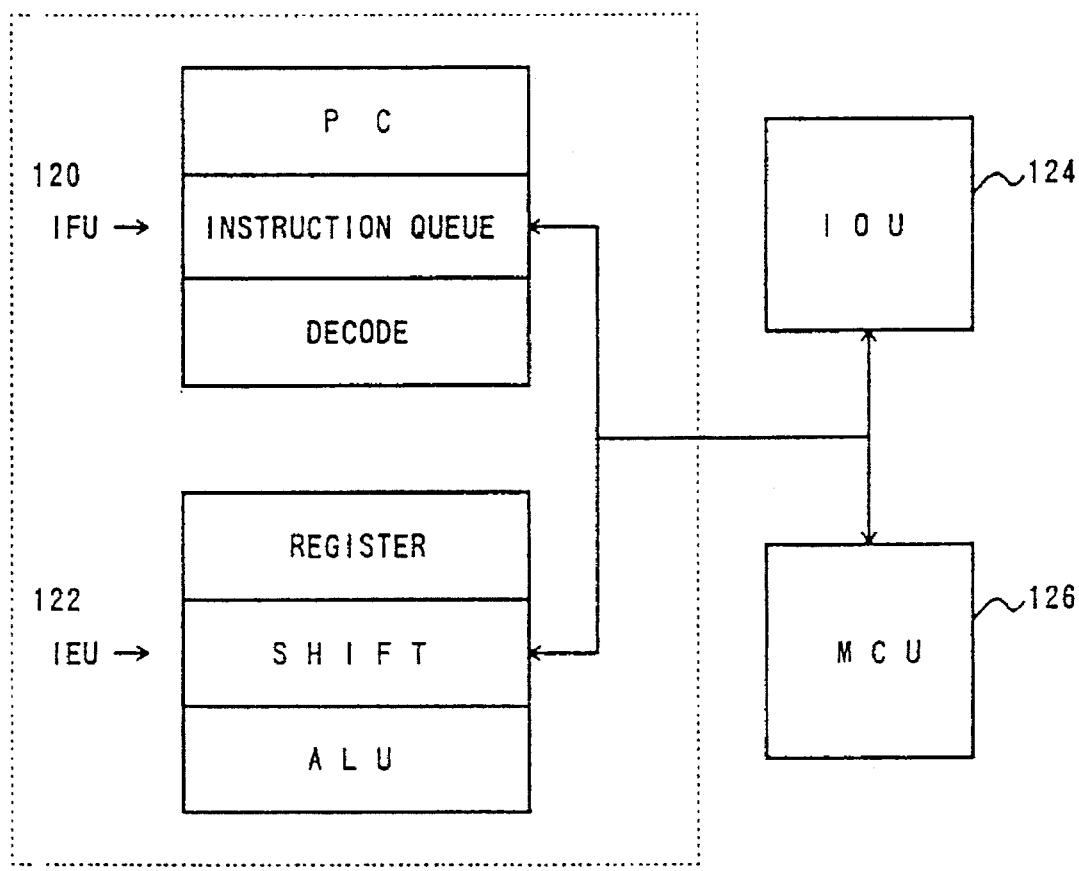
FIG. 12 is a block diagram illustrating a CPU of the preferred embodiment.

FIG. 12 shows the internal architecture of CPU 102. The architecture includes an instruction fetch unit (IFU) 120, an instruction execution unit (IEU) 122, an I/O control unit (IOU) 124 and a memory control unit (MCU) 126. MCU 126 generates all control signals for a memory port to control the memory port directly connected to the main memory DRAM. This architecture adopts "eight-bit byte addressing architecture," whereby all data are treated for a byte or integral multiples of byte. In this system, one word is indicated by 4 bytes (32 bits).

The DRAM is composed of some memory arrays. The number of words (depth in address direction) in each array is defined by the number of words (depth in address direction in a chip). For example, a DRAM of "256×n" has memory arrays each having 256 k words. The number of chips composing the array is defined by the number of data ports of the DRAM.

Figure 13:
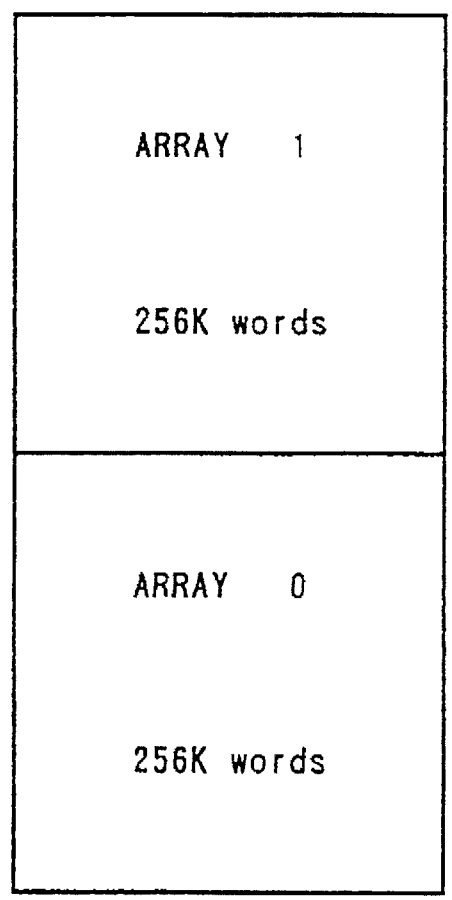
FIG. 13 is a memory port map of the CPU shown in FIG. 12.

FIG. 13 shows the DRAM of 256 k-word size.

FIG. 14 shows specifications for different types of DRAMs. In the preferred embodiment, different types of DRAMs 64 k×16, 128 k×8, 256 k×4, 256 k×16, 512 k×8 and the like may be used. Such memory types may be determined by a memory determination register. These memories are controlled by the CPU as far as the memory system information is supplied to the MCU in advance.

If such a memory system is used in a conventional apparatus, an IC for decoding data is required. The computer system of the preferred embodiment has a register in the memory controller (MCU) whereby the memory may be specified in structure and a refresh timer may be set by a predetermined program. The register may be addressed in accordance with a special register transmitting instruction.

Figure 15A:
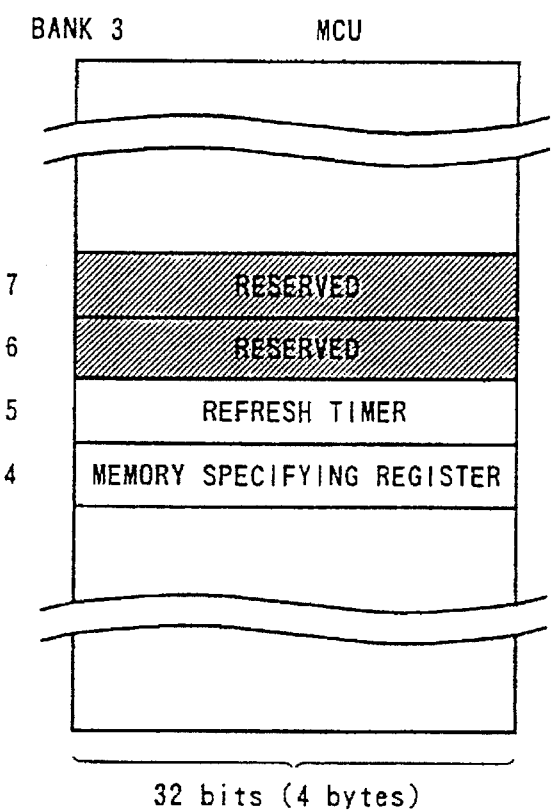
FIG. 15A is an explanatory diagram illustrating a structure of an MCU used in the preferred embodiment.
Figure 15B:
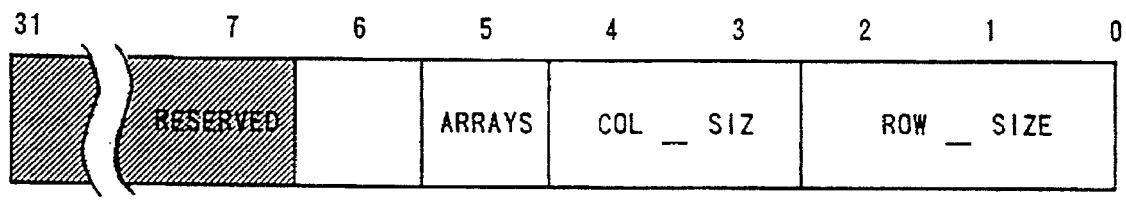
FIG. 15B is an explanatory diagram illustrating a structure of a memory specifying register in the MCU shown in FIG. 15A.

The register is mapped in a special hardware register region (bank 3, address 4–7), as shown in FIG. 15A. A memory specifying register region takes 32 bits (4 bytes) at the address 4 in the bank 3. An area for instructing refresh time is taken at the address 5 in the same bank. The contents of the memory specifying register is shown as follows and in FIG. 15B.

| ROW_SIZE | |
|---|---|
| 000 | 8 bits |
| 001 | 9 bits |
| 010 | 10 bits |
| 011 | 11 bits |
| 100 | 12 bits |
| COL_SIZE (column size) | |
| 00 | 8 bits |
| 01 | 9 bits |
| 10 | 10 bits |
| 11 | 11 bits |
| ARRAYS (array size) | |
| 0 | 1 array |
| 1 | 2 arrays |
| REFRESH_EN (refresh enable) | |
| 0 | refresh disable |
| 1 | refresh enable |

The DRAM system is defined by the combination of "ROW_SIZE" and "COL_SIZE". For example, when the "ROW_SIZE"=2 (=(010)$^2$ that is, 10 bits) and "COL_SIZE"=1 (=(01)2, that is, 9 bits), a DRAM of 512 k×8 (ROW×COL=10×9) is instructed to be set as shown in the table of FIG. 14. Further, 1 array and 4 chips are instructed to be set when "ARRAYS=0".

Next, refresh cycle operation of the system will be explained in conjunction with FIG. 16. If the memory is not accessed in a predetermined time, data stored in the memory is erased. For the reason, it is necessary that the memory is refreshed (that is, the memory is electrically activated) if the memory is not accessed in the predetermined time. The MCU has a refresh timer which includes a frequency divider for generating a timer clock having one thirty-second (1/32) the frequency of system clock, a refresh timer register and a timer counter. Timer clock signals are supplied to the timer counter. Refresh cycle (time) varies in dependence of structure of the DRAM, and is programmable.

Figure 16:
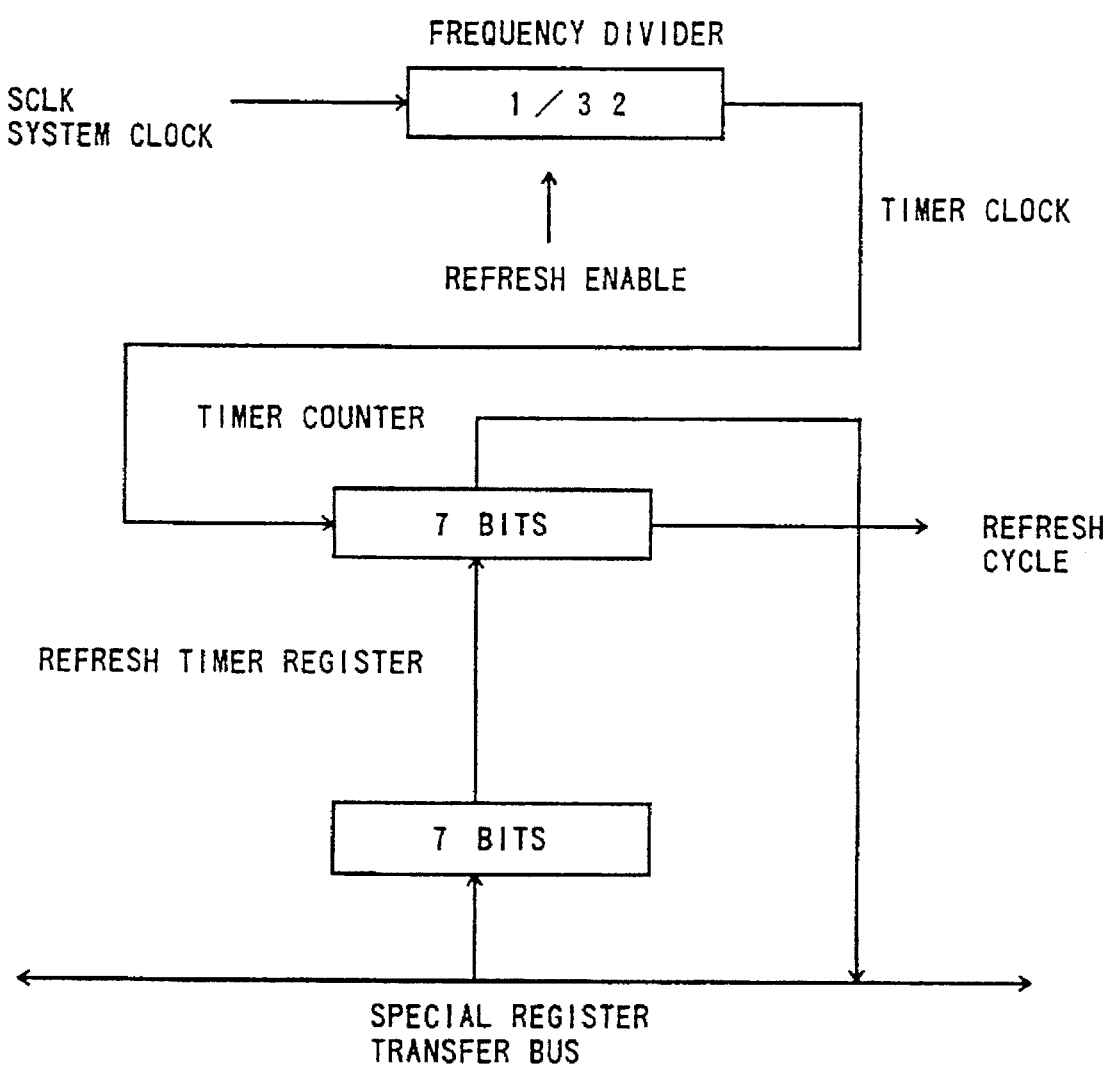
FIG. 16 is an explanatory diagram showing an architecture of a refresh timer used in the preferred embodiment.

The memory refresh operation is controlled by data stored in 0 to 6 bits regions of the refresh timer register, as shown in FIG. 16. The control operation is automatically carried out by the ports. When the memory specifying register provides a refresh enable instruction, the refresh cycle is determined in accordance with contents of the timer counter and refresh timer register, whereby the memory is refreshed at predetermined intervals.

When the CPU writes data in the refresh timer (bank 3, address 5), the data are written in the timer register. On the other hand, when the CPU reads data from the refresh timer, data in the timer counter are read. The timer register assumes a zero state after reset. Refresh operation is required at each time when the timer counter finishes counting (0×7 F, that is 7 F of hexadecimal notation). Until the timer counting is finished, the timer counter continues to count for each timer clock cycle. When timer counting is finished, the timer counter is initialized in accordance with data stored in the refresh timer register.

In order to assure that the DRAM on a memory port is refreshed at the rated timing, figures to be used for controlling a period of memory refresh cycle are loaded in the refresh register. Figure data composed of DRAM refresh period, DRAM refresh cycle and clock period of the timer clock are programmed in the refresh timer register. The figure data are given by the following equations.

REFRESH TIMER=0×7F−CYCLE NUMBER

CYCLE NUMBER=REFRESH INTERVAL/CLOCK PERIOD

REFRESH INTERVAL=REFRESH PERIOD/REFRESH CYCLE NUMBER

The MCU uses a "CAS before RAS refresh", so that address data are not required to be supplied to the DRAM for each refresh cycle.

Figure 17:
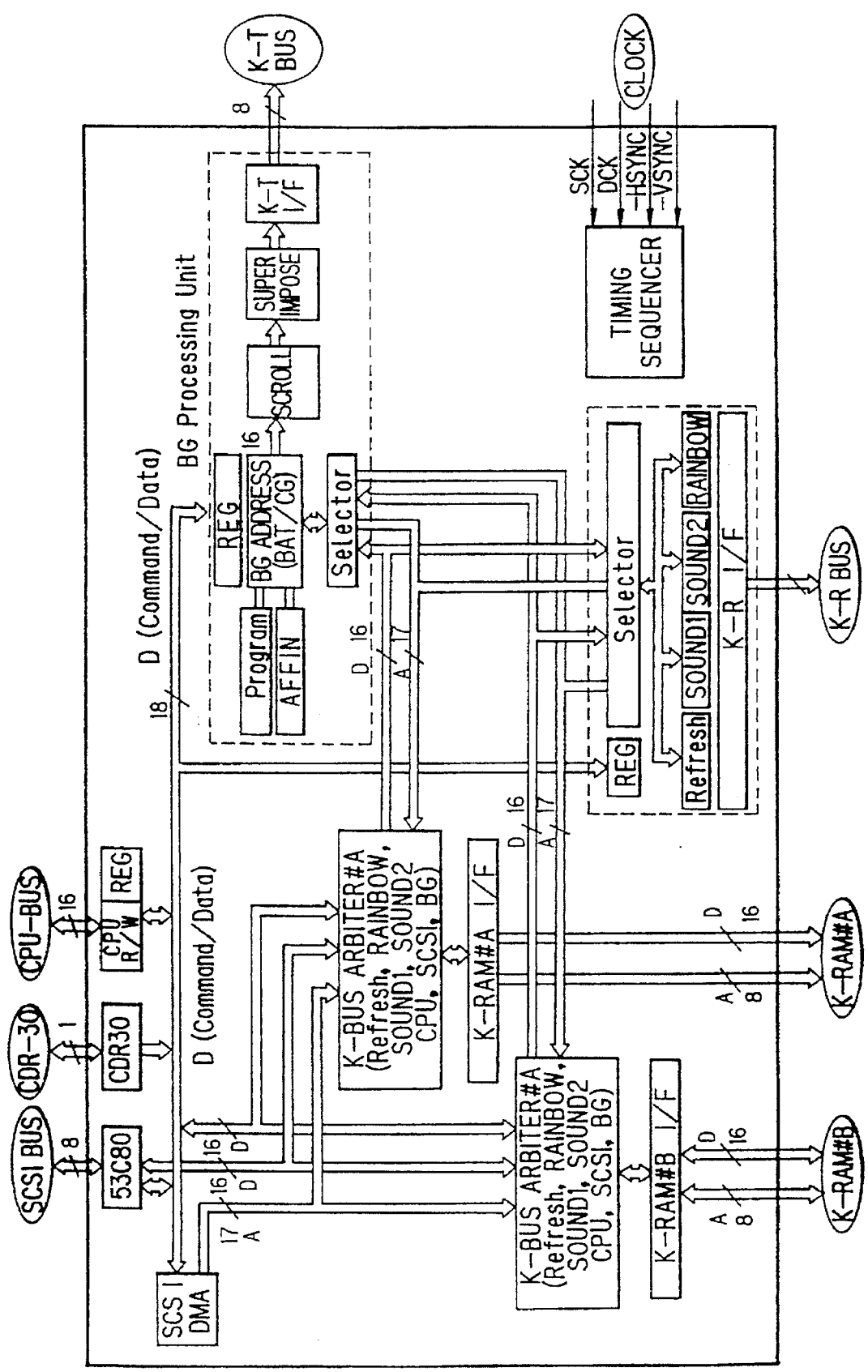
FIG. 17 is a block diagram illustrating detail of a control unit used in an image processing unit of the preferred embodiment.

FIG. 17 shows the control unit 104, which performs an internal dot sequence process, an external dot sequence process, an "AFFIN" transformation and a microprogram process for accessing the RAM. In the control unit 104, a variety of data are read from the CD-ROM 100 by the SCSI controller, the read data are stored in the K-RAM. The K-RAM can store a variety types of data such as 8 bits data and 16 bits data.

The AFFIN transformation (reverse formation) is a process for extending, reducing or rotating a picture, centering around a point (X0, Y0), as shown in FIG. 18. The AFFIN transformation is carried out as follows:

$A = \alpha \cos\theta$ $B = -\beta \sin\theta$ $C = \alpha \sin\theta$ $D = -\beta \cos\theta$ $\alpha$=reduction rate in X direction $\beta$=reduction rate in Y direction $\theta$=rotation angle (X0, Y0): center coordinate (X1, Y1): coordinate after reverse transformation (X2, Y2): coordinate before reverse transformation When a reduction rate α is "n", X direction length is one n-th (1/n). As to the rotating process, the position of the picture varies depending on where the rotation center is located. The coefficients A, B, C and D for AFFIN transformation is set in a "BG AFFIN transformation coefficient register", and the center coordinate for rotation are set in "BG AFFIN transformation center coordinate X register" and "BG AFFIN transformation center coordinate Y register".

FIGS. 19A and 19B show configurations of the registers above mentioned, respectively. The coefficients A, B, C and D and the center coordinate (X0, Y0) correspond to parameters in the formulas shown in the penultimate paragraph. In each of the registers, figures before the decimal point of the coefficient are arranged at the first 8 bits and figures after the decimal point are arranged at the last 8 bits. The center coordinate is defined in accordance with the coordinate of an original image. Each of the registers keeps a value set therein until the following value is set. Each of the registers becomes valid after the following HSYNC.

FIG. 20 shows an image reducing process. In this process, a straight road illustrated on a virtual screen is reduced by the control unit and the reduced road is displayed on a video screen (real screen). On the video screen, the top of the road is reduced to one fourth and the bottom is displayed at the same magnification, that is the picture (road) is displayed in perspective. In this case, a reduction rate "α" of the X direction is calculated for each raster in accordance with the following equation.

$\alpha = 3 \times (R-r)/R + 1$

In this equation, "R" shows a raster number "−1", and "r" shows a number which is decreased one by one from "R" so that the number becomes 0 before the last raster is displayed. That is, "α" is 4 when the top portion of the picture is displayed, and is 1 when the bottom of the picture is displayed. In this case, no rotation is carried out, that is rotation angle θ is 0 and the center coordinate is (X0, Y0). Therefore, the AFFIN transforming coefficients A, B, C and D are given by the following equations, respectively.

Figure 21:
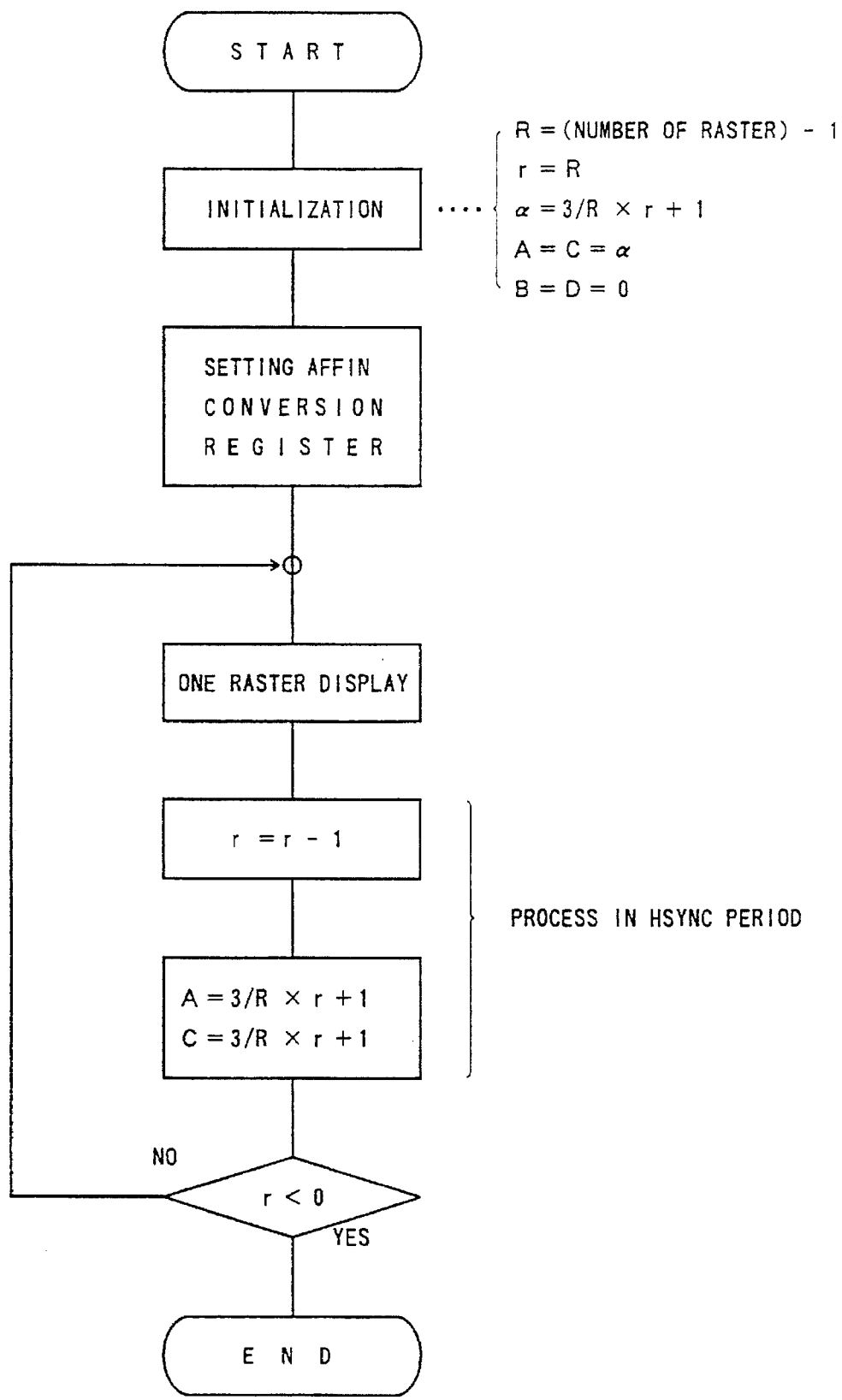
FIG. 21 is a flow chart showing the steps of the process shown in FIG. 20.

$A = \alpha \cos\theta = \alpha$ $B = -\beta \sin\theta = 0$ $C = \alpha \sin\theta = \alpha$ $D = -\beta \cos\theta = 0$ FIG. 21 shows a flow chart of the image reducing operation mentioned before. In this loop, "r", "A" and "C" are calculated within the HSYNC period, however, some interruptions actually occur in HSYNC. Therefore, the calculations are carried out within the interruption periods. Such a process is implemented for displaying pictures having different reduction rate. If the screen is reduced in size uniformly, a reduction rate "α" given at the initial process is set in the BG AFFIN transformation register. This process may be also adapted for a rotation operation.

In the control unit 104, an arithmetic process for accessing the K-RAM is programmed in a controller chip whereby a user may set access timing by using the register. In this invention, VSYNC, HSYNC and DCK (dot clock) may be used as control signals.

Figure 22:
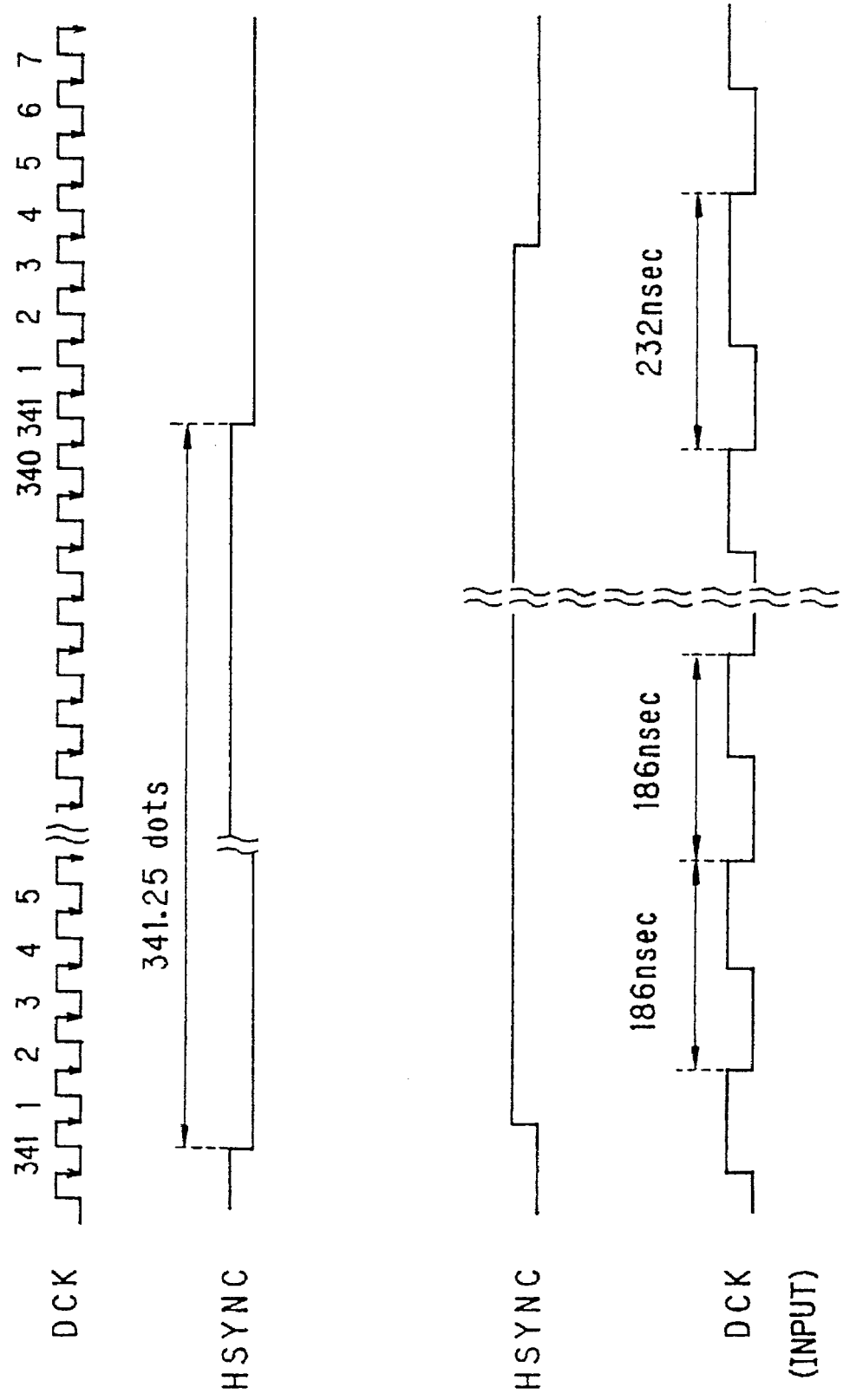
FIG. 22 is a timing chart showing operational relation between DCK and HSYNC for the preferred embodiment.

FIG. 22 shows a time relation between HSYN and DCK, the DCK of about 341 cycles being included in one HSYNC period. In accordance with the dot clock cycle, access operation is carried out. The microprogram is loaded into a controller chip in accordance with a microprogram load address register. That is, when an initial address is specified in the register, the microprogram begins to be loaded. At this time, it is necessary that an MPSW in the microprogram control register be set to be "0". After the loading of he microprogram, the microprogram begins operating when the MPSW is set to be "1". The microprogram data register specifies which cycle is used for the access.

FIGS. 23A, 23B and 23C show configurations of the microprogram control register, microprogram load address register and microprogram data register, respectively.

FIG. 24 shows an actual configuration of the microprogram data register. The microprogram data register specifies content of K-RAM access address generation, the timing of the generation and the direction to which data are transmitted.

For the external block sequence type data and external dot sequence type data, the BAT data are read first and then the CG data are read using two dots. Description data are divided into two blocks (A bus and B bus), and includes as shown in FIG. 24 the following contents:

(1) process/non-process (NOP/–NOP)
(2) BG screen number (0 to 3)
(3) rotation/non-rotation
(4) SAT/CG (BAT/–CG)
(5) BAT indirect CG/direct CG (indirect/–direct CG)
(6) CG offset The controller chip supplies BG screen data dot-by-dot in synchronization with HDISP (horizontal display period). On the other hand, the microprogram operation is started and ended in synchronization with BG DISP (BG display period).

Figure 25:
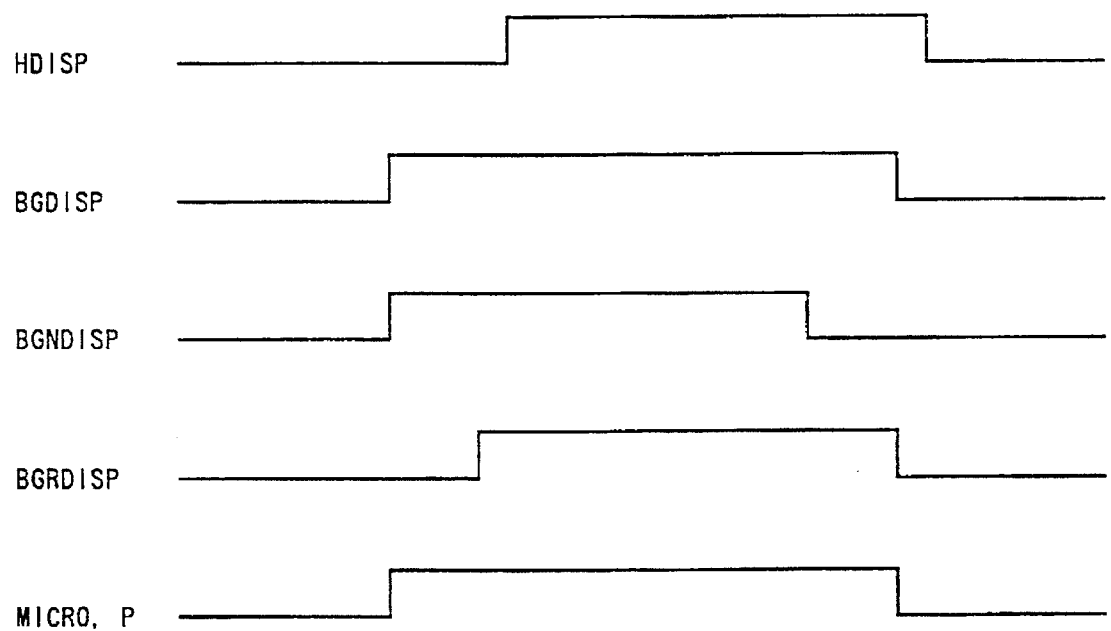
FIG. 25 is a timing chart showing operation of the microprogram for the preferred embodiment.

As shown in FIG. 25, the rotation process and non-rotation process have different delay times, so that a non-rotation screen is processed in synchronization with a BGNDISP and a rotation screen is processed in synchronization with a BGRDISP. Therefore, the microprogram operates in an MICRO.P period.

Data access timing of a graphic controller chip of control unit 104 is controlled by the microprogram in the control unit 104. The graphic controller chip may use five modes of 4 color, 16 color, 256 color, 64K color and 16M color for each BG image, the BG images being able to be displayed simultaneously. That is, the image data in the different color modes can be displayed simultaneously. Operation in 8-dot clock cycle is written in each of two K-BUS units independently in accordance with the microprogram, so that the buses operate step by step independently and such that the 8-dot clock cycle is repeated.

Figure 26:
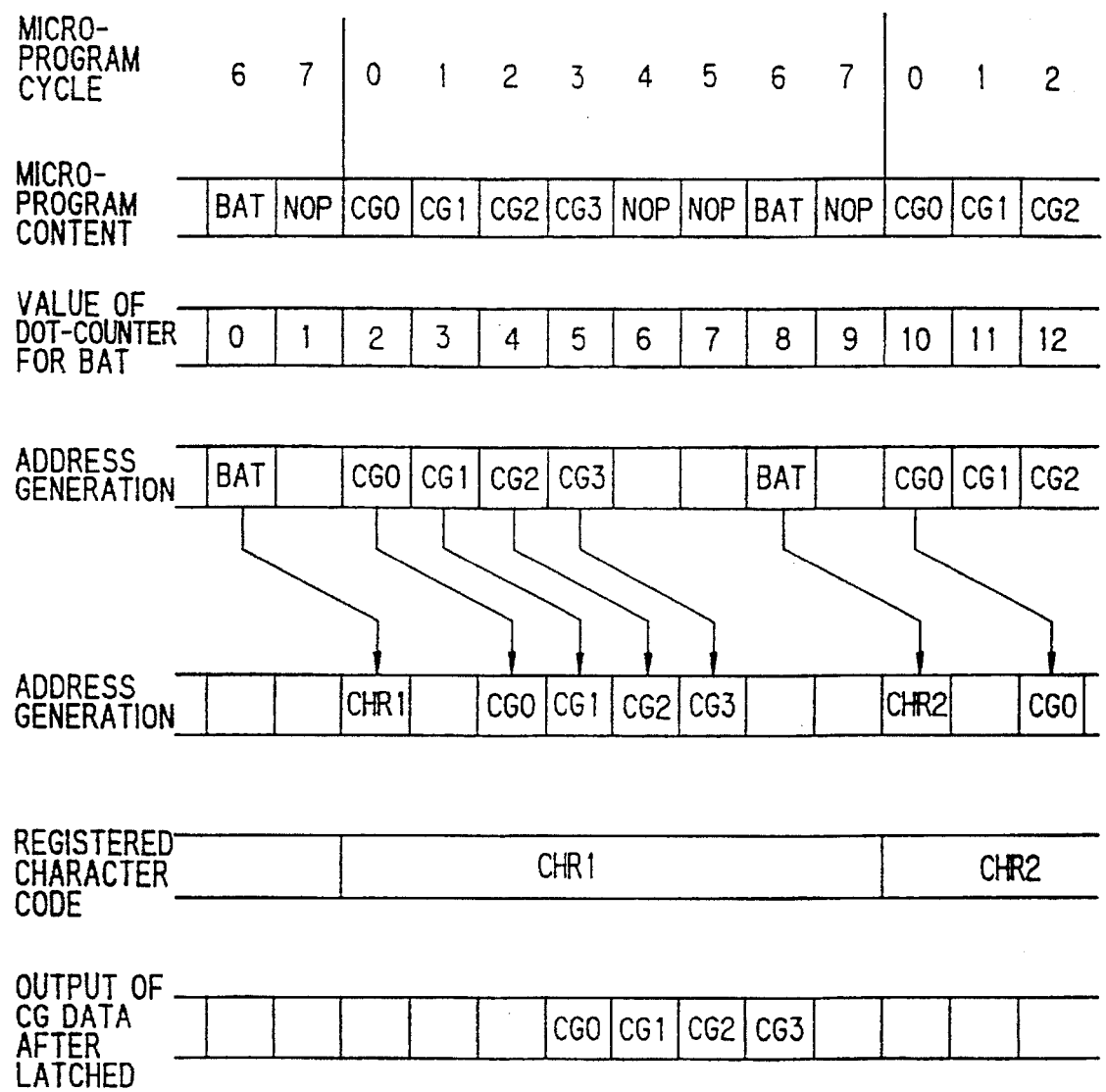
FIG. 26 is a time table showing address generating process by the microprogram of the preferred embodiment.
Figures 27, 28:
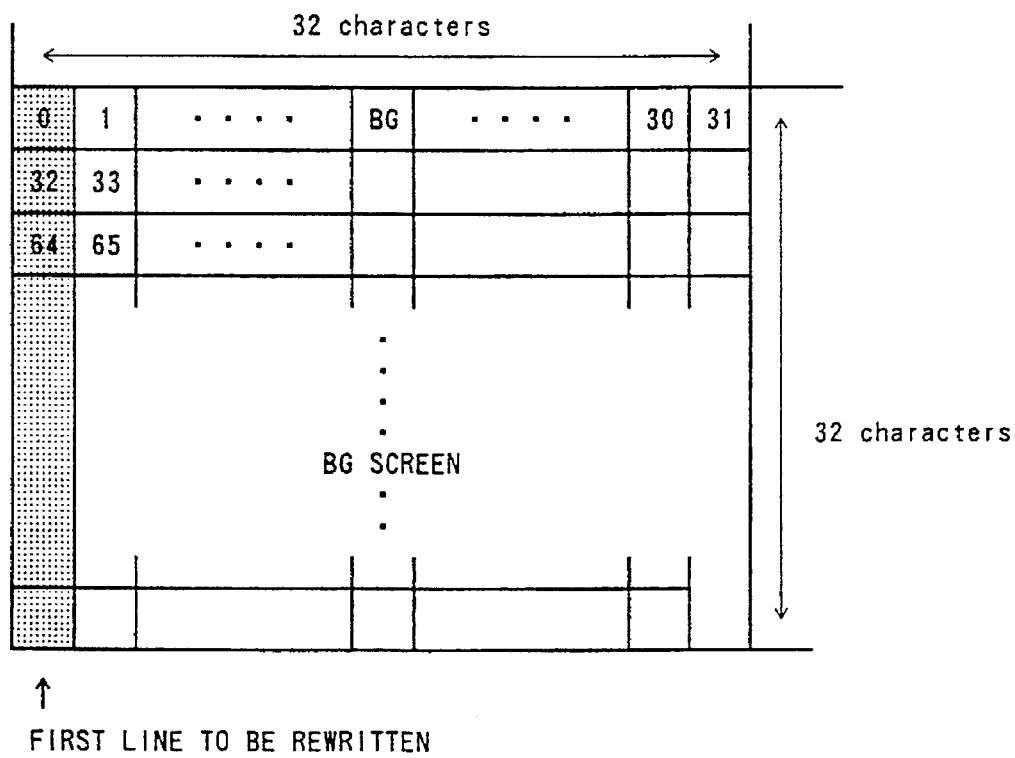
FIG. 27 is a table showing writing operation by the microprogram of the preferred embodiment.
FIG. 28 is an explanatory diagram showing a BG screen of the preferred embodiment.

FIG. 26 shows an example of an address generating process by the microprogram, the example being for triple screen mode as follows:

(1) BG0: 256 -color mode of external block sequence type
(2) BG1: 16-color mode of external block sequence type
(3) BG2: 16-color mode of internal dot sequence type Referring to FIG. 27, B-bus data are specified by "BG0 indirect CG (0)" in the 0 cycle, so that "external block sequence type 256 color mode BAT indirect CG0" is accessed in a BRAM. At this time an ARAM is not accessed, that is NOP (non-operation) is carried out to the ARAM.

The control unit 104 loads a variety of image data into the RAM to process the data and to control transmission of the data. The RAM has a variety of arrangement patterns corresponding to the data modes, respectively, in order to use the RAM effectively. A value to be added to the previous address is calculated so that the address may be available in every data mode. Therefore, a variety of image data can be processed. The control unit 104 is provided with a register for instructing address calculation in response to the data mode, so that data access is carried out in order as long as information showing an initial value and additional value of the memory to be accessed and a discrimination of read or write are set in the register.

Operation of the address calculating instruction will be explained. In this case, a first line data of BG pictures, each of which is composed of 8×8 dot characters, is changed. The BG pictures are arranged 32×32 on a screen as shown in FIG. 28.

There are three types of registers Reg0C (for writing), Reg0D (for reading) and Reg0E (RAM access distinction), these registers being used for memory access. The Reg0D is set as follows to rewrite data stored in a first line of the BG screen:

Writing address (bit 0 to 17): Initial address
Offset (bit 18 to 23): 32

Figure 29:
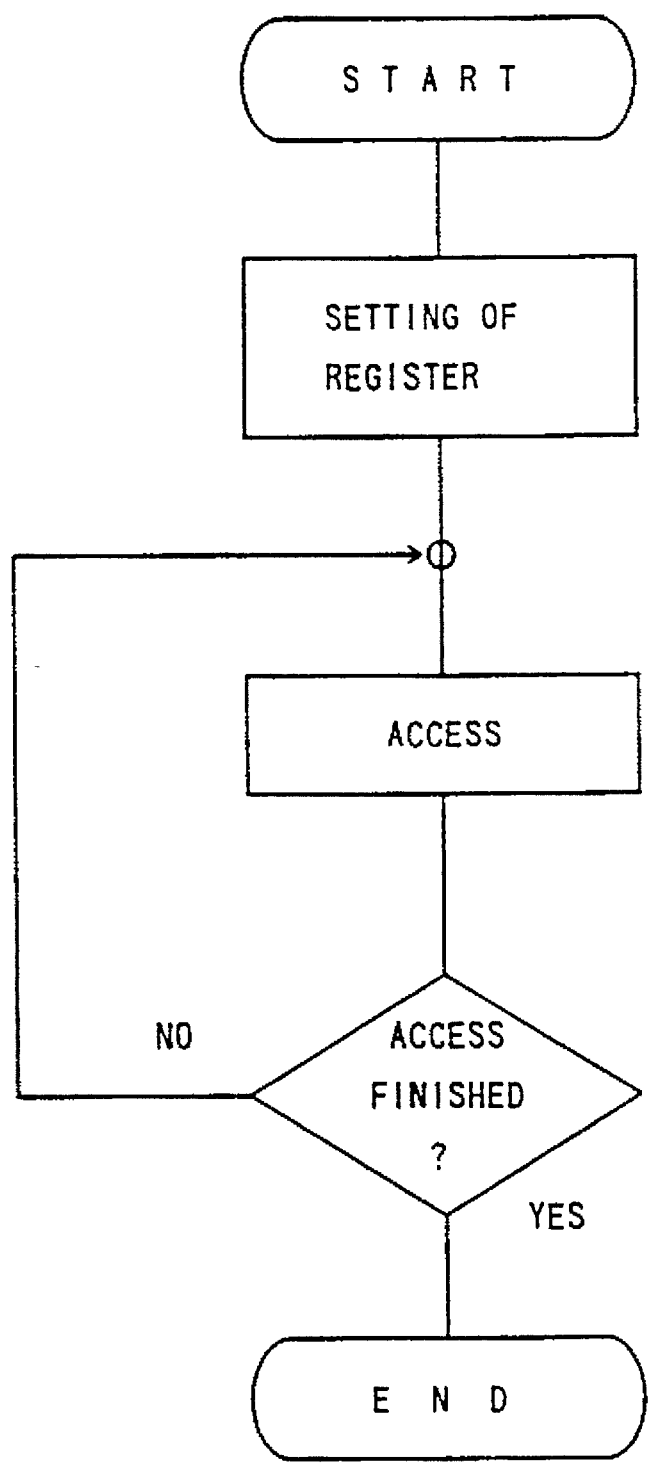
FIG. 29 is a flow chart showing data access operation of the preferred embodiment.

The offset can be set in a range between –512 to +512, the "+" meaning increase and "–" meaning decrease. In the above example, the offset is set at +32 (bits) so that BG data are rewritten with an interval of 32 bits. Such address calculation is carried out by the video encoder unit 112. As shown in the flow chart of FIG. 29, when an access instruction is generated, the next access address is automatically calculated by the video encoder unit 112. Therefore, desired data process may be carried out automatically as long as access instructions are generated continuously.

Figure 30:
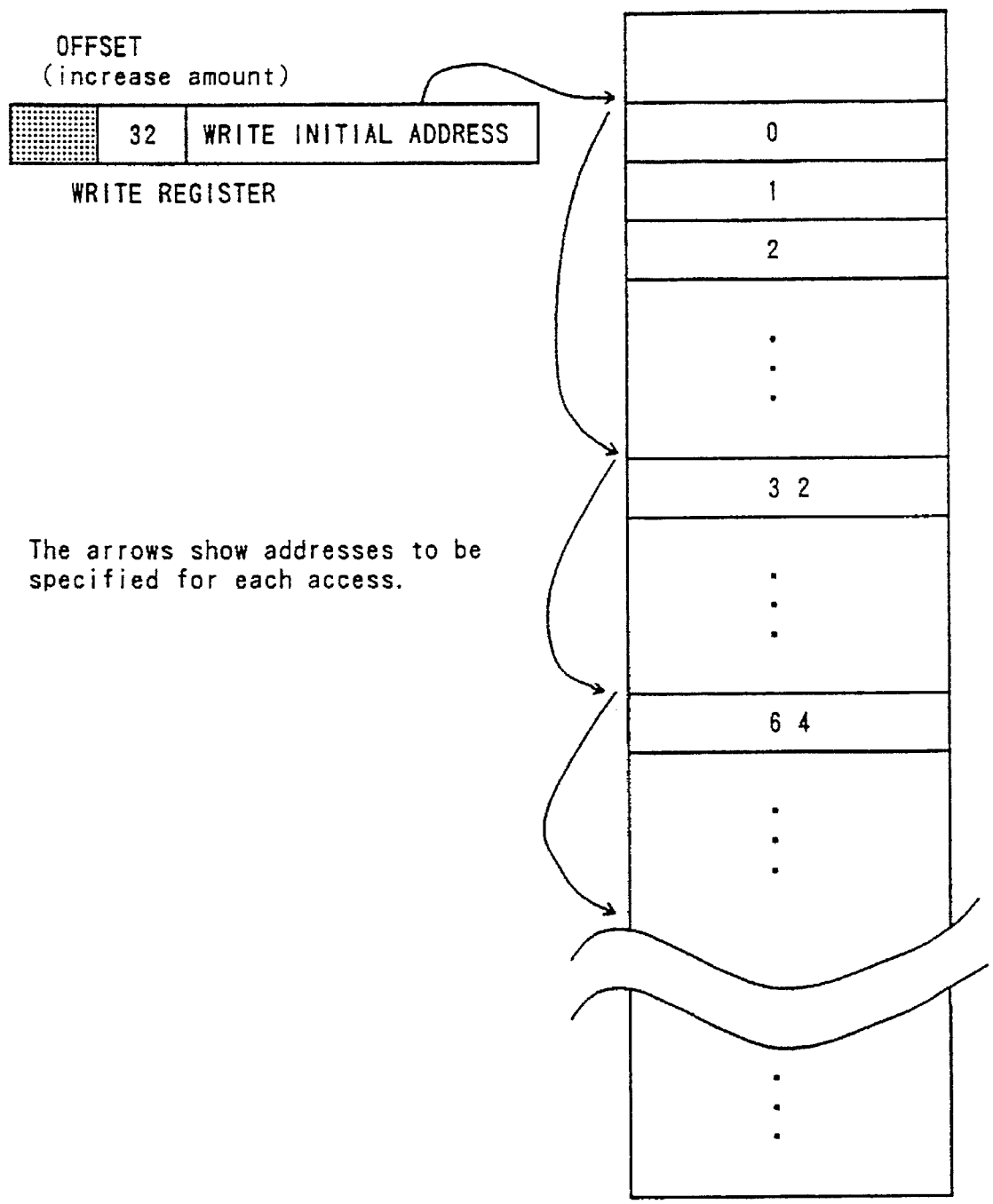
FIG. 30 is an explanatory diagram showing memory access operation of the preferred embodiment.

FIG. 30 shows memory access operation when the access instruction is generated continuously. The video encoder unit 112 includes two memories K-RAM#A and K-RAM#B, which are established in accordance with on/off of bit-17 in the writing address.

The control unit 104 manages a plurality of BG characters to be synthesized with priorities, and processes a variety of data supplied from the K-RAM. The RAM does not store whole image data of one screen, it stores only a part of the image data which are necessary. Image data such as a natural picture, however, are stored entirely in the RAM with no modification. These image data are compiled in accordance with a predetermined priority, then displayed on the virtual screen in accordance with the address data. After that, the screen data are displayed 116 on the TV display by the video encoder 112.

The control unit 104 manages four BG screens BG0 to BG3, in which the main picture and sub-picture may be specified as BG image data. The sub-picture is superimposed on the main picture. The main and sub-pictures may be specified to be in either of "Chazutsu" and "non-Chazutsu" modes (endless scroll and non-endless scroll mode). The two scroll modes will be explained later.

In this embodiment, the virtual screen indicates a screen set on the memory storing all imaged data therein, the virtual screen being larger than the real screen (TV display monitor). That is, the real screen may be considered an area selected from the virtual screen, the real screen being scrolled when the selected area (display area) is moved in horizontal and vertical directions. In the endless scroll mode (Chazutsumode), even if the display area (real screen) is moved out from the virtual screen, the scroll operation is not stopped, the display area is moved to the other end of the virtual screen in endless fashion.

The control unit 104 has an image data region used for displaying transparent area on the virtual screen in the endless scroll mode. That is, the operation is in the non-endless mode (non-Chazutsumode). Each of the four BG screens BG0 to BG3 has both main and sub-pictures so that a special display technique is realized by distinguishing the endless scroll mode and the non-endless scroll mode to the main and sub-pictures independently.

Operation of in the endless scroll and non-endless scroll modes are now explained in more detail.

Figure 31:
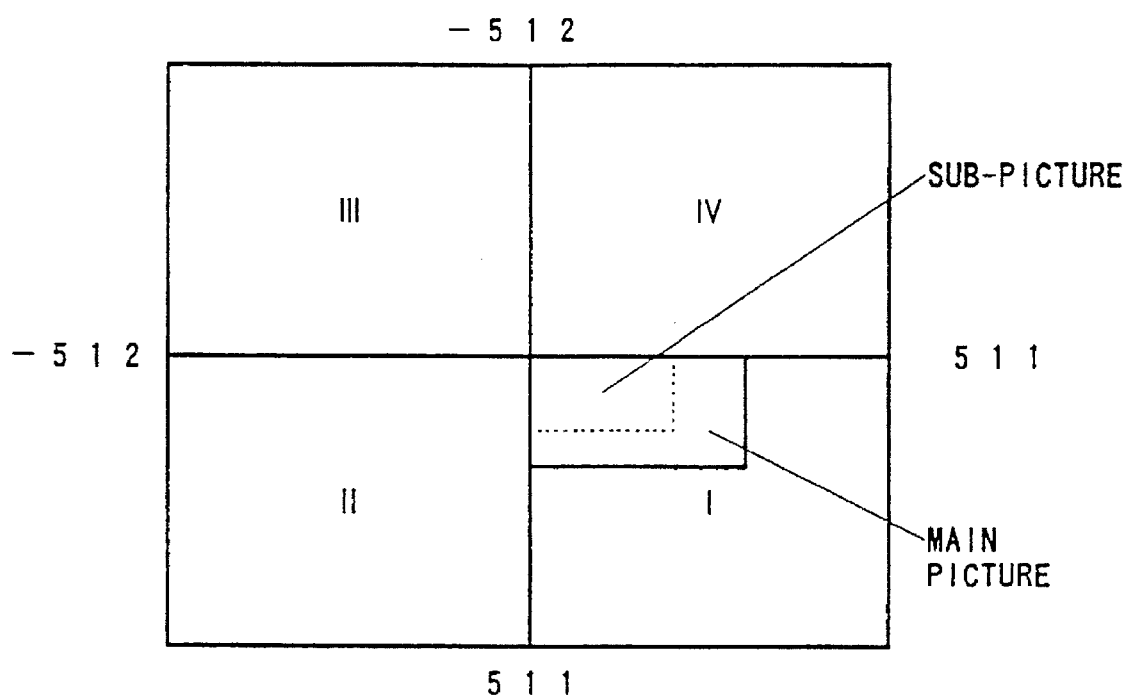
FIG. 31 is an explanatory diagram showing coordinate of the BG screen.

FIG. 31 shows the virtual screen for the background. The coordinate of the screen is called an image screen coordinate. The image screen coordinate is composed of 1024× 1024 dots, that is composed of –512 to +512 dots in horizontal (X) and vertical (Y) directions. The coordinate is in endless scroll mode, that is a first quadrant "I" is connected at the right edge to a second quadrant "II" and at the lower edge to a fourth quadrant "IV". On the virtual screen, an area for real screen is ensured as 256×240 dots. Therefore, when the 256×240 area is moved to up-and-down and right-and-left, the image is scrolled on the real screen.

Figure 32:
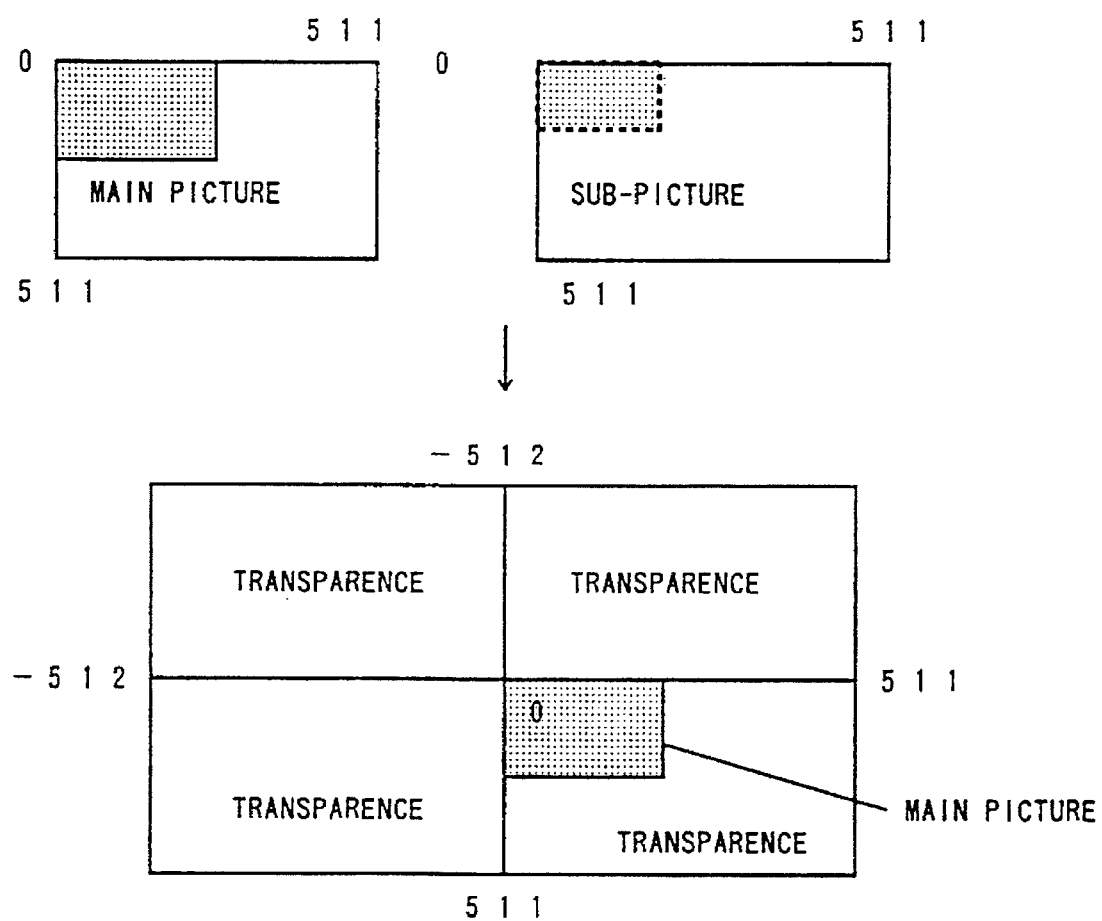
FIGS. 32 and 33 are explanatory diagrams each showing a relation between the screen coordinate and main and sub pictures in an endless scroll mode ("Chazutsu" mode).
Figure 33:
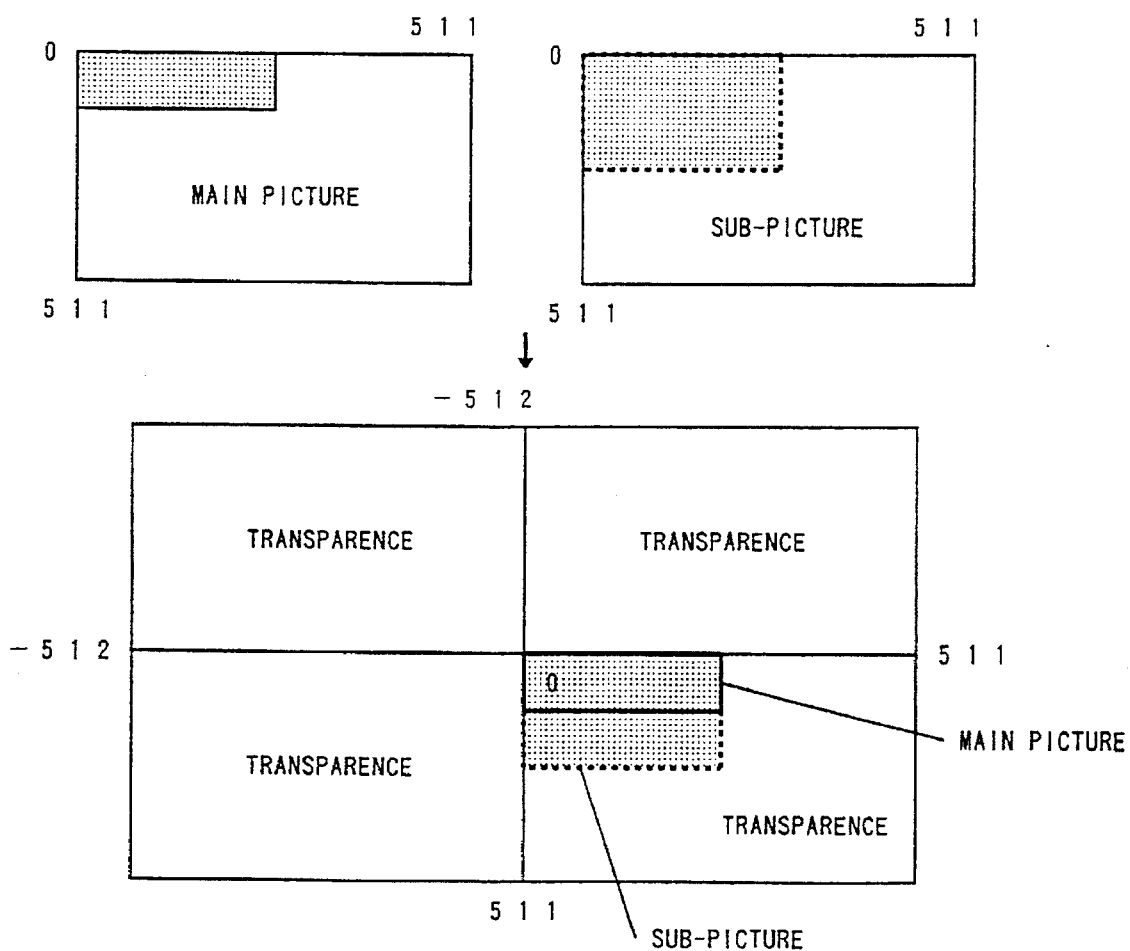

FIGS. 32 and 33 show BG virtual screens in the non-endless scroll mode. In the non-endless scroll mode, an area which is not either a main picture or a sub-picture is shown as transparent. In this mode, when the real screen display area is moved to the transparency area, a transparent image is displayed on the real display screen so that no image distortion is shown on the real display screen.

Figure 34:
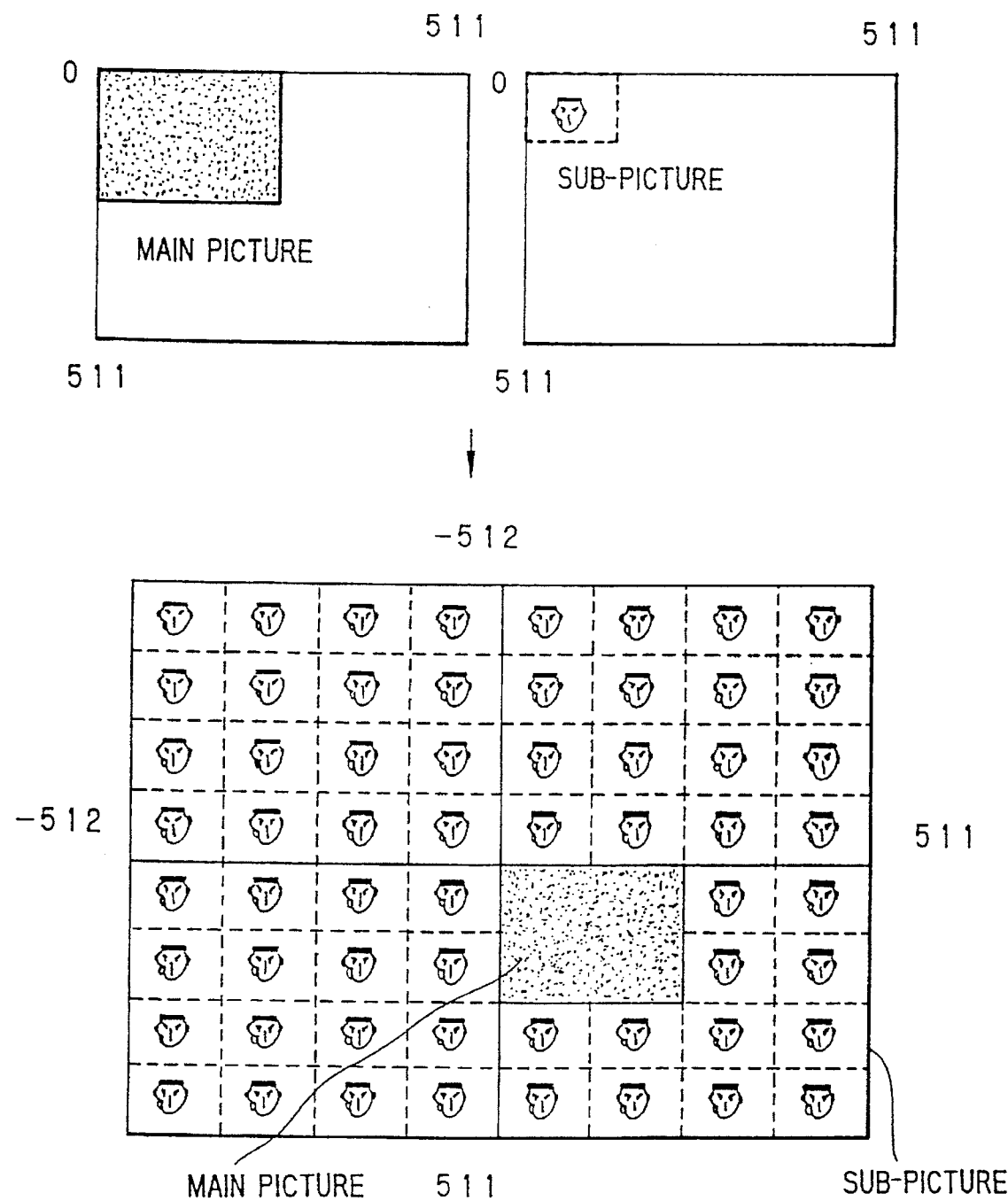
FIG. 34 is an explanatory diagram showing a relation between the screen coordinate and main and sub pictures in the case where the main picture is in a non-endless scroll mode ("non-Chazutsu" mode) and the sub picture is in the endless scroll mode.
Figure 35:
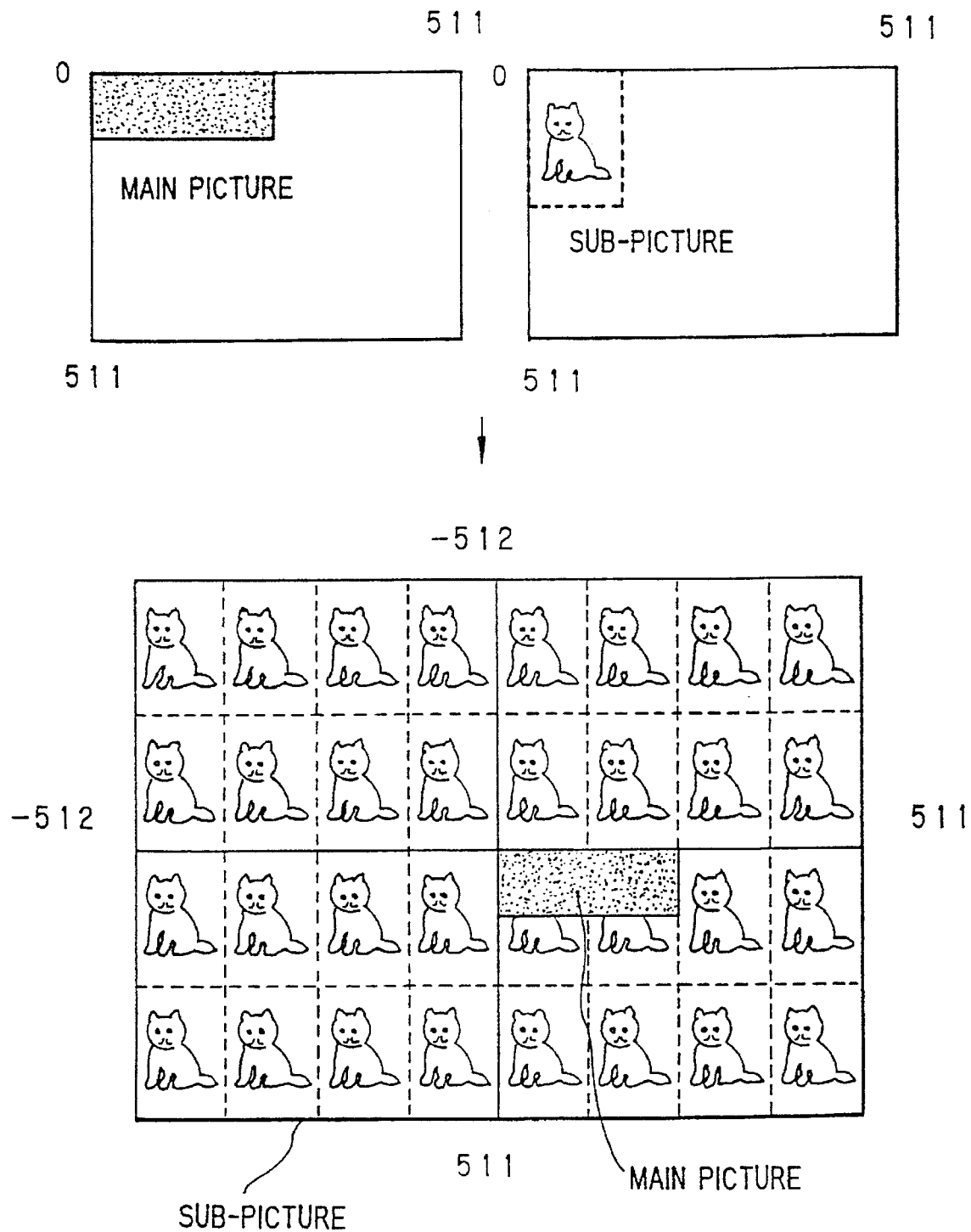
FIG. 35 is an explanatory diagram showing a relation between the screen coordinate and main and sub pictures in the case where the main picture is in the endless scroll mode and the sub picture is in the non-endless scroll mode.

If the sub-picture is in the endless scroll mode, the sub-picture is displayed continuously, as shown in FIGS. 34 and 35, so that the virtual screen is shown with the sub-pictures as "tiles" thereon throughout. As a result, the sub-pictures are displayed repeatedly when the real screen is scrolled.

Managing operation of the main and sub-pictures is now explained. The BG screen is managed in accordance with BAT (background attribute table) and CG (character generator). The BAT is a table stored in the RAM for specifying characters and their colors to be set on the virtual screen. Each character is composed of 8×8 dots.

FIG. 36 shows BAT address corresponding to characters on the virtual screen of 512×512 dots (64×64 characters). The CG is provided in the RAM for specifying real character patterns corresponding to the BAT. Therefore, content of the image to be displayed may be found by changing the CG corresponding to the CG code of the BAT. On the BG0 image, the BAT and CG are specified for the main and sub-pictures, respectively, whereby the main and sub-pictures may be treated independently. Therefore, the BG screen looks as if two pictures are displayed independently thereon. For example, if the sub-pictures are tiled on all areas of the virtual screen except for the main picture and are scrolled, it looks as if the main and sub-pictures are displayed independently, that is, two BG screens are displayed on the real screen.

FIG. 37 shows a configuration of an endless scroll mode set register for the sub-pictures. The operation of the endless scroll and non-endless scroll modes are constructed in the hardware, so that a scroll mode to be used is specified by the endless scroll mode set register. The endless and non-endless scroll modes are only effective for the sub-pictures. The sub-picture operates in the non-endless scroll mode when "0" is set in the scroll mode set register, and operates in the endless scroll mode when "1" is set in the register. If the scroll mode is specified in an initial process, it is not necessary to manage the scroll modes by a user program.

Operation of the endless scroll mode for the BG0 screen, including both the main and sub-pictures, is now explained in conjunction with FIG. 38. On the BG0 screen, the sub-picture and main picture show waves of one character size and an island of four character size. The sub-picture is set to operate in the endless scroll mode so that the wave is developed on the virtual screen entirely. Therefore, it is easy to display the island floating on the sea by using a five character memory.

A BG screen management register is now explained. The BG0 screen has the main and sub-pictures which are independently managed by the BAT and CG, and each of the BAT and CG has its own address register. That is, the main and sub-pictures are independently managed by four registers. On the other hand, each of the BG1 to BG3 screens is managed by the BAT and CG each having one address register, the main and sub-pictures being managed by one address register. In these address registers, "-A/B" at the seventh bit specifies whether ARAM or BRAM is available in the K-RAM. The ARAM is designated when A/B 0, and the BRAM is designated when A/B=1.

Figure 39:
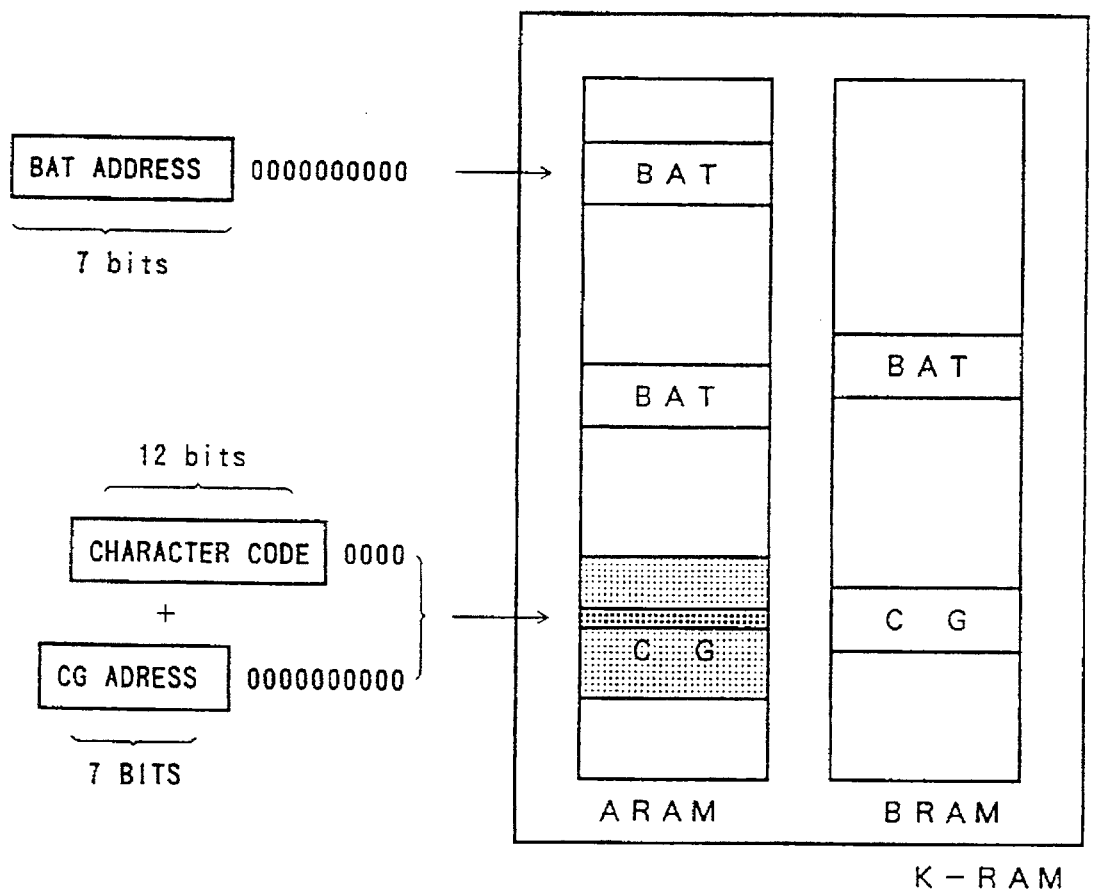
FIG. 39 is an explanatory diagram showing a position to be pointed by a start address register of a K-RAM.

FIG. 39 shows a relation between BAT/CG address register and the K-RAM. A BAT address is defined by figures at the last seven bits and ten bits of zero in the BAT register. An address of the CG is given as follows in accordance with the color modes.

[4 COLOR MODE]
00<character code>000+<CG address>0000000000
[16 COLOR MODE]
0<character code>0000+<CG address>0000000000
[256, 64K and 16M COLOR MODES]
<character code>00000 +<CG address>0000000000

In these formulas, <character code> indicates the content of the BAT and <CG address> indicates the last seven bits of the CG address register. In the character codes, the end bit is set to be "0" in the 256 color mode and the end two bits are set to be "00" in the 64K and 16M color modes. Therefore, as long as the CG addresses are different from each other, different types of the CG may be obtained even though the same BAT are stored in the RAM.

The address registers are sampled for each raster, and become effective at the following HSYNC (HSYNC: a non display period in that a scanning line moves from left to right and returned to the left).

Figure 40:
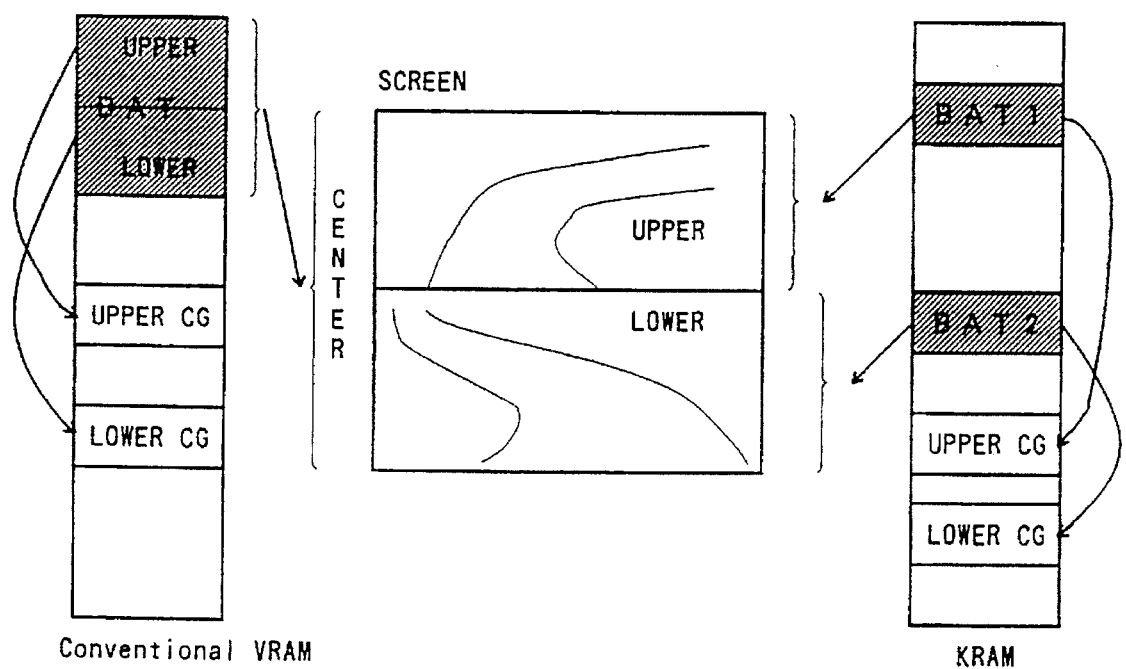
FIG. 40 is an explanatory diagram showing operation in the case where the screen is divided into two of upper and lower.

FIG. 40 shows operation in the case where the screen is divided into upper and lower screen portions. However, first, a conventional BAT is now explained. According to the conventional BAT, two CGs for lower and upper screens are required to form the picture shown in FIG. 40, because the conventional BAT treats only continuous regions. The CGs may be arranged to be linked to each other or separated by some space. The picture is displayed only by a continuous process of the BAT. A lower half character code of the BAT has to be changed to the CG of the following picture in order to change only the lower picture. This process takes a long time in that address of the BAT address register is changed. Therefore, the upper and lower pictures can not be displayed separately in a moment.

According to the preferred embodiment, the upper and lower pictures are stored in BAT1 and BAT2, respectively. The locations of the BAT1 and BAT2 are not limited in the K-RAM. The K-RAM includes upper and lower CG corresponding to BAT1 and BAT2, respectively. In order to display the upper and lower pictures independently, the BAT address register is set at an address of the BAT1 at first and then the set address is changed to an address of the BAT2 (BAT1), because an address in the BAT address register is effective before the following HSYNC. If the upper picture is changed, another BAT needs to be prepared in the K-RAM and the BAT address register is changed.

The data start register stores addresses for the virtual screen. The image data extension unit scrolls the actual screen by moving the virtual screen up-and-down and right-and-left.

In operation, when scale-down image data are transmitted from the control unit 104 to the image data extension unit 106, the scale-down image data are extended and then are transmitted to the video encoder unit 112. The extended data are transmitted through the NTSC converter 108 to the TV display monitor 116. In this process, the scale-down data from the control unit 104 are transmitted to the image data extension unit 106 for each data block (that is, for each special raster unit) in order to control position of the image to be displayed on the TV display monitor 116.

The control unit 104 also transmits ADPCM data to the sound data output unit 110 in synchronization with horizontal synchronizing signals. Image output and sound output data are supplied from TV display monitor 116 and sound data output unit 110 in synchronization with each other precisely, because both data are generated in synchronization with horizontal synchronizing signals.

This embodiment employs a ring mode in which the start address is automatically pointed after the end address data stored in data area of the memory are transmitted therefrom, so that continuous reproducing may be realized. A check address is set at an intermediate point between the start and end address. When the intermediate address or the end address is pointed, an interruption occurs. In response to the intermediate and end address interruptions, the first half data and last half data are renewed, respectively, so that continuous reproducing is realized. As a result, the software does not need to check how much the program is processed, new data may be read easily in the interruption routine.

In an RGB method, a display color is defined by three colors red, green and blue. On the other hand, according to a YUV method, a display color is defined by a brightness (Y) and color differences (U, V), "Y" representing brightness data, "U" representing color difference data for a blue to yellow family and "V" representing color difference data for a red to green family. In such YUV method, two figures of one and zero are expressed by two bits data, that is, $2^n$ figures are expressed by "n" bits data. Therefore, the YUV method is more useful than a color pallet method when 64K colors and 16M colors are used for displaying the image. If the colors are directly treated as data in a four color mode, only four colors are defined by two bits. For that reason, the color pallet is used in color modes of less than 256, that is, a color number corresponding to a color to be displayed is selected from colors in the color pallet.

Figure 41:
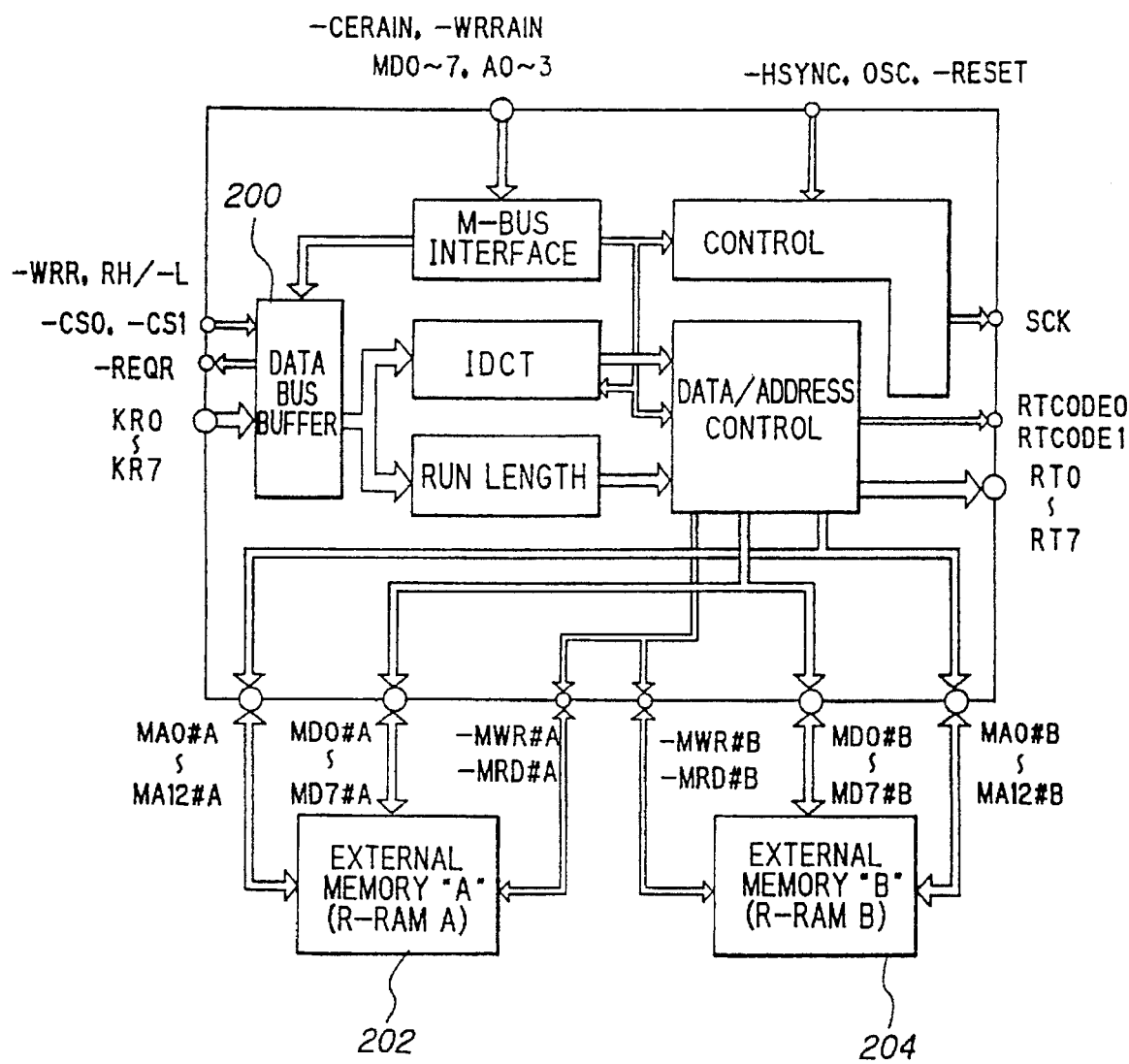
FIG. 41 is a block diagram illustrating an image data extension unit used in the preferred embodiment.

FIG. 41 shows image data extension unit 106. The function of the image data extension unit is now explained in conjunction with the figure a. In this figure, data bus buffer 200 is a memory storing image data supplied from the control unit 104 and the like. The image data are divided and transmitted to predetermined blocks in the image data extension unit 106, respectively. External memory "R-RAM A" and "R-RAM B" 202 and 204 are memories each for storing decoded data, each of the memories having a capacity for 16 raster (64K bits). The two memories are used alternatively to increase the process speed. The image data extension unit 106 manages IDCT (Inverse Cosine Transformation) images which are natural moving pictures produced by IDCT decoding, and run-length images which are animation moving pictures produced in accordance with a run-length. In the IDCT image and run-length image, a scale-down picture occupies "256 dots ×240 rasters" for each field. In the IDCT image, 1677 display colors are used. The run-length image has four run-length color modes by the pallet system, 16 colors, 32 colors, 64 colors and 128 colors.

The image data extension unit 106 also includes data bus terminals KR0 to KR7 for receiving data transmitted from the control unit 104 and data request terminal –REQR for supplying data request signal to the control unit 104. The data request signal shows a request for the control unit 104 to supply scale-down image data, that is, "–REQR=0" represents data request and "–REQR=1" a data stop.

The image data extension unit 106 needs to decode the scale-down image data of 16 rasters within a 16 raster period. For that reason, 16 rasters data begin to be transmitted to the image data extension unit 104 at 16 rasters before the display timing thereof so that the transmission has finished one raster before initiation of the display.

Figure 42:
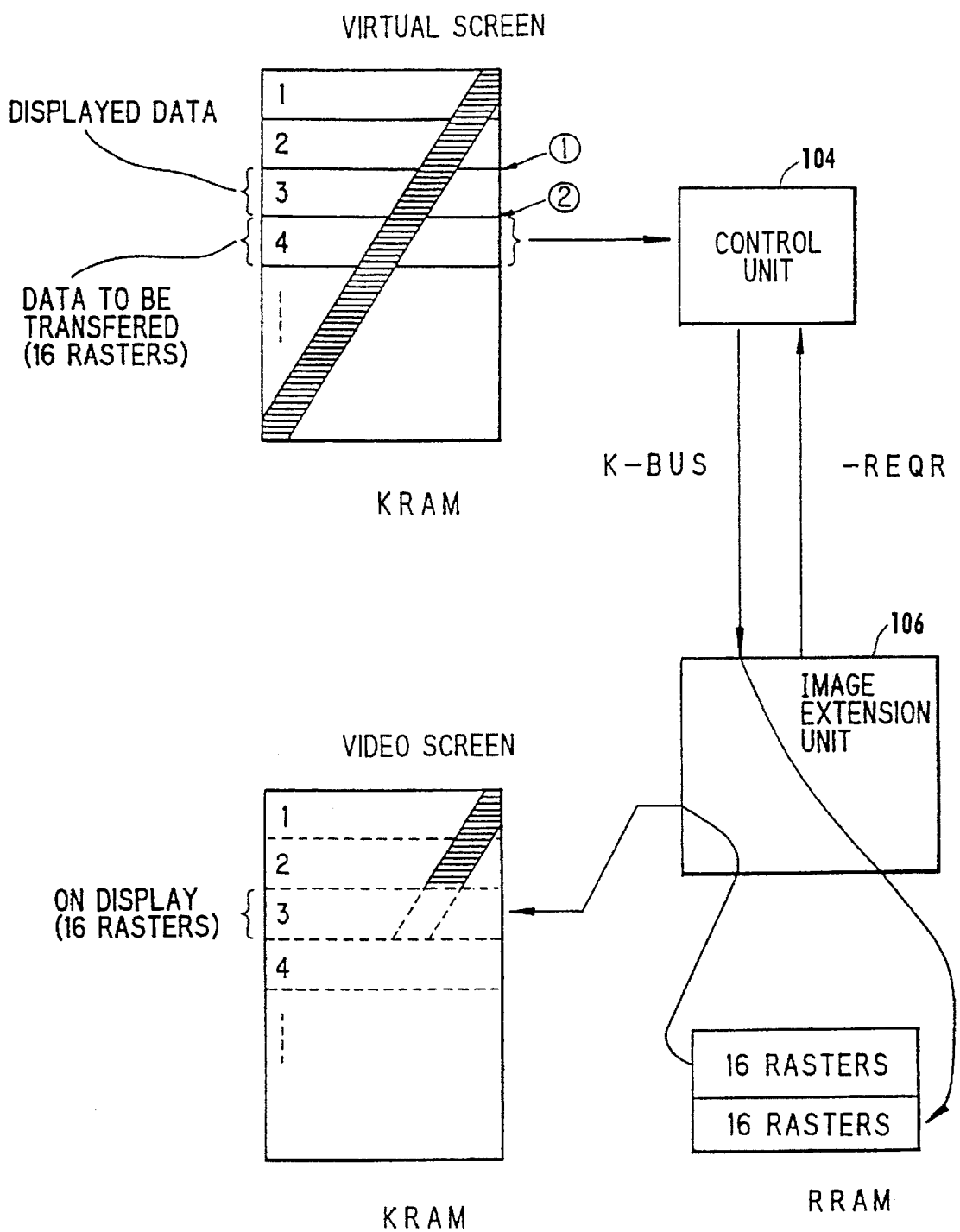
FIG. 42 is an explanatory diagram showing operation of picture, display timing in the preferred embodiment.

FIG. 42 shows the operation of the display timing of the image data on the video screen. In this embodiment, when a third data of 16 rasters are displayed on the video screen (actual screen), a fourth data of 16 rasters are transmitted from the control unit 104 to the image data extension unit 106, and the transmission is finished before the third data are finished being displayed on the video screen completely. The process is repeated so that image data for one screen are displayed on the video screen; this is called "normal reproduction". The image data extension unit 106 has an FIFO (First In - First Out) memory for image data supplied from the control unit 104. The FIFO supplies a disable signal (–REQR=1) to the control unit 104 when the FIFO is filled up with data so that the control unit 104 stops transmitting data temporarily.

FIGS. 43A to 43E show the configurations of registers in the control unit 104. The control unit 104 includes a transfer control register shown in FIG. 43A, a start address register shown in FIG. 43B of the image data extension unit 106 and a multi-musical performance block number register shown in FIG. 43D.

The transfer control register is for enabling and disabling transmission. If a disable signal is supplied from the transfer control register to the image data extension unit 106 while some data are transmitted from the image data extension 106 unit, the transmission is stopped.

The start address register is for specifying an initial address of the K-RAM storing data for the image data extension unit 106. In response to the initial address, the data stored in the K-RAM begin to be transmitted through the control unit 104. During transmission of block data are in accordance with address data, increment operation of the address is carried out automatically.

The transfer start register supplies an instruction to begin data transmission for each raster. When the instruction is supplied to the control unit 104, image data are transmitted from the control unit 104 to the image data extension unit 106.

The transfer block number register instructs the number of blocks to be transmitted to the image data extension unit 106, each block being composed of 16 rasters.

If the contents of all registers are not changed, the same image is again repeated to be displayed at the same frame. In general, each of the registers becomes effective instantly after setting thereof. If the register is set while data block is transmitted to the image data extension unit 106, the register becomes effective after the transmission.

The control unit 104 transmits image data to the image data extension unit 104 only when the K-BUS has been arbitrated, the image data extension unit 106 is ready to be accessed and the request signal (–REQR=0) has been supplied from the image data extension unit 106. On the other hand, transmission by the control unit 104 of the data to the image data extension unit 106 is disabled when at least one of the following conditions is met.

(1) The image data extension unit 106 has not processed any operation yet.
(2) The image extension unit 106 has the FIFO in full state.
(3) While HSYNC are counted by 16 times after the first data of 16 lines are received thereat, all bits data included in the data have been read.

Therefore, a first bit of data are disabled to stop transmission.

Figure 44:
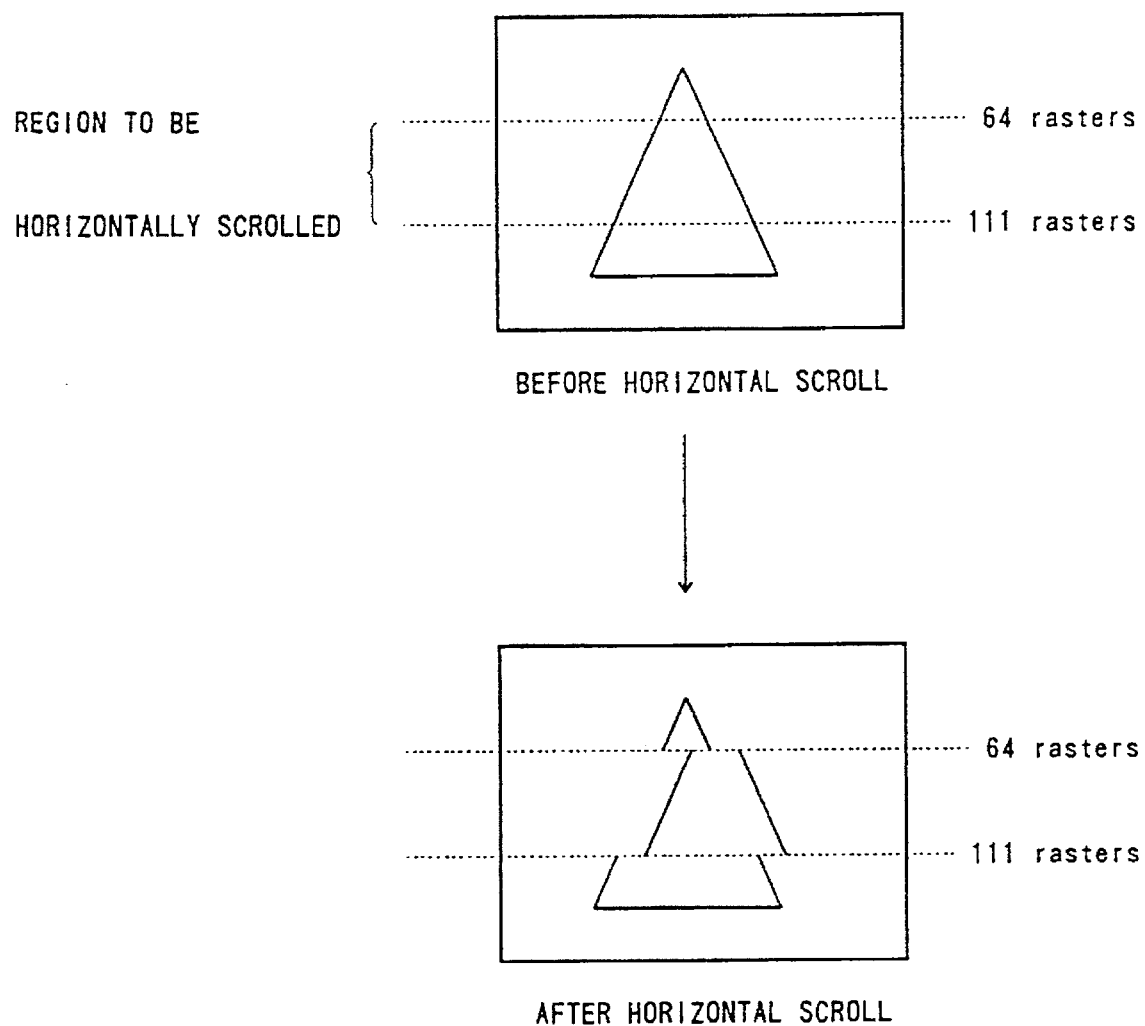
FIG. 44 is an explanatory diagram showing a change of screen in the case where three blocks in sixty-four rasters are horizontally scrolled.

FIG. 44 shows change of screen in the case where three blocks (=16×3 rasters) in sixty-four rasters are horizontally scrolled to right by 20 dots. The amount of horizontal scroll is set at a horizontal scroll register of the image data extension unit 106.

FIG. 45 is a flow chart showing an algorithm for the horizontal scroll. The transfer start register is set at a value of 16 rasters before a value from which the scroll begins. The image data begins to be transmitted to the image data extension unit 106 when the 48th raster (=64−16) is detected. The horizontal scroll register is set at the 63rd raster (64−1) so that horizontal scroll is effective at the next raster (64th raster).

On the other hand, a vertical scroll is controlled by a different way depending on the scroll direction. When the screen is scrolled up in a range of 0 to 15 lines, the set value of the data start raster register is changed. When the screen is scrolled up in a range over 16 lines, the set value of the data start raster register is changed by a block unit and the data start address register is changed in value at the same time.

Figure 46:
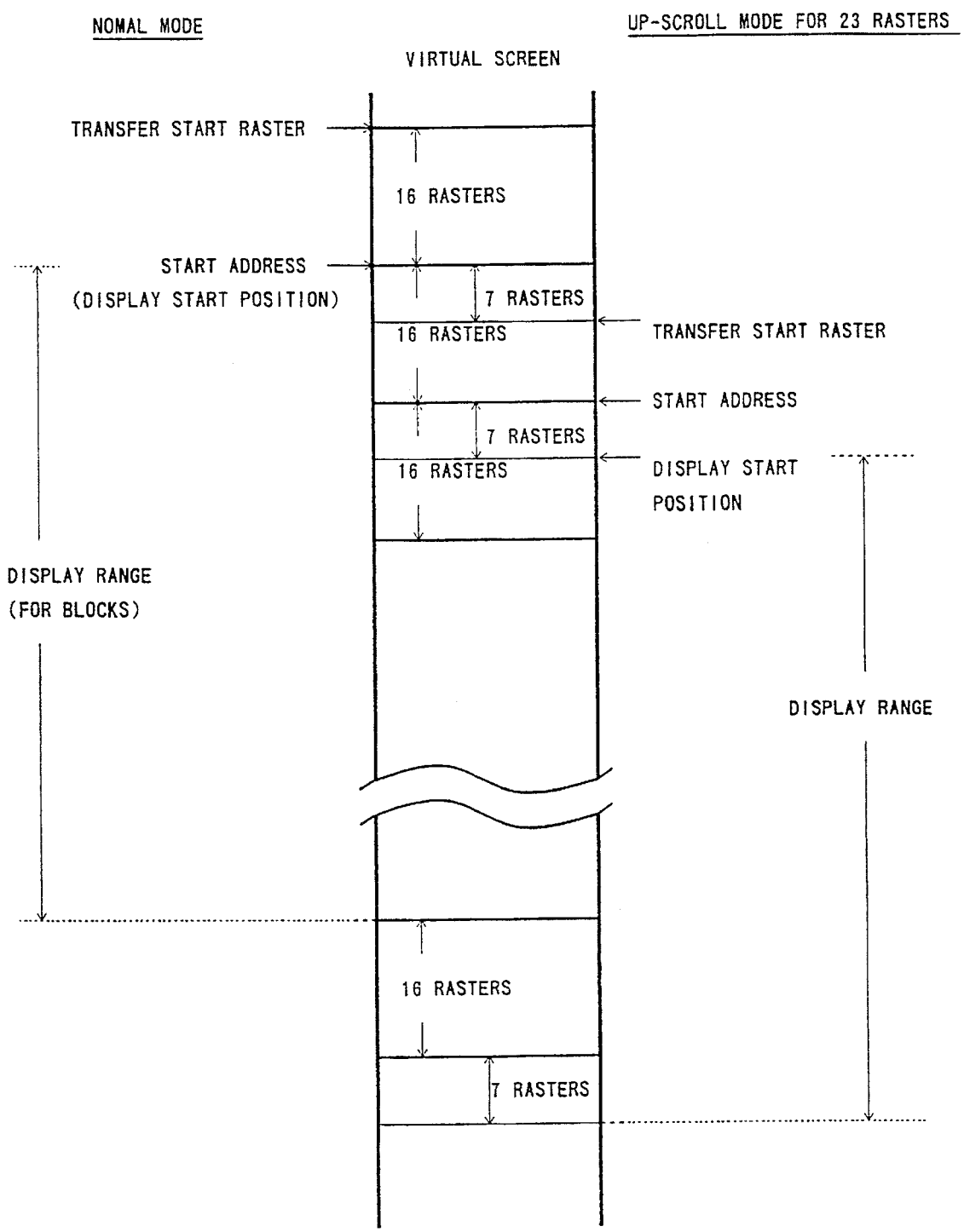
FIG. 46 is an explanatory diagram showing a relation between a start address and a transfer start raster in a twenty-three raster up-scroll mode.

FIG. 46 shows a relation between a start address and a transfer start raster in a twenty-three raster up-scroll mode. In this mode, a first address for the following 16 lines data are set to the data start address register, and a value given by subtracting seven from a value in the normal reproducing mode is set to the start raster register so that the screen is scrolled up by 23 lines. This process is equivalent to that where the data are transmitted from a position at 23 lines lower than the normal position, whereby the screen is displayed from the 23rd lines.

Figure 47:
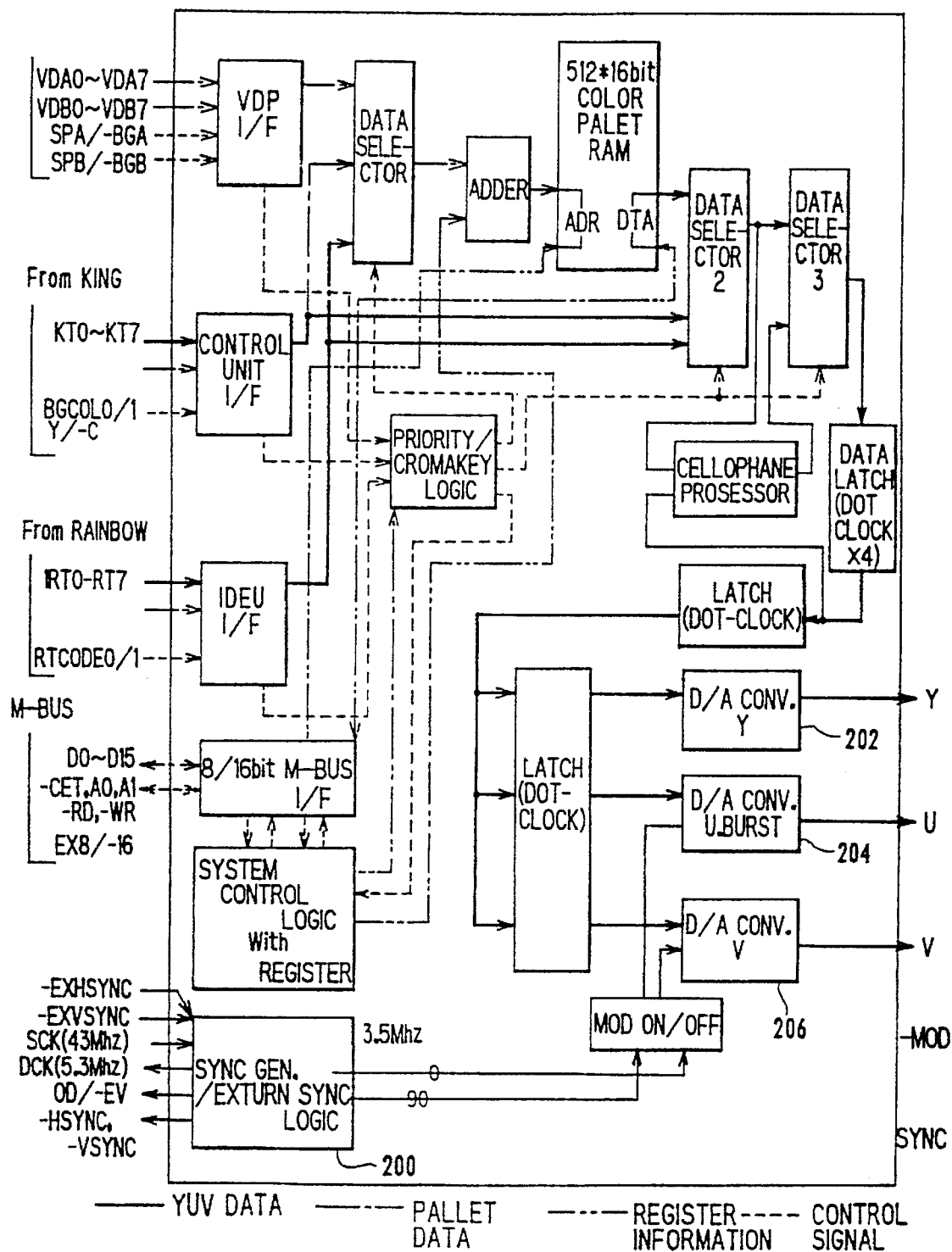
FIG. 47 is a block diagram illustrating a video encoder unit used in the image processing apparatus of the preferred embodiment.

FIG. 47 shows the video encoder unit 112. The video encoder unit 112 is composed of an IC including a synchronizing signal generating circuit, a color pallet RAM, a priority arithmetic circuit, a cellophane arithmetic circuit (for synthesizing upper and lower pictures), a D/A converter for an image signal, an 8/16 bit data bus (M-bus) interface, a VDP interface, a control unit interface and an image data extension unit interface. Operation of the cellophane function will be explained later.

The 8/16 bit data bus interface is an I/F switching circuit which selects one from 8 bits and 16 bits to be used for data processing at the video encoder unit side, and the selection is carried out in accordance with data width of data bus of the processing system including the CPU.

The VDP interface receives data transmitted from two of upper and lower VDPs. Normally, the VDP interface receives data from the upper VDP. The VDP interface receives data from lower 70 VDP only when the upper VDP supplies chromakey data.

The color pallet Ram transforms a video input signal into a YUV digital signal.

The video encoder unit has registers (16 bits×24 lines), which are accessed by the CPU to set an operation mode and to specify one function from read and write for the color pallet.

The color pallet RAM transforms color pallet data into YUV data to be actually displayed. As shown in FIG. 48, the color pallet RAM includes a color information table divided into 512 address regions each having one color and 16 bit data regions. Each color data are composed of 8 bits "Y", 4 bits "U" and 4 bits "V", so that 65536 colors may be represented. The "Y" data indicates brightness in a range 00 (black) to FF (white), the "U" data indicates color difference for blue to yellow family in a range 0 to 15 and the "V" data indicates color difference for red to green family in a range 0 to 15. Each of the U and Y data has a value 8 when no-color is represented. After reset, YY=00 h, U=oh and V=h are automatically set at the address 0 of the color pallet address. For that reason, color data needs to be set at the address 0 again after reset.

How to set the YUV data at the color pallet RAM is now explained. The content of the color pallet RAM is written thereinto by the CPU 102, and is read in accordance with color pallet information from the VDP, control unit and image data extension unit 106. The read data are transformed into the Y, U and V data. The CPU 102 can read contents of the color pallet RAM.

Processing operation for writing data to the color pallet RAM continuously is carried out in accordance with the following steps.

1st step: Setting a register number 01h of a color pallet address register (CPA) to an address register (AR).
 2nd step: Writing a start address in the color pallet address register (CPA).
 3rd step: Writing a register number of a color pallet data write register (CPW) to the address register (AR).
 4th step: Writing data to the color pallet data write register to perform an increment of the CPA.
 5th step: Writing data to the color pallet data write register to perform an increment of the CPA.

In the 8 bits bus mode, data are written to the data write register in order of lower bytes to upper bytes. When the upper bytes data are written in the data write register, the data are written in an internal register so that the CPA is increased in value.

Processing operation for reading data from the color pallet RAM continuously is carried out in accordance with the following steps.

1st step: Setting a register number 01h of the color pallet address register (CPA) to the address register (AR).
 2nd step: Writing a start address in the color pallet address register (CPA).
 3rd step : Setting a register number 03h of the color pallet data read register (CPR) to the address register (AR).
 4th step: Reading data from the color pallet data read register to perform an increment of the CPA.
 5th step: Reading data from the color pallet data read register to perform an increment of the CPA.

In the 8 bits bus mode, data are read from the data read register in order of lower bytes to upper bytes. When the upper bytes data are read from the data read register, the data are written in the internal register so that the CPA is increased in value.

Next, how to display the color pallet data will be explained. The color pallet data stored in the VDP 114, control unit 104 and image data extension unit 106 are transformed to YUV data by the color pallet RAM to form an actual image. All screens using color pallet data are treated by the common color pallet RAM because only one color pallet RAM is provided. If a color pallet address offset register is used, color pallet start addresses may be specified for each picture separately.

In a priority process in block format, a picture to be displayed is specified dot-by-dot. If the specified picture is a color pallet data picture, a color pallet address offset value of the picture is read from the register. After that, double of the offset value is added to the color pallet data to provide a color pallet address. In accordance with the color pallet address, color data Y, U and V for each dot are generated and transmitted to the following stage. The color pallet address is given by calculating the color pallet data and the color pallet offset value specified for each picture, formulas for the calculation is shown as follows and in FIG. 49:

COLOR PALLET ADDRESS (9 bits)=COLOR PALLET DATA(8 bits)+(COLOR PALLET ADDRESS OFFSET VALUE×2)

Even though the same color pallet data are used, different colors are generated as long as the pictures are different.

The VDP 114 has only one color pallet offset register, so that if a plurality of VDPs are used, the plural VDPs have to use the register in common. If the color pallet address is over 511, a tenth bit is omitted, that is, the ninth bit is connected to 0 address as shown in FIG. 49. When the CPU 102 accesses the color pallet RAM, the color pallet address offset is not used.

FIG. 50 shows color pallet data transmitted from each of the LSIs. When a color pallet address is calculated, pallet bank numbers are treated as first bits of the pallet numbers, that is the pallet bank numbers and the pallet numbers are not distinguished. Therefore, all 8 bits data are treated as color pallet data in each mode.

According to the priority function, image dot information transmitted from the VDP unit, the control unit and the image data extension unit 106 is processed simultaneously in accordance with priority order set in the priority register so that image dots to be displayed are specified.

In this preferred embodiment, the VDP unit treats two images of sprite (SP) and background (BG), the control unit 104 treats four images BMG0, BMG1, BMG2 and BMG3 and the image data extension unit 106 treats an IDCT/RL image, respectively. The video encoder unit 112 may be connected with two of upper and lower VDPs. If upper and lower VDPs are connected to the video encoder 112, one of the VDPs is selected to be connected at an input interface portion. The upper VDP is generally selected and the lower VDP is selected only when the upper VDP supplies chromakey data. The priority order of the SP and BG images of the VDP and the BMG0 to BMG3 can not be changed only by the priority register of the video encoder unit 112. Therefore, if the priority order is changed, all the units need to be changed.

The priority order is decided dot-by-dot for each LSI by the video encoder unit 112 in accordance with image information transmitted from the VDP, control unit 104 and image data extension unit 100, with a value of the priority register and whether the data are chromakey or not.

Figure 51:
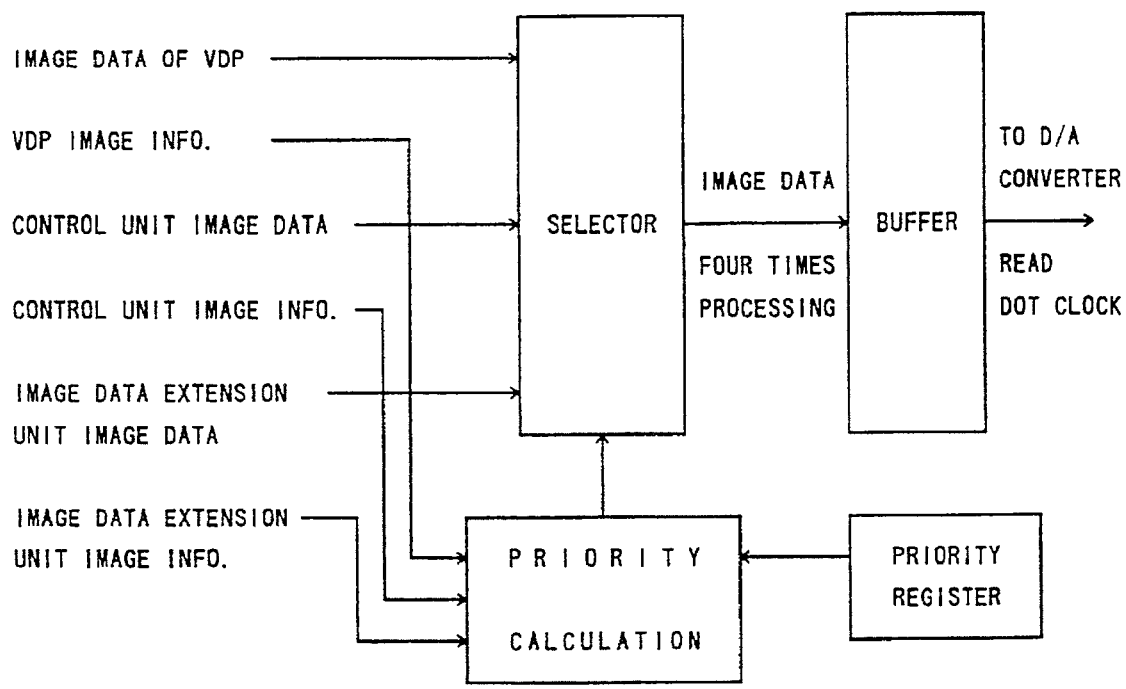
FIG. 51 is an explanatory diagram showing a priority process in a 256 dots mode.

FIG. 51 shows priority processing in the 256 dots mode. In this embodiment, the priority process is carried out using clock of four times the dot clock, in addition to special processes such as the chromakey process and cellophane process. In the cellophane process, upper and lower pictures (front and back cellophane) are synthesized when the video encoder synthesizes some images in accordance with the priority.

In the 320 dot mode, each of the control unit and image data extension unit 106 has 256 dots and the VDP has 320 dots. Therefore, an image to be displayed is specified in the period of 21 MHz and the image (device) is displayed immediately.

In the chromakey function (transparency process), some portions of an image are treated as transparency portions, on which low priority pictures are displayed. Actually, a color to be judged as a transparency (key color) is defined in advance. The key color differs depending on the type of data, color pallet data, IDCT-YUV data or YUV data of the control unit. To use no chromakey function is equivalent to use no key color when a picture to be displayed is drafted.

FIG. 52 shows operation of the chromakey function. If a color pallet data 0 (pallet number 0 in VDP) is used as the key color, the color pallet data 0 is treated as a transparency color at the run-length region in the control unit and image data extension unit in any mode. In the VDP, regions of pallet number 0 are treated as transparency at any color pallet bank.

In some cases, the control unit 104 performs chromakey judgement and supplies an invalid signal to the color pallet data picture. If Y-data of YUV data are set "00h" on a dot in the control unit 104 (in the 16M color mode and 64K color mode), the dot is displayed with transparency color independently of values for U and V data. A value of "01h" or the like is added to the Y-data at regions not to be displayed with transparency in order that the Y-data does not have a value "00h". If an intermediate color located between a chromakey highest register value and a chromakey lowest register value is selected as the key color for the IDCT-YUV data screen and all of the YUV values to be displayed are located between the two register values, the selected color is judged as the key color, and as a result, the region is displayed with transparency color.

Specifically, in the case where the highest and lowest values of the chromakey Y register are Yu and Y1, the highest and lowest values of the chromakey U register are Uu and U1, the highest and lowest values of the chromakey V register are Vu and V1 and Y, U and V values to be displayed are Ys, Us and Vs, a color to be displayed is the key color if all of the following equations are true.

$Yu>=Ys>=Yl$ $Uu>=Us>=Ul$ $Vu>=Vs>=Vl$

When invalid signals are transmitted from the control unit 109 and image data extension unit 106 to the video encoder unit 112, the dots corresponding to the invalid signals are treated the same as the case of key color, that is, the dots are displayed with transparency color. The chromakey portion on the lowest priority region is displayed with a color which will be used for the following portion in accordance with the priority process. Therefore, the following picture is displayed instead of the present one if all pictures including YUV data pictures are transparency. In the same manner, the chromakey region on the lowest priority picture is cellophane processed as shown in FIG. 53.

In the operation of cellophane function, when the cellophane function is set at 0 picture in the control unit 104, a lower priority picture is mixed with the 0 picture, so that the 0 picture is displayed with half-transparency color. It is possible to realize fade-in processing, fade-out processing and smoothly changing of pictures by varying the mix ratio of the cellophane function.

The cellophane arithmetic results Y, U and V are given by the following equations, where Ya, Ua and Va indicate data of a picture to be synthesized on Yb, Ub and Vb data, the Yb, Ub and Vb indicate data of a picture to be synthesized with the Ya, Ua and Va and my, mu, mv, nuy, nv and nu indicate cellophane coefficients, respectively:

$Y=my \times Ya+ny \times Yb$ $U=mu \times (Ua-80h)+nu \times (Ub-80h)+80h$ $V=mv \times (Va-80h)+nv \times (Vb-80h)+80h$ In the above equations, "80h" of the U and V are treated as "0". Each of the Y, U and V becomes "FFh" and "00h" if it is overflown and underflown, respectively.

The cellophane coefficient may be divided into 9, 0/8 to 8/8 so that the cellophane coefficient may be varied. The cellophane coefficient is established by certain software.

A cellophane coefficient register is provided with 3 regions each having 6 parameters. When the cellophane function is set to a certain picture, the cellophane coefficient number (1 to 3) is written in a specified portion of the register. If "0" is set at the specified portion, the picture is separated from the cellophane function. Values 9 to F for the cellophane coefficient register are not supported.

The cellophane arithmetic is not carried out to a chromakey portion of a picture to be overlapped with another picture, so that the general chromakey process is carried out to the overlapped picture. According to the cellophane function, it is possible to realize functions of multi-cellophane, front cellophane, back cellophane and sprite special. In the multi-cellophane function, the cellophane process is carried out again on a picture which has been processed by the cellophane function. In the front cellophane function, the whole screen is changed in color and in brightness by the cellophane function using a pre-selected color. In the back cellophane function, the cellophane process can be carried out on a picture having the lowest priority. In the sprite special process, the cellophane function can be used on the sprite picture for each pallet bank.

Figure 55:
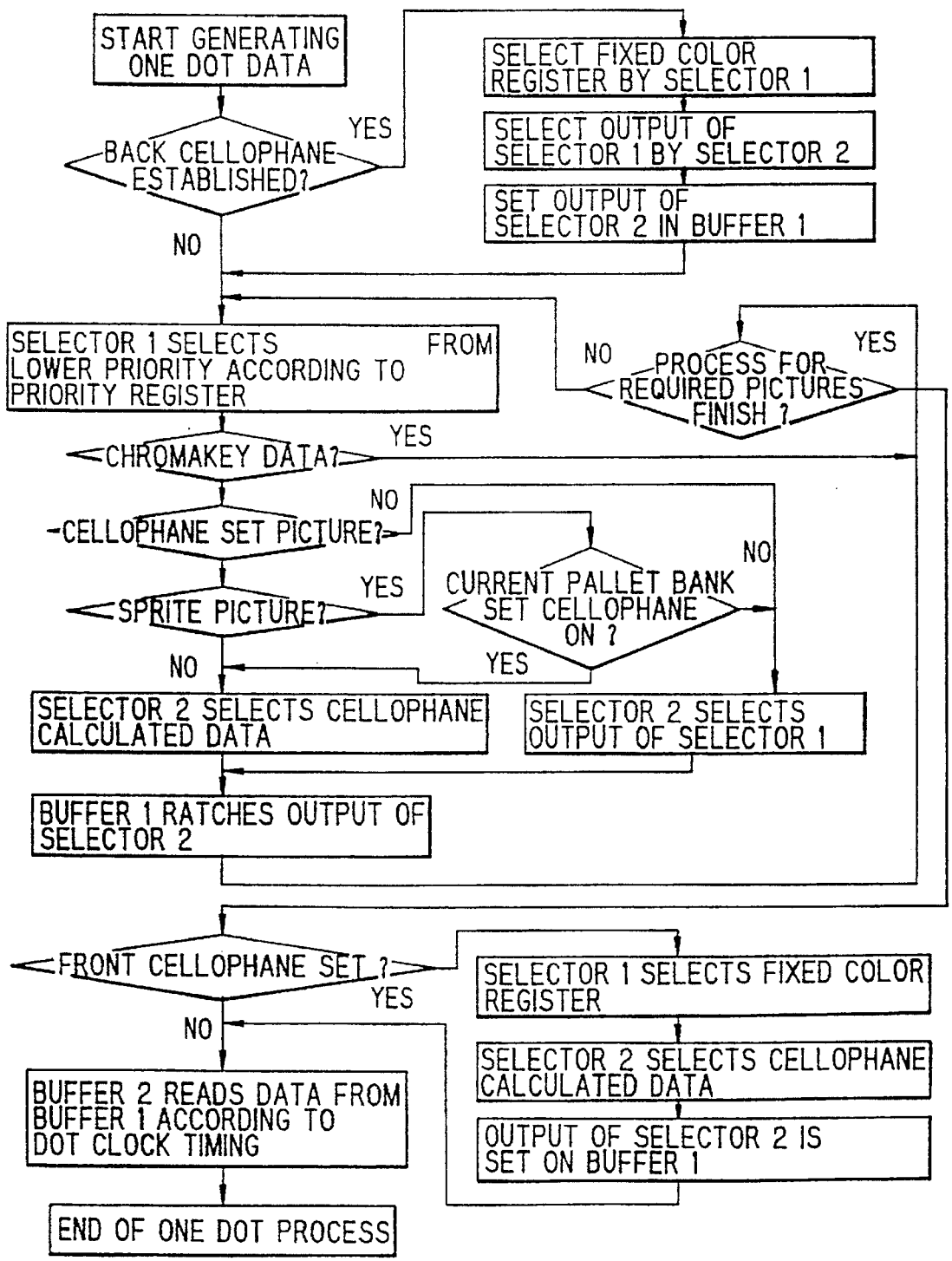
FIG. 55 is a flow chart showing operation of the cellophane function.
Figure 56:
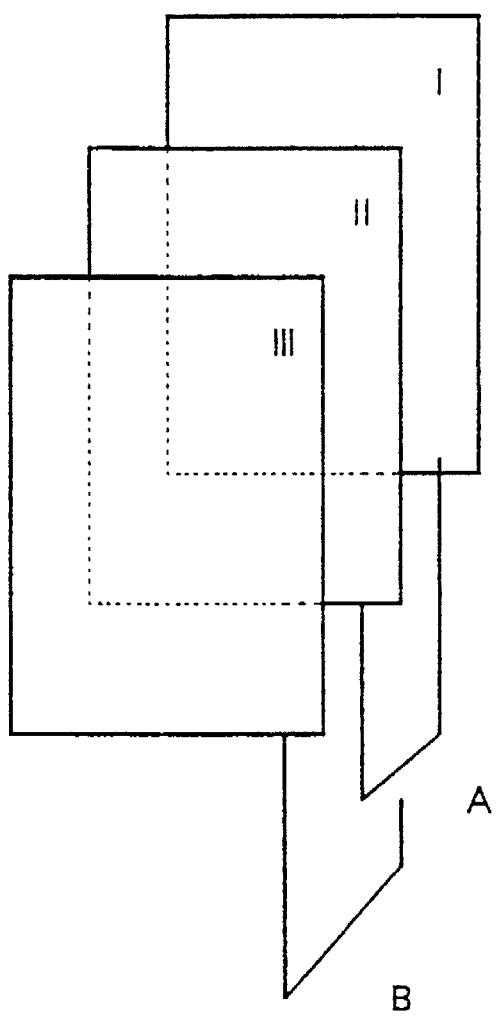
FIG. 56 is an explanatory diagram showing the cellophane function.

FIGS. 54 and 55 are a block diagram and a flow charts showing data processing in the cellophane arithmetic and cellophane function, respectively. The cellophane process is carried out dot-by-dot. As shown in FIG. 56, the VDP unit 114, control unit 104 and image data extension unit 106 correspond to first to third pictures I to III, respectively, the correspondence being arranged dot-by-dot in accordance with picture priorities supplied from the LSI units of them.

For example, if the priority is set on a dot in the order of "VDP> control unit> image data extension unit", the third picture III is used for the VDP unit 114, the second picture II is used for the control unit 104 and the first picture I is used for the image data extension unit 106, respectively. In this case, when the cellophane instruction is set on the second picture II (for example, the BMG1 picture of the control unit 104), the cellophane process is carried out on the first and second pictures I and II in accordance with the cellophane coefficient, which corresponds to the value set in the coefficient register of the second picture II. Further, if the cellophane instruction is set on the third picture III (for example, the BG picture), the cellophane process is carried out on the third picture III and the picture which has been cellophane processed between the first and second pictures I and II.

If the cellophane instruction is not set on the second picture II only, the cellophane process is carried out between the second and third pictures II and III because the first picture I is blinded by the second picture II. The second picture II, however, does not blind the first picture at its chromakey portion. In this case, even if the cellophane instruction is set on the first picture I, the function is invalid. The cellophane instruction is set on and off dot-by-dot for each picture.

It is impossible to use the cellophane function in the same device (the VDP unit 114, control unit 104 and image data extension unit 106), that is, for example the cellophane arithmetic can not be carried out between BMG1 and BMG2 in the control unit, and between the sprite picture and BG picture in the VDP unit 114. In other words, each of the VDP unit 114 and control unit 104 supplies one dot data of one picture selected in accordance with its internal priority, so that the cellophane process can not be carried out between two pictures in the same device.

According to the front and back cellophane functions, cellophane arithmetic is performed between a selected picture and a fixed color picture having single color. The color of the fixed color picture is set at the fixed color register.

In the front cellophane function, pictures supplied from the VDP unit 114, control unit 104 and image data extension unit 106 are cellophane processed and then the cellophane arithmetic is carried out on the pictures with the fixed color picture, as shown in FIG. 57. In this arithmetic, a value "1" of the coefficient register is used as the cellophane coefficient.

In the back cellophane function, a picture having the lowest priority picture selected from among pictures in the VDP unit 114, control unit 104 and image data extension unit 106 is cellophane processed with the fixed color picture, as shown in FIG. 58. Then the second lowest priority picture is cellophane processed in the same manner as the lowest priority picture. In the back cellophane function, a value of the coefficient register set for the first picture is used as the cellophane coefficient. The front and back cellophane processes can not be carried out at the same time. Settings for front and back cellophane process are effective from the following horizontal synchronization period.

All sprites in the VDP 114 are recognized as sprite pictures, so that the all sprites are cellophane processed basically when the cellophane instruction is set on the sprite picture. It is possible that specific sprites are not cellophane processed by the following method. When the cellophane instruction is not set on a color pallet bank number of a specific sprite by an SP sprite individual set register, dots in the specific sprite are treated as in a condition that the cellophane instruction is set on the specific sprite picture. This function is useful only when the cellophane arithmetic is carried out on the sprite picture. Therefore, if the cellophane instruction is set on a picture having a priority higher than that of the sprite picture, any sprite picture is cellophane processed.

Figure 60:
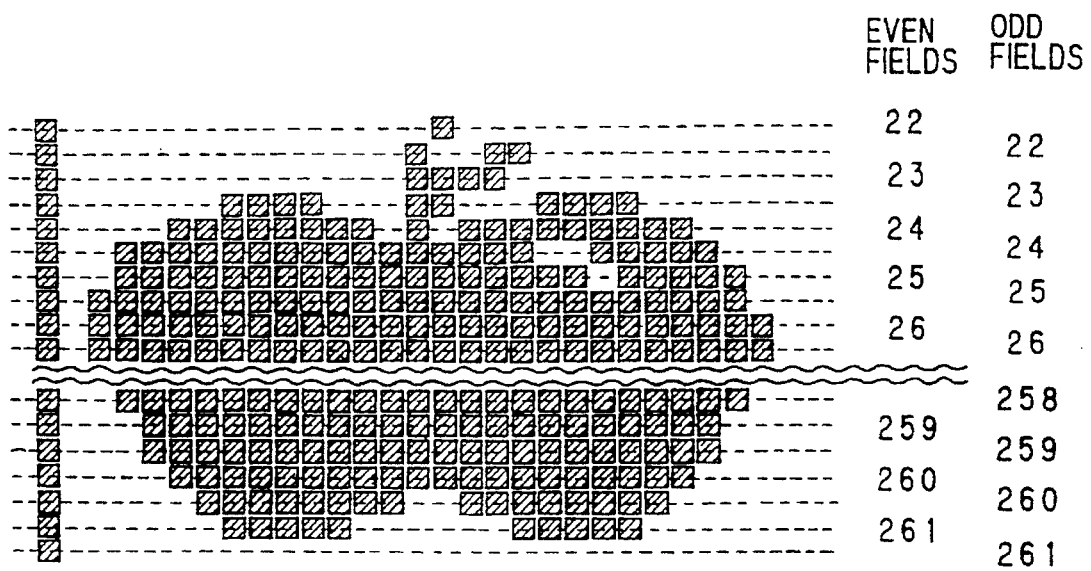
FIG. 60 is a diagram showing an image displayed in an interlace mode.
Figure 61:
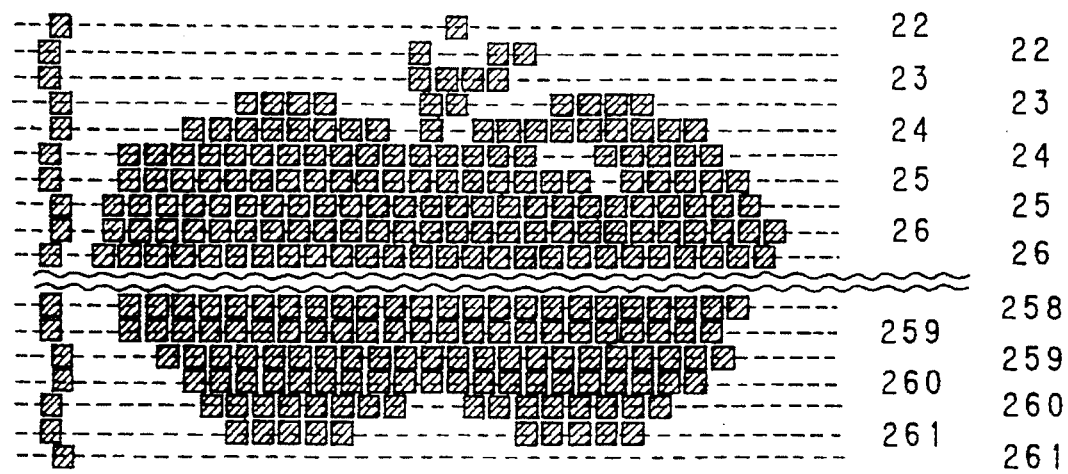
FIG. 61 is a diagram showing an image displayed in the interlace +½ dot shift mode.

FIGS. 60 and 61 show images displayed in a general interlace mode and in the interlace mode with a ½ dot shift function, which will be explained later.

The video encoder unit 112 may select an interlace mode, which is used for TV in general, and a non-interlace mode shown in FIG. 59. In the interlace mode, scanning lines are fixed in number at 263 or 262, an O/E bit at a status register is "1" in an odd field period in first 1/60 seconds so that an image is displayed as in the non-interlace mode. In the next 1/60 second, that is in an even field period, an O/E bit becomes "0" to display an image located ½ line above the previous image. As a result, the distance between the first (odd) field and second (even) fields becomes narrow, and the image is displayed smoothly. In the same manner, these processes are repeated alternatively. If the odd and even fields have the same pictures, the image is displayed as if it seems being vibrated up and down with short interval. Image data are displayed field by field whereby the desired image is obtained.

In the interlace mode, it is possible to display a more higher quality image by using the ½ dot shift function therewith. According to the ½ dot shift function, picture elements are shifted ½ dot in a horizontal direction at one line interval. In this function, a mask is used for smoothing notched edge lines of the image, so that the displayed image is composed of 255.5 dots.

Next, the synchronizing signal generating circuit 200 of the video encoder unit 112, which is shown in FIG. 47, will be explained. The synchronizing signal generating circuit 200 supplies dot clock signals, horizontal synchronizing signals—HSYNCA, HSYNCB and HSYNCC and vertical synchronizing signals—VSYNC to peripheral ICs in response to 12 times the chrominance subcarrier frequency. As a result, an image can be displayed in synchronization with an external image by the video encoder unit 112.

In the D/A converters 202, 204 and 206 of the video encoder unit 112, the YUV signal of 8 bits are converted into an analog signal. If the UV signal has only 4 bits data such as the pallet data, the 4 bits data are provided at the last figure with "0000" to make it 8 bits data. The Y data are converted into analog signal in linear, for example, "00h" data are converted into a black color signal and "FFh" data are converted into white color signal. The U and V data are also converted into an analog signals in linear fashion, however, over "80h" data are expressed as positive data and under "80h" data are expressed as negative data, because the U and V data are color difference data having polarities.

A color to be expressed has a depth defined in series with difference value from "80h" data, so that colors of "00h" and "FFh" are the deepest, and no color is expressed when each of the U and V is "80h". Color hue is defined by a ratio of difference values of the U and V respectively from "80h" and by polarities thereof. In the D/A converting process, it may be selected whether the Y signal is treated with a synchronizing signal, and whether the U and V signals are modulated by chrominance subcarrier. If the chrominance subcarrier modulation is selected, color burst is superimposed on the U signal at a predetermined timing and amplitude. The D/A converter are of a current adding type, whereby a voltage conversion is carried out in accordance with input impedance of external circuits.

An analog arithmetic is performed, by an external circuit, to the Y signal with no synchronizing signal and to the non-modulated UV signal, whereby the RGB signal is generated. When the Y signal with the synchronizing signal and the modulated UV signal are mixed by an external circuit, a composite video signal for the CRT is generated.

Figure 62:
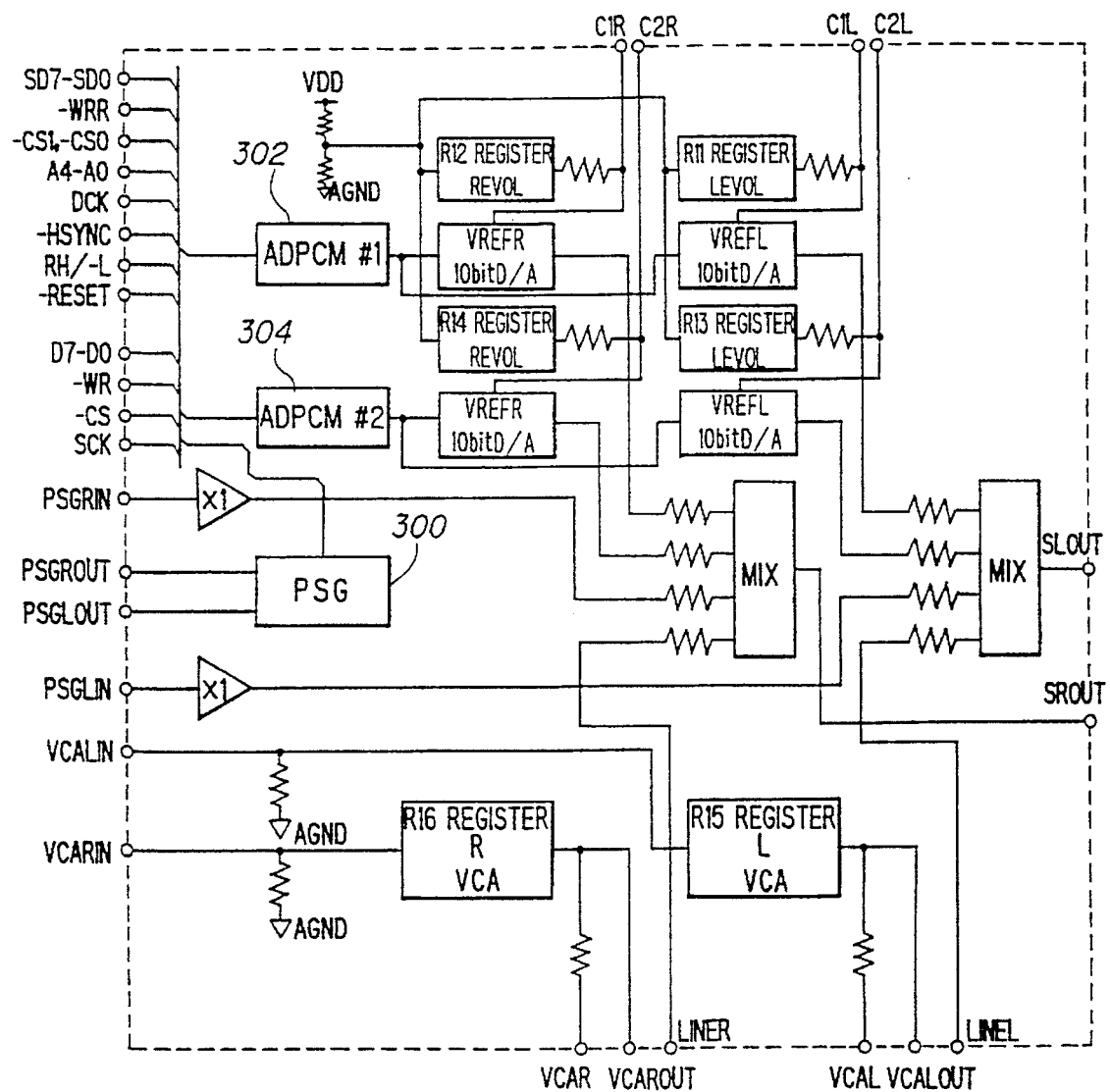
FIG. 62 is a block diagram showing a sound data output unit used in the preferred embodiment.

FIG. 62 shows the sound data output unit 110, which includes a six channel programmable sound generator (PSG) 300, right and left channel ADPCM decoder #1 (302) and #2 (304) and a sound data output circuit using a compact disk sound source.

PSG 300 receives PSG waveform data transmitted through the DRAM from the CPU 102, and modulates the waveform data in amplitude or in frequency, and LFO-controls a specified channel of the data whereby effective sound is produced.

The ADPCM reproduces sound data of 32 kHz and 16/84 kHz whose sampling frequency corresponds to the horizontal synchronizing signal. The frequencies are set by registers mounted in the sound data output unit 110 and control unit 104. In the sound data output unit 110, instructions for starting, interrupting and continuing data reproduction are set on a register therein by the control unit 104. The sound data output unit 110 also has a volume control function for a PCM external sound source in addition to the PSG and ADPCM, the unit having a register in which volume data are set by the CPU 102.

Figure 63:
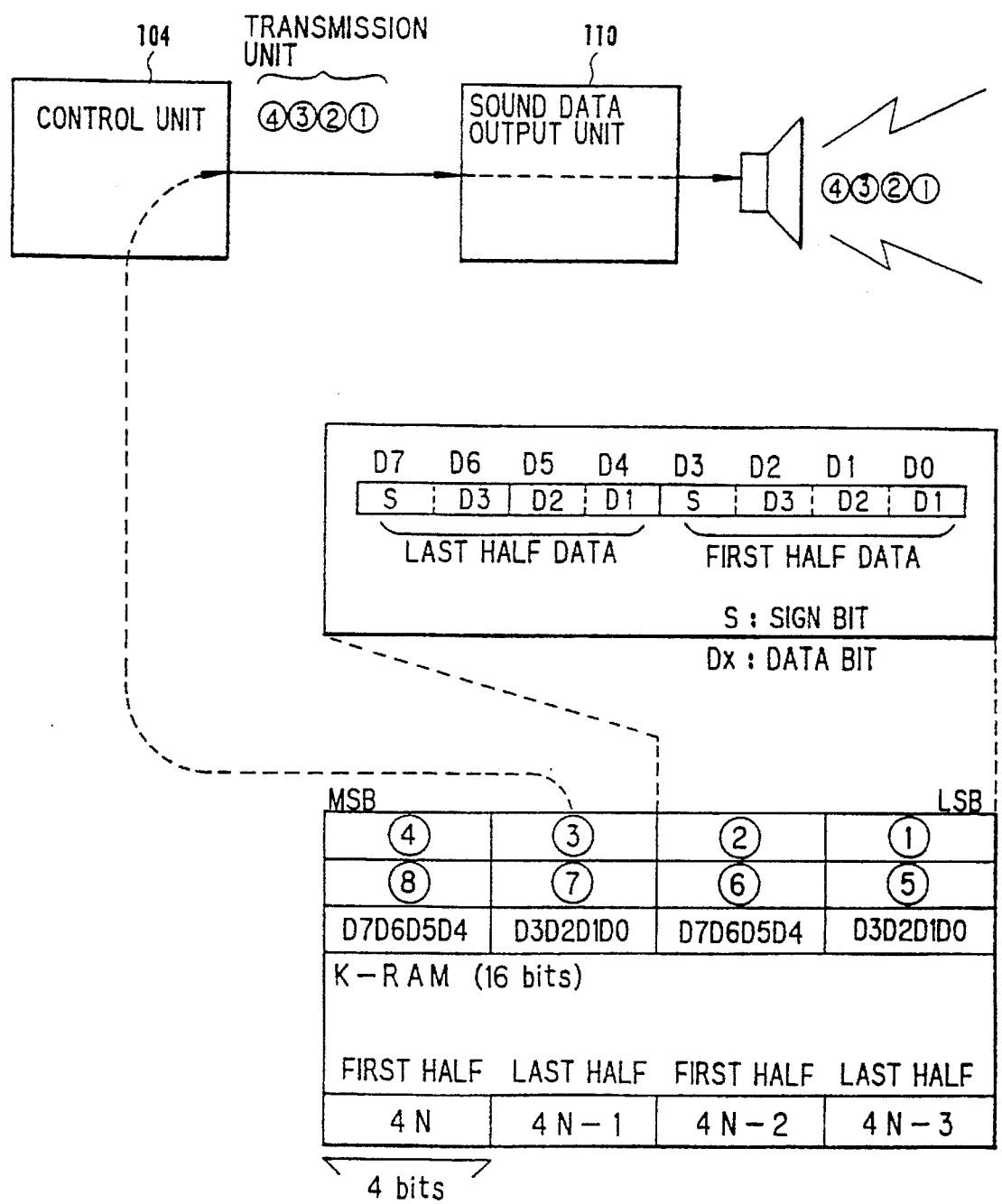
FIG. 63 is an explanatory diagram showing a storage configuration of ADPCM data in the memory.

FIG. 63 shows a memory configuration for the ADPCM data in the K-RAM shown in FIG. 11. As shown in FIG. 63, sound data to be transmitted to the ADPCM decoder are stored by 16 bits boundary in the K-RAM, the sound data being composed of 4 bits including one symbol bit. The sound data are written, read and transmitted in the order of (1) to (8).

In this embodiment, an ADPCM decoder basic sampling frequency of 32 kHz is used. The frequency of 32 kHz is very close to a horizontal synchronizing frequency of 31.47 kHz for the NTSC system, so that the horizontal synchronizing frequency is used as clock to control the ADPCM data transmission and reproducing rate. In the present invention, a sampling frequency selected from among 15.73 kHz, 7.87 kHz and 3.93 kHz may be used in addition to 31.47 kHz, so that compatibility with conventional game computers may be realized, and the ADPCM data of around 16 kHz may be treated.

Figures 64, 65:
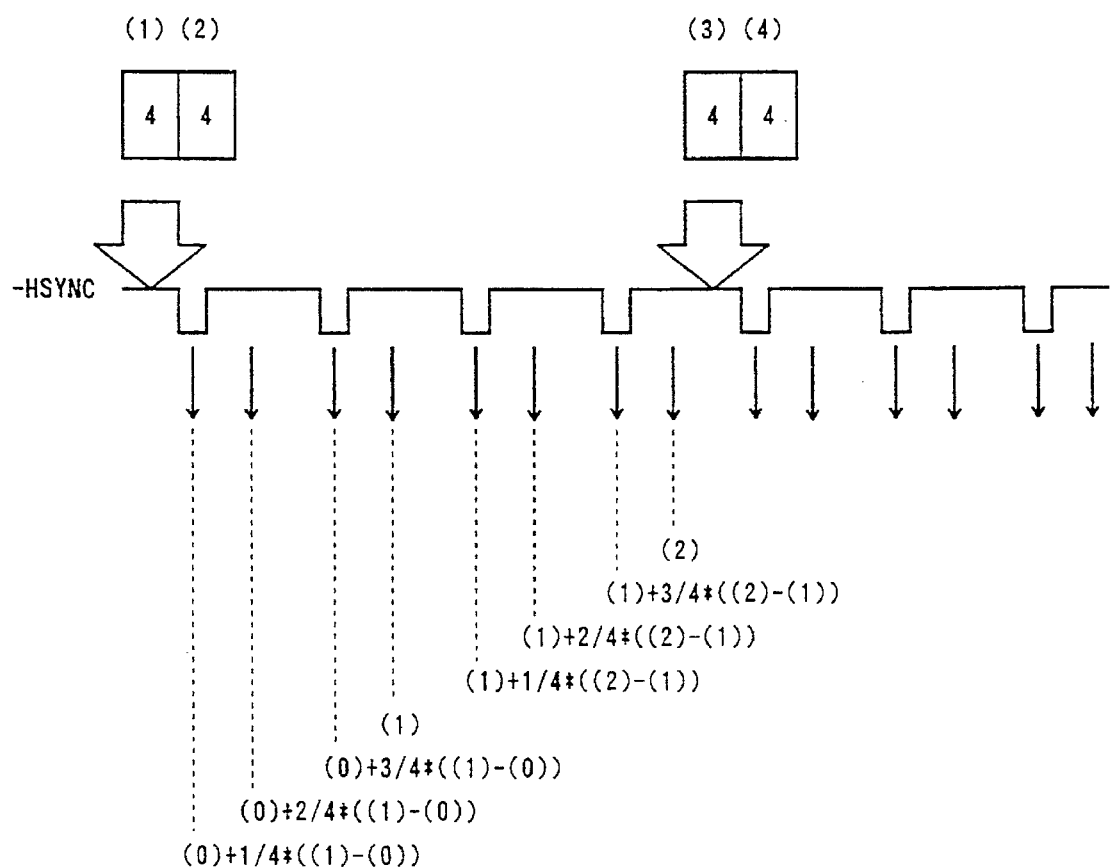
FIG. 64 is a table showing a relation among sampling frequencies, adding amount in data transmission and adding amount in a linear interpolation.
FIG. 65 is an explanatory diagram showing linear interpolation in a 7.87 kHz sampling frequency mode.

FIGS. 64 and 65 show linear interpolation for the case of sampling frequencies other than 31.47 kHz. FIG. 65 is for the sampling frequency of 7.87 kHz, (0), (1), (2), (3) and (4) indicating the order of transmission and "4" in squares indicating that data are transmitted byte by byte in four horizontal period (H). When the sampling frequency is 7.87 kHz, the amount to be added to the present (current) data is one fourth of difference between the previous data and the present data, as shown in FIG. 65. Previous data (0) are reproduced during the rise time of HSYNC immediately after transmitting data (1) and (2). Data given by adding "(d(n)–d(n–i))/4" to the data (0) at each step (½ horizontal synchronizing period) are reproduced in a period between reproducing processed of the data (0) and (1).

Figure 66:
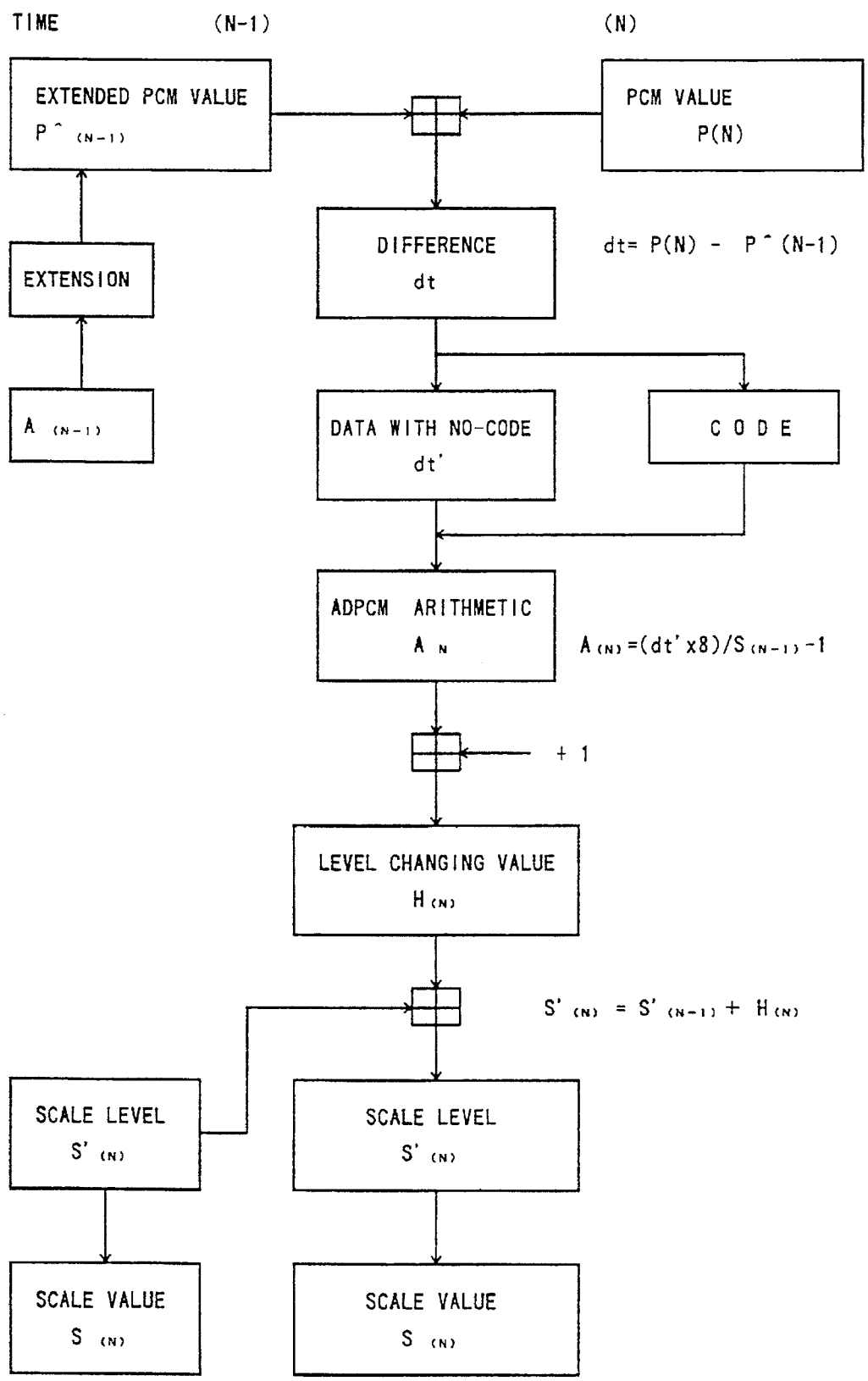
FIG. 66 is a flow chart showing a scale-down process of PCM data to ADPCM data.
Figure 67:
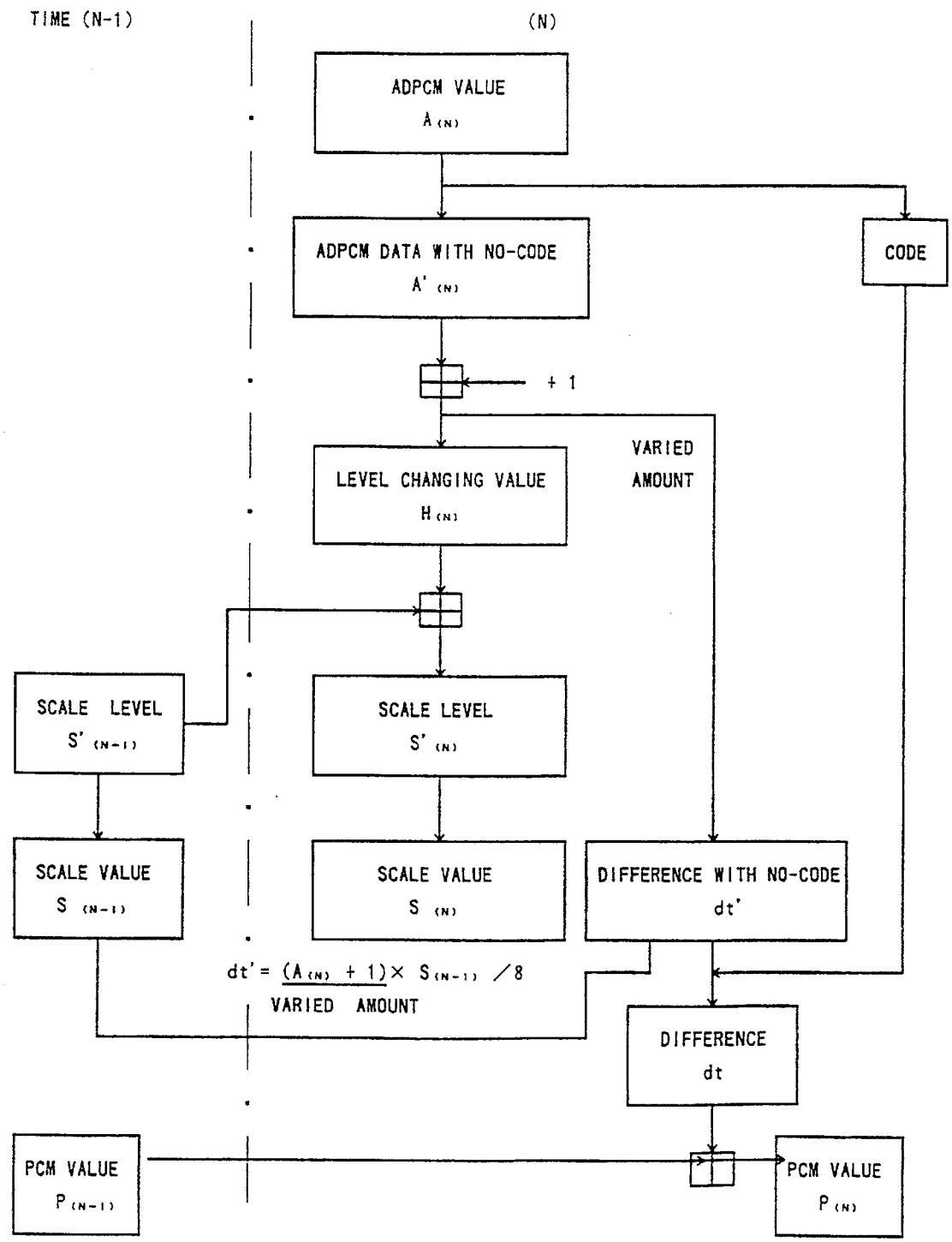
FIG. 67 is a flow chart showing an extending process of the ADPCM data to the PCM data.

FIGS. 66 and 67 are flow charts showing scale process of the PCM data into ADPCM data and extension process of the ADPCM data into the PCM data by the ADPCM decoders, respectively. In the reducing and extension processes, sound data are processed in accordance with two tables shown in FIGS. 68 and 69. FIG. 68 is a correspondence table showing relations among ADPCM data, variations and level changing values. FIG. 69 is a conversion table showing a relation between scale levels and scale values. For the preferred embodiment, an initial scale value is set at the minimum value 16, the maximum value is set at 48. The maximum and minimum values of the extension data are 4095.875 and 0.

In this embodiment, sound volume data, sampling frequency data, soft reset data, PSG waveform data are set in registers in the sound data output unit 110 by the CPU 102. The PSG data and control data for the PCM sound source output, which are supplied from the external audio device, are also set in registers of the sound data output unit 110 by the CPU 102.

As described before, according to the invention, a variety of image data, such as natural picture and moving picture, may be processed at high speed together with a variety of sound data, such as the PCM, ADPCM and PSG. Further, an external memory device does not need to have much capacity because image and sound data are scaled effectively. In addition, debugging of the program for the system is easy to be carried out and the system is easy to be programmed.

I claim:

1. A multimedia system for processing a variety of images with sound, comprising:

a Video RAM (VRAM) for storing image data;

means for writing image data of external-block type to be processed block-by-block into the VRAM;

a video display (VDP) unit, coupled to the VRAM, for processing the image data stored in the VRAM;

an external storage for storing image and sound data, including image data of internal-dot type to be processed dot-by-dot;

a control unit, coupled to the external storage, for reading the image and sound data stored in the external storage, to produce scale-down image data of external-dot type to be processed dot-by-dot;

an image data extension unit, coupled with the control unit, for extending the scaled-down image data of external-dot type;

a video encoder unit, coupled with the video display unit, the control unit, and the image data extension unit, for encoding each image data of the external-block, internal-dot, and external-dot types, respectively;

means, coupled with the video encoder unit, for decoding the encoded image data to produce transferable data; and a sound data output unit, coupled to the control unit, for processing a variety of sound data.

2. The multimedia system according to claim 1, wherein:
said video encoder unit performs priority processing for the image data supplied from the video display unit, the control unit and the image data extension unit to superimpose a plurality of pieces of image in a predetermined order.

3. The multimedia system according to claim 1, wherein:
said control unit reads sound data from the external storage through an SCSI interface.

4. The multimedia system according to claim 2, wherein:
said image data extension unit processes Inverse Discrete Cosine Transformation (IDCT) data for natural pictures and moving pictures and run-length-encoding for animation pictures.

5. The multimedia system according to claim 1, wherein:
said video display unit is able to process two pictures of sprite and background.

6. The multimedia system according to claim 1, wherein:
said control unit is able to process four background pictures.

7. The multimedia system according to claim 1, wherein said image data extension unit includes:
a scale down data extension means including a reverse discrete cosine transformation (DCT) converter, a Huffman coding and decoding system, and a run-length coding and decoding system.

8. The multimedia system according to claim 1, wherein said external storage is a CD-ROM.

9. The multimedia system according to claim 1, wherein said control unit reads image data, sound data, and program data through a predetermined interface from said external storage and judges priority of the read data dot-by-dot, and in response, transmits a result of the judgement to the video encoder unit, a reduced version of image data to the image data extension unit, and sound data to the sound data output unit.

10. The multimedia system according to claim 9, wherein
said sound data output unit includes an adaptive difference pulse code modulation (ADPCM) extension-reproducing system and a mixer for mixing a pulse code modulation (PCM) output and sound data.

11. The multimedia system of claim 10, wherein said predetermined interface is a SCSI interface.

12. The multimedia system according to claim 1, further comprising:
a display for displaying the data transferred from said decoding means.

13. The multimedia system according to claim 12, wherein
said display comprises a screen divided into an upper screen portion and a lower screen portion, and in which upper and lower pictures for display in the upper and lower screen portions are stored in first and second Background Attribute Tables (BAT's), respectively.

14. The multimedia system according to claim 12, further including:
means for horizontally scrolling a plurality of rasters on said display a number of dots to the right or left of a reference position, and wherein said number of dots is set in a horizontal scroll register of the image data extension unit.

15. The multimedia system according to claim 1, wherein:
said control unit manages a plurality of (BG) screens, in which a main picture and a sub-picture are specified as BG image data, and in which the sub-picture is superimposed on the main picture.

16. The multimedia system according to claim 1, wherein said video encoder provides a cromakey function (transparency process).

17. A multimedia system for processing a variety of images and sounds, comprising:
a Video RAM (VRAM) for storing image data;
means for writing image data of external-block type to be processed block-by-block into the VRAM;
a video display (VDP) unit, coupled with the VRAM, for processing the image data stored in the VRAM;
an external storage for storing image and sound data, including image data of internal-dot type to be processed dot-by-dot;
a control unit, coupled with the external storage, for reading the image and sound data stored in the external storage, to produce image data of external-dot type to be processed dot-by-dot and managing a plurality of Background (BG) screens, in which a main picture and a sub-picture are specified as BG image data and scrolled independently of each other, and in which the sub-picture is superimposed on the main picture;
an image data extension unit, coupled with the control unit, for extending a scaled-down image data of external-dot type;
a video encoder unit, coupled with the video display unit, the control unit, and the image data extension unit, for encoding each image data of the external-block, internal-dot, and external-dot types, respectively;
means, coupled with the video encoder unit, for decoding the encoded image data to produce transferable data; and
a sound data output unit, coupled with the control unit, for processing a variety of sound data.

18. The multimedia system according to claim 17, wherein:
the sub-picture is scrolled in one of an endless scroll mode and a non-endless scroll media.

* * * * *